United States Patent [19]
Takashima et al.

[11] Patent Number: 6,021,229
[45] Date of Patent: Feb. 1, 2000

[54] IMAGING PROCESSING METHOD FOR MAPPING VIDEO SOURCE INFORMATION ONTO A DISPLAYED OBJECT

[75] Inventors: Akihiro Takashima; Nobuyuki Minami; Kazuhiro Maruyama, all of Kanagawa, Japan

[73] Assignee: Sony Corporation, Tokyo, Japan

[21] Appl. No.: 08/849,970

[22] PCT Filed: Nov. 14, 1996

[86] PCT No.: PCT/JP96/03347

§ 371 Date: Oct. 24, 1997

§ 102(e) Date: Oct. 24, 1997

[87] PCT Pub. No.: WO97/18668

PCT Pub. Date: May 22, 1997

[30] Foreign Application Priority Data

Nov. 14, 1995 [JP] Japan .................................. 7-321228

[51] Int. Cl.[7] .................................................. G06K 9/36
[52] U.S. Cl. .................... 382/285; 382/154; 345/419; 345/427; 345/430; 348/583; 348/584
[58] Field of Search ...................... 345/421.22, 425–427, 345/430–438, 441–443, 502, 507, 348–349, 419; 382/153–154, 285, 277, 276, 293; 395/86; 348/580–588

[56] References Cited

U.S. PATENT DOCUMENTS

| | | | |
|---|---|---|---|
| 5,077,608 | 12/1991 | Inoue et al. .............................. | 348/583 |
| 5,115,494 | 5/1992 | Seki ........................................ | 345/427 |
| 5,175,622 | 12/1992 | Dubner ................................... | 348/584 |
| 5,263,135 | 11/1993 | Dei .......................................... | 345/502 |
| 5,303,388 | 4/1994 | Kreitman et al. ....................... | 345/348 |
| 5,325,470 | 6/1994 | Sumino et al. ......................... | 345/421 |
| 5,561,746 | 10/1996 | Murata et al. .......................... | 345/419 |
| 5,581,665 | 12/1996 | Sugiura et al. ......................... | 395/86 |
| 5,586,246 | 12/1996 | Nobori et al. .......................... | 345/502 |
| 5,588,097 | 12/1996 | Ono et al. ............................... | 345/437 |

FOREIGN PATENT DOCUMENTS

| | | | |
|---|---|---|---|
| 63-189056 | 8/1988 | Japan ............................ | H04N 5/265 |
| 4-129481 | 4/1992 | Japan ............................ | G11B 27/28 |
| 4-229784 | 8/1992 | Japan ............................ | H04N 5/272 |
| 4-281572 | 10/1992 | Japan ............................ | G06F 15/62 |
| 4-329484 | 11/1992 | Japan ............................ | G06F 15/66 |
| 5-143709 | 6/1993 | Japan ............................ | G06F 15/62 |
| 6-187460 | 7/1994 | Japan ............................ | G06F 15/72 |
| WO 93/23835 | 11/1993 | WIPO ............................ | G09B 9/08 |

OTHER PUBLICATIONS

Shoemaker K.: "Understand The Basics To Implement 3–D Graphics" EDN, Sep. 1, 1983, USA, vol. 28, No. 18, ISSN 0012–7515, pp. 119–124, XP002052336.

*Primary Examiner*—Leo H. Boudreau
*Assistant Examiner*—Ishrat Sherali
*Attorney, Agent, or Firm*—Frommer Lawerence & Haug, LLP; William S. Frommer

[57] ABSTRACT

An image processing apparatus and the method for mapping a plurality of images which are on the two-dimensional plane on the corresponding faces of a solid in the three-dimensional virtual space. The mapping image on the side face being close to the object image displaying face is formed in accordance with the shape of object image displaying face of the solid on which the object image is mapped, and the image mapped on each face is displaced in accordance with the movement of the solid in the three-dimensional space. Therefore, the image that as if a desired image is stuck to the faces of the solid moving in a virtual space can be displayed on a screen surface by easily operating by an operator.

26 Claims, 34 Drawing Sheets

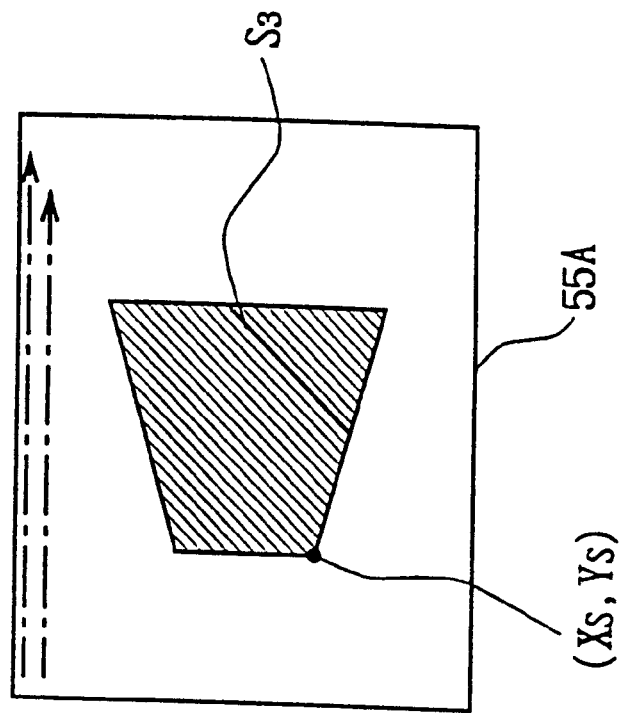
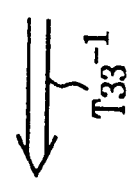
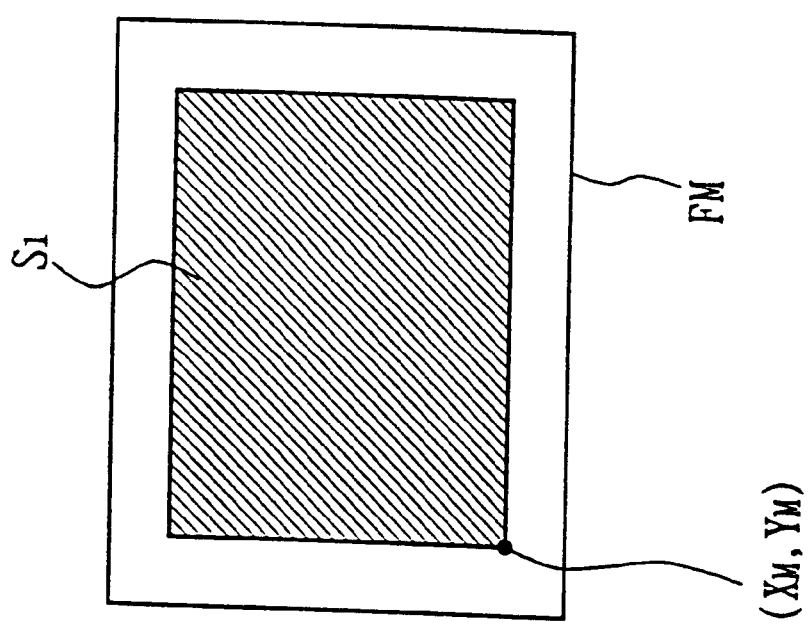
FIG. 7B
FIG. 7A

6,021,229

IMAGING PROCESSING METHOD FOR MAPPING VIDEO SOURCE INFORMATION ONTO A DISPLAYED OBJECT

TECHNICAL FIELD

The present invention relates to an image processing apparatus and an image processing method, and is applicable to the case where an image projected on a two-dimensional plane is displayed on a face of a solid formed in a three-dimensional space.

BACKGROUND ART

Conventionally, there has been provided a special effect device (DVE: Digital Video Effects) which gives video signal the special effects such as, cropping of image (Crop), skewing (Skew), and variation in the X-axis direction and the Y-axis direction (XY-rate) to transform an image. It has been considered that the device is used to obtain "Slab" effect for displaying an image on a face of a rectangular parallelepiped formed in a three-dimensional space.

More specifically, as shown in FIG. 1, in the "Slab" effect processing, a moving picture displayed on a two-dimensional plane is referred to as an object image (Object), and the special effect device is used to form an image that the object image seems to be stuck to an object image displaying face (SideA) of a rectangular parallelepiped formed in a three-dimensional space.

In the "Slab" effect, as well as the face on which the object image is displayed (SideA), two side faces (SideB and SideC) are simultaneously displayed in accordance with an inclination of the rectangular parallelepiped in a three-dimensional space. FIG. 2 shows a method of forming the three-dimensional six-side display image by using one special effect device (DVE).

That is, in FIG. 2, a first video tape recorder (VTR) 6 is used to reproduce an object image (Object) which is output to a special effect device 5. The special effect device 5 performs the mapping processing in which the reproduced object image (Object) seems to be stuck to the object image displaying face (SideA) of the three-dimensional six-side display image, which is output to a second video tape recorder (VTR) 7. The second video tape recorder 7 records the object image displaying face (SideA) being the object image (Object).

An operator reproduces by a third video tape recorder 8 a video tape in which the object image displaying face (SideA) is thus recorded, and outputs it to a composing circuit 9. At this time, the operator also reproduces, on a two-dimensional plane by the first video tape recorder 6, an image to be displayed on the side face (SideB) of the three-dimensional six-side display image. The image reproduced by the first video tape recorder 6 is output to the special effect device 5 and the special effect processing is performed on it.

Thus, the image on a two-dimensional plane reproduced by the first video tape recorder 6 is transformed into the shape which seems to be displayed on the side face (SideB) of the three-dimensional six-side display image. The image of side face (SideB) is composed with the object image displaying face (SideA) at the composing circuit 9. At this time, the operator uses a specified operation key to adjust the display position so that the object image displaying face (SideA) and the side face (SideB) are close at one edge each other. The composed image of the object image displaying face (SideA) and the side face (SideB) obtained at the composing circuit 9 is recorded at the second video tape recorder 7.

The operator reproduces at the third video tape recorder 8 the video tape in which the composed image of the object image displaying face (SideA) and the side face (SideB) is recorded, and outputs it to the composing circuit 9. At this time, the operator also reproduces the image to be displayed on the side face (SideC) of the three-dimensional six-side display image on a two-dimensional plane by the first video tape recorder 6. The image reproduced by the first video tape recorder 6 is output to the special effect device 5 and the special effect processing is performed on it.

Thus, the image on a two-dimensional plane reproduced by the first video tape recorder 6 is transformed into the shape which seems to be displayed on the side face (SideC) of the three-dimensional six-side display image. The image of side face (SideC) is composed with the composed image of the object image displaying face (SideA) and the side face (SideB) at the composing circuit 9. At this time, the operator uses a specified operation key to adjust the display position so that the object image displaying face (SideA) and the side face (SideB), and the object image displaying face (SideA) and the side face (SideC) are respectively close at one edge each other.

The three-dimensional six-side display image obtained at the composing circuit 9 is recorded at the second video tape recorder 7.

By the way, in the case of forming the three-dimensional six-side display image by using the above method, the side faces (SideE and SideC) are formed separately from the object image displaying face (SideA) for displaying an object image (Object) and are composed. Accordingly, when the inclination of three-dimensional six-side display image is changed in a three-dimensional space, even if the special effects such as, cropping of image (Crop), skewing (Skew), and variation in the X-axis direction and the Y-axis direction (XY-rate), on the object image displaying face (SideA) are changed, the side faces (SideB and SideC) are not followed. Therefore, it is also needed to change the special effects to the side faces (SideB and SideC) in accordance with the change of the object image displaying face (SideA) in the three-dimensional space.

In this case, an operator has to perform the work of composing the side faces (SideB and SideC) manually for each frame (60 frames per second) in accordance with the change of the object image displaying face (SideA). There has been a problem that the operation of operator becomes complicated.

DISCLOSURE OF INVENTION

The object of this invention is to solve the above problem and to provide an image processing method which can improve the operational efficiency when the transformation of each plane of three-dimensional three-side display image are simultaneously executed to connect each plane with one another and the special effects are given.

To solve the above problem, this invention provides: a first image forming means for forming an object image by writing a first image in a first memory and transforming said first image written in said first memory based on a first control data input from a predetermined control means; a second image forming means for forming a first side image by writing a second image in a second memory and transforming said second image written in said second memory into the image having a shape corresponding to said object image based on a second control data input from said control means; a third image forming means for forming a second side image by writing a third image in a third memory and transforming said third image written in said third memory into the image having a shape corresponding to said object image based on a third control data input from said control means; and a control means for moving said object image, said first side image, and said second side image in accordance with the movement of said solid having predetermined faces respectively corresponding to said object image, said first side image, and said second side image in the three-dimensional space, and for perspective-transforming on a predetermined screen surface said object image, said first side image, and said second side image mapped on said solid.

BRIEF DESCRIPTION OF DRAWINGS

FIGS. 7A and 7B are schematic diagrams explaining the basic three-dimensional moving transformation and perspective transformation;

BEST MODE FOR CARRYING OUT THE INVENTION (1) Entire Construction

Figure 1:
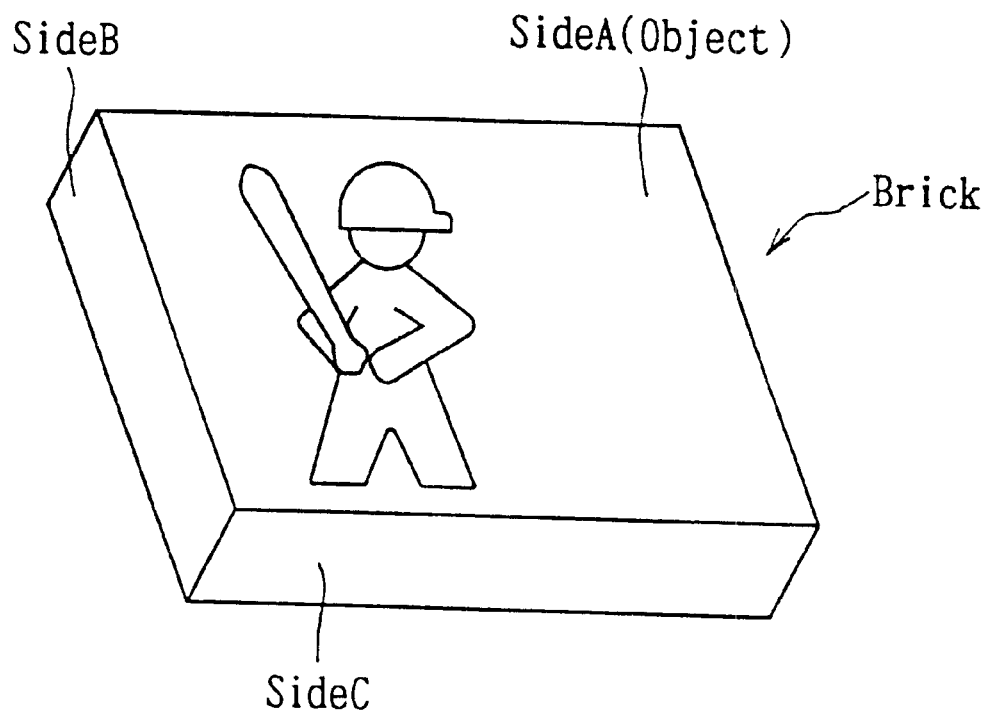
FIG. 1 is a schematic diagram explaining a three-dimensional three-side display image.
Figure 2:
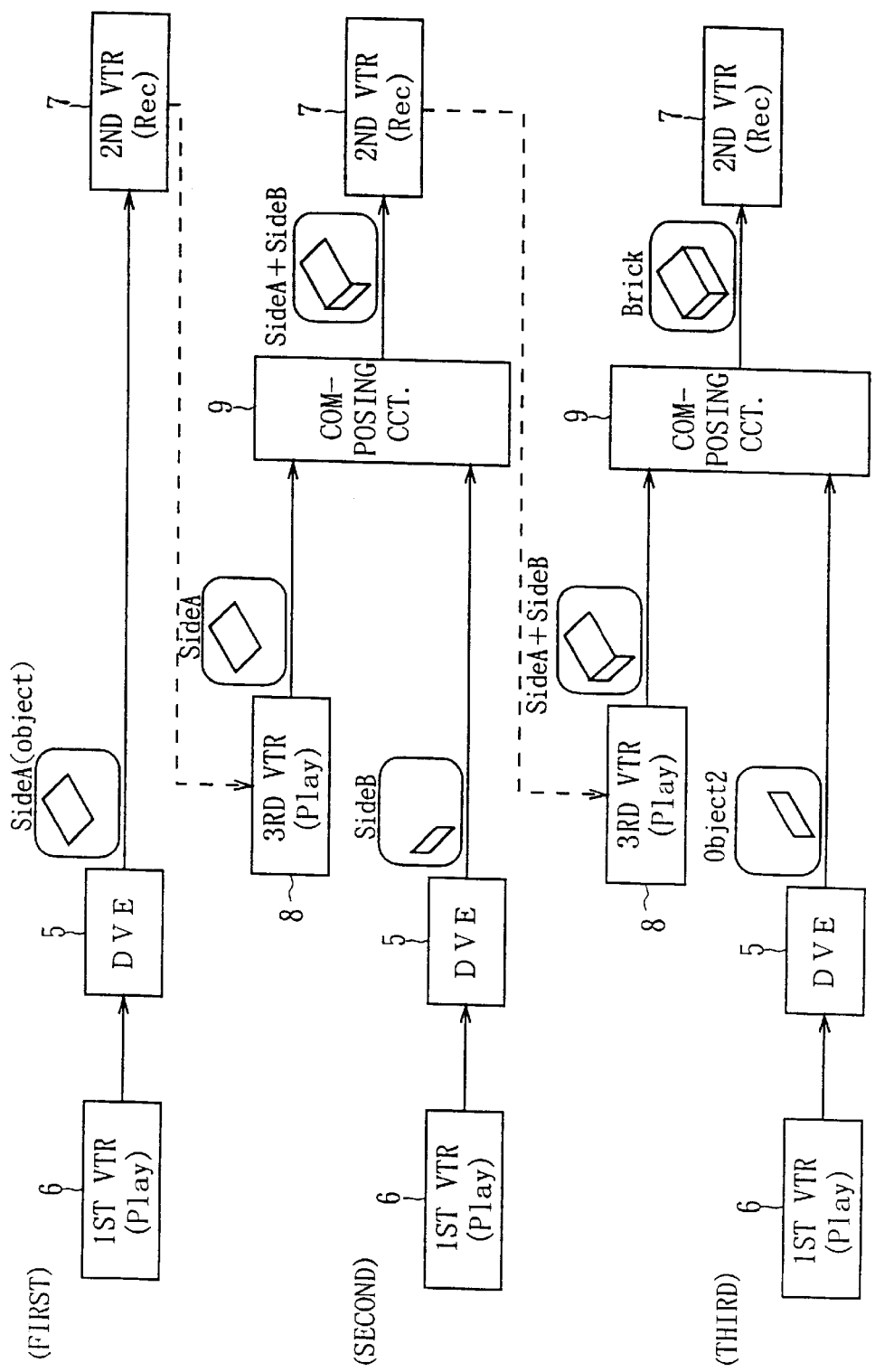
FIG. 2 is a schematic diagram explaining a conventional method of forming a three-dimensional image.
Figure 3:
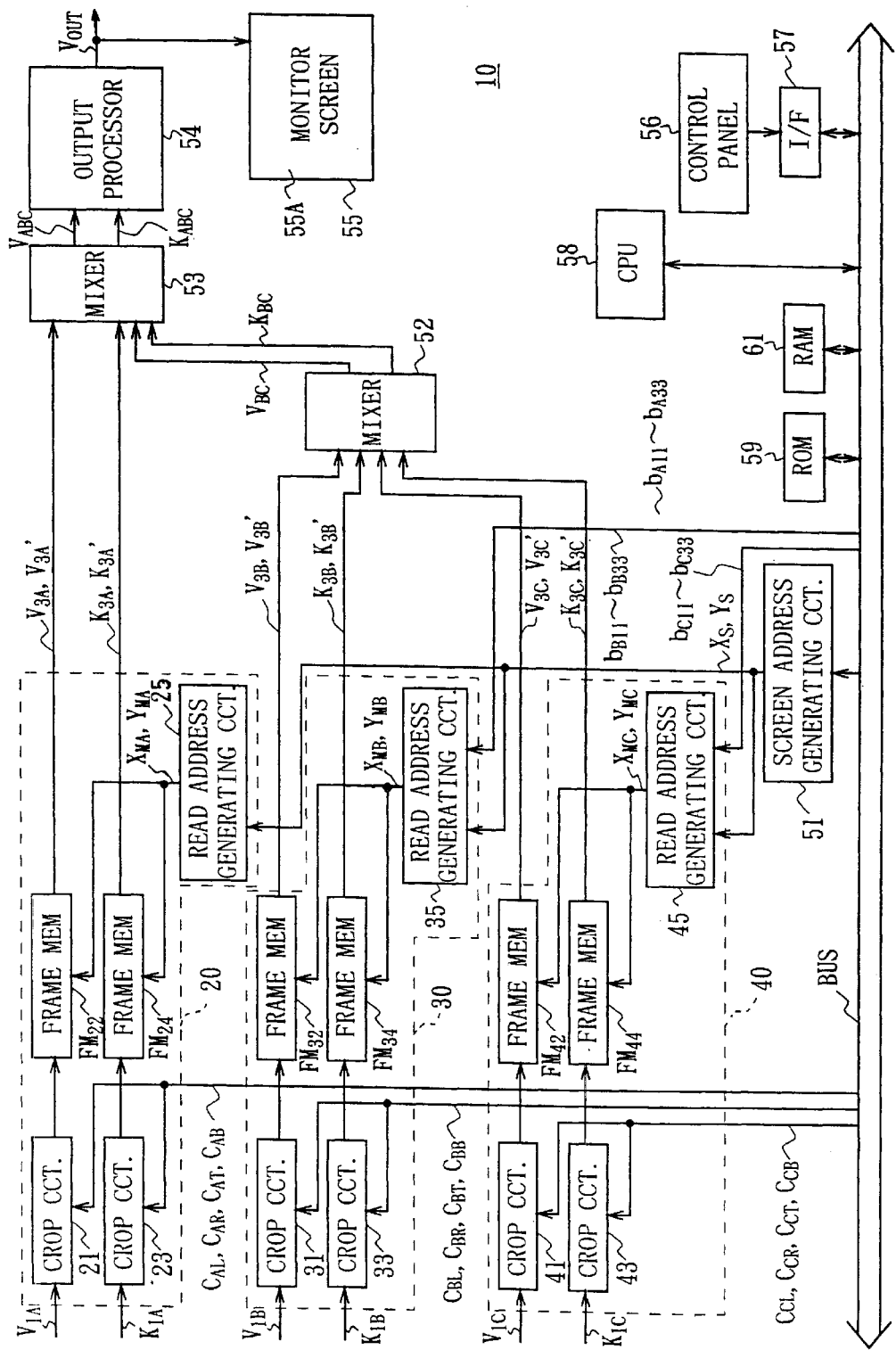
FIG. 3 is a block diagram showing the entire construction of an image processing apparatus according to the present invention.

FIG. 3 generally shows an image processing apparatus 10 using a special effect device. An operator operates a control panel 56 to input the command signal to an CPU 58 via an interface circuit (I/F) 57 and a bus BUS. The CPU 58 uses an ROM (Read Only Memory) 59 and an RAM (Random Access Memory) 61 to respectively control an image forming part 20 of the object image displaying face (SideA) of the three-dimensional six-side display image, the image forming part 30 of the first side face (SideB), and the image forming part 30 of the second side face (SideC) by the command from the operator.

The image forming part 20 of the object image displaying face (SideA) inputs the source video signal $V_{1A}$ of the object image (Object) before transformation to a cropping circuit 21. The cropping circuit 21 crops the source video signal $V_A$ at the cropping position ($C_{AL}$, $C_{AR}$, $C_{AT}$, $C_{AB}$) of the X-Y coordinates which is input from the CPU 58 via the bus BUS, and stores it in a frame memory $FM_{22}$ with the form that it is not transformed.

Here, a read address generating circuit 25 generates a read address ($X_{MA}$, $Y_{MA}$) from the frame memory $FM_{22}$, based on the data of the address ($X_S$, $Y_S$) on a monitor screen 55 output from a screen address generating circuit 51 and the data of the parameters $b_{A11}$ to $b_{A33}$ of the image transformation matrix specified by the CPU 58.

The frame memory $FM_{22}$ reads the stored video signal by the read address ($X_{MA}$, $Y_{MA}$) output from the read address generating circuit 25. As a result, the cropped source video signal $V_{1A}$ in the frame memory $FM_{22}$ is image-transformed so that the cropped portion of the source video signal $V_{1A}$ is mapped on the object image displaying face (SideA) of the three-dimensional six-side display image actually displayed on the monitor screen 55 among solids (rectangular parallelepipeds) in the virtual three-dimensional space. The transformed video signal $V_{3A}$ thus obtained is output to a mixer 53.

Further, in the image forming part 20 of the object image displaying face (SideA), similar to the case of the source video signal $V_{1A}$, key signal $K_{1A}$ is cropped by a cropping circuit 23, thereafter, it is stored in a frame memory $FM_{24}$ as it is. The frame memory $FM_{24}$ reads the video signal by the read address ($X_{MA}$, $Y_{MA}$) output from the read address generating circuit 25, so as to obtain the transformed key signal $K_{3A}$ transformed similar to the case of the transformed video signal $V_{3A}$ described above, and it is output to the mixer 53 together with the transformed video signal $V_{3A}$.

In connection, the key signal is that the image plane formed by the source video signal $V_{1A}$ described above is constructed by data sequence of "0" or "1". When the source video signal $V_{1A}$ is cropped or image-transformed, only data at the portion that the processing is applied is changed.

On the contrary, the image forming part 30 of the first side face (SideB) inputs the source video signal $V_{1B}$ before transformation of the picture displayed on the first side face (SideB) of the three-dimensional six-side display image to a cropping circuit 31. The cropping circuit 31 crops the source video signal $V_{1B}$ at the cropping position ($C_{BL}$, $C_{BR}$, $C_{BT}$, $C_{BB}$) of the X-Y coordinates which is input from the CPU 58 via the bus BUS, and stores it in a frame memory $FM_{32}$ with the form that it is not transformed.

Here, a read address generating circuit 35 generates a read address ($X_{MB}$, $Y_{MB}$) from the frame memory $EM_{32}$, based on the data of the address ($X_S$, $Y_S$) on the monitor screen 55 output from the screen address generating circuit 51 and the data of the parameters $b_{B11}$ to $b_{B33}$ of the image transformation matrix specified by the CPU 58.

The frame memory $FM_{32}$ reads the stored video signal by the read address ($X_{MB}$, $Y_{MB}$) output from the read address generating circuit 35. As a result, the cropped source video signal $V_{1B}$ in the frame memory $FM_{32}$ is image-transformed so that the cropped portion of the source video signal $V_B$ is mapped on the first side face (SideB) of the three-dimensional six-side display image actually displayed on the monitor screen among solids (rectangular parallelepipeds) in the virtual three-dimensional space. The transformed video signal $V_{3B}$ thus obtained is output to a mixer 52.

Further, in the image forming part 30 of the first side face (SideB), similar to the case of the source video signal $V_{1B}$, key signal $K_{1B}$ is cropped by a cropping circuit 33, thereafter, it is stored in a frame memory $FM_{34}$ as it is. The frame memory $FM_{34}$ reads the video signal by the read address ($X_{MB}$, $Y_{MB}$) output from the read address generating circuit 35, so as to obtain the transformed key signal $K_{3B}$ transformed similar to the case of the transformed video signal $V_{3B}$ described above, and it is output to the mixer 52 together with the transformed video signal $V_{3B}$.

On the contrary, the image forming part 40 of the second side face (SideC) inputs the source video signal $V_{1C}$ before transformation of the picture displayed on the second side face (SideC) of the three-dimensional six-side display image to a cropping circuit 41. The cropping circuit 41 crops the source video signal $V_{1C}$ at the cropping position ($C_{CL}$, $C_{CR}$, $C_{CT}$, $C_{CB}$) of the X-Y coordinates which is input from the CPU 58 via the bus BUS, and stores it in a frame memory 42 with the form that it is not transformed.

Here, a read address generating circuit 45 generates a read address ($X_{MC}$, $Y_{MC}$) at the frame memory $FM_{42}$, based on the data of the address ($X_S$, $Y_S$) on the monitor screen 55 output from the screen address generating circuit 51 and the data of the parameters $b_{C11}$ to $b_{C33}$ of the image transformation matrix specified by the CPU 58.

The frame memory $FM_{42}$ reads the stored video signal by the read address ($X_{MC}$, $Y_{MC}$) output from the read address generating circuit 45. As a result, the cropped source video signal $V_{1C}$ in the frame memory $FM_{42}$ is image-transformed so that the cropped portion of the source video signal $V_{1C}$ is mapped on the second side face (SideC) of the three-dimensional six-side display image actually displayed on the monitor screen among solids (rectangular parallelepipeds) in the virtual three-dimensional space. The transformed video signal $V_{3C}$ thus obtained is output to the mixer 52.

Further, in the image forming part 40 of the second side face (SideC), similar to the case of the source video signal $V_{1C}$, key signal $K_{1C}$ is cropped by a cropping circuit 43, thereafter, it is stored in a frame memory $FM_{44}$ as it is. The frame memory $FM_{44}$ reads the video signal by the read address ($X_{MC}$, $Y_{MC}$) output from the read address generating circuit 45, so as to obtain the transformed key signal $K_{3C}$ transformed similar to the case of the transformed video signal $V_{3C}$ described above, and it is output to the mixer 53 together with the transformed video signal $V_{3C}$.

The mixer 52 composes the transformed video signal $V_{3B}$ output from the image forming part 30 of the first side face (SideB) and the transformed video signal $V_{3C}$ output from the image forming part 40 of the second side face (SideC), and at the same time, composes the transformed key signal $K_{3B}$ output from the image forming part 30 of the first side face (SideB) and the transformed key signal $K_{3C}$ output from the image forming part 40 of the second side face (SideC). Thereby, the composed video signal $V_{BC}$ and the composed key signal $K_{BC}$ are obtained, which are composed so that the first side face (SideB) and the second side face (SideC) are close each other. The composed video signal $V_{BC}$ and the composed key signal $K_{BC}$ are output to the mixer 53.

The mixer 53 composes the transformed video signal $V_{3A}$ output from the image forming part 20 of the object image displaying face (SideA) and the composed video signal $V_{BC}$ output from the mixer 52, and at the same time, composes the transformed key signal $K_{3A}$ output from the image forming part 20 of the object image displaying face (SideA) and the composed key signal $K_{BC}$ output from the mixer 52. Thereby, the composed video signal $V_{ABC}$ and the composed key signal $K_{ABC}$ can be obtained. The composed video signal $V_{ABC}$ and the composed key signal $K_{ABC}$ represent the three-dimensional six-side display image that the object image displaying face (SideA), the first side face (SideB), and the second side face (SideC) are close with one another.

The composed video signal Van and the composed key signal $K_{ABC}$ output from the mixer 53 are output to an output processor 54. The output processor 54 adds the cubic effect given by shadowing a picture (drop shadowing effect) or the effect of making a moving picture to trail (trailing effect), and outputs the obtained output video signal $V_{OUT}$ to the monitor screen 55 to display the picture.

(2) Definition of Coordinates

Figure 4:
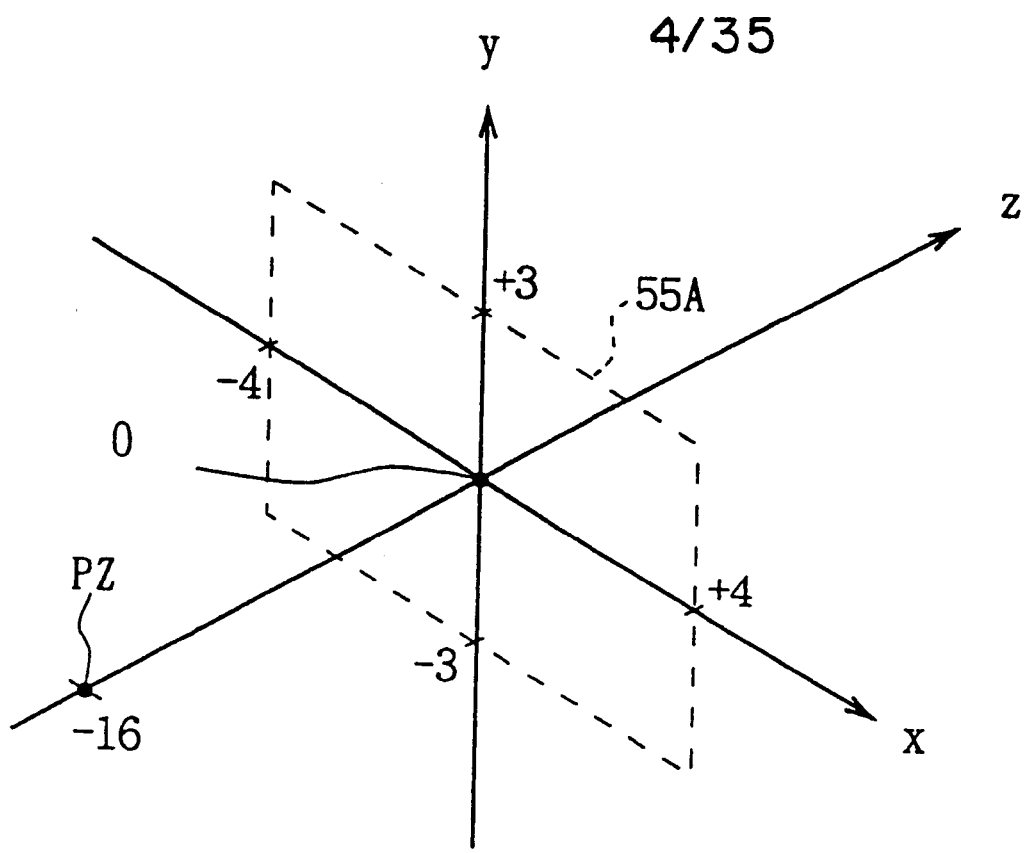
FIG. 4 is a schematic diagram explaining the definition of screen surface.

The three-dimensional coordinates used in this embodiment for generating a three-dimensional six-side display image and for displaying it on the monitor screen 55 is defined by the orthogonal coordinates of x-axis, y-axis, and z-axis. More specifically, as shown in FIG. 4, assuming that the screen surface 55A exists on the xy-plane defined by the x-axis and y-axis which is orthogonal to the x-axis, the x-axis is defined as the horizontal (right and left) direction of the screen surface 55A, and the y-axis is defined as the vertical (up and down) direction of the screen surface 55A.

Further, the depth direction of the screen surface 55A is defined as the plus direction of the z-axis which is orthogonal to the xy-plane, and this side of the screen surface 55A, that is the side where view point PZ for viewing the screen surface exists, is defined as the minus direction of the z-axis.

Further, it is defined that the center of the screen surface 55A coincides with the origin O of the three-dimensional coordinates composed of x-axis, y-axis, and z-axis.

The virtual coordinates values, which continue from the inside (origin) of the screen area toward the right and left outside direction, is set on the x-axis. The virtual coordinates values between "−4" and "4" are set from the left side to the right side when viewing the screen surface 55A from the view point PZ on the x-axis in the screen area.

Further, the virtual coordinates values, which continue from the inside (origin) of the screen area toward the up and down outside direction, are set on the y-axis. The virtual coordinates values between "−3" and "3" are set from the down side to the up side when viewing the screen surface 55A from the view point PZ on the y-axis in the screen area.

Further, the view point position PZ of the operator is virtually set at the position where the coordinates value becomes "−16" on the z-axis.

(3) Basic Algorism of Three-Dimensional Transformation

The basic algorism of three-dimensional image transformation processing will be described, which is for fornling a solid (a rectangular parallelepiped) at an arbitrary position and with an arbitrary angle in a virtual space represented by three-dimensional coordinates of xyz, and for displaying only the plane actually viewed from the view point of operator, which is positioned at the coordinate value "−16" of the z-axis, of the solid on the screen surface 55A as the three-dimensional six-side display image.

The source video signal forming the image of two-dimensional plane is stored in a frame memory in the state that it is not transformed. Therefore, as shown in FIGS. 5 and 6, the source video signal $V_1$ exists on the xy-plane in a space represented by the three-dimensional coordinates of xyz, so that the image of the source video signal $V_1$ is displayed on the screen surface 55A which exists on the xy-plane.

Figure 5:
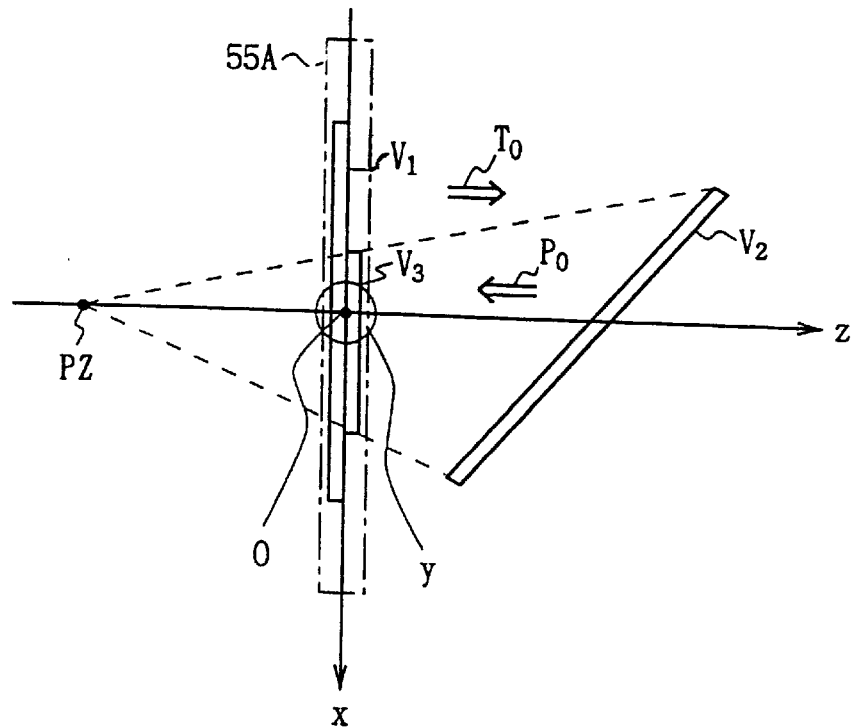
FIG. 5 is a schematic diagram explaining the basic three-dimensional moving transformation and perspective transformation.
Figure 6:
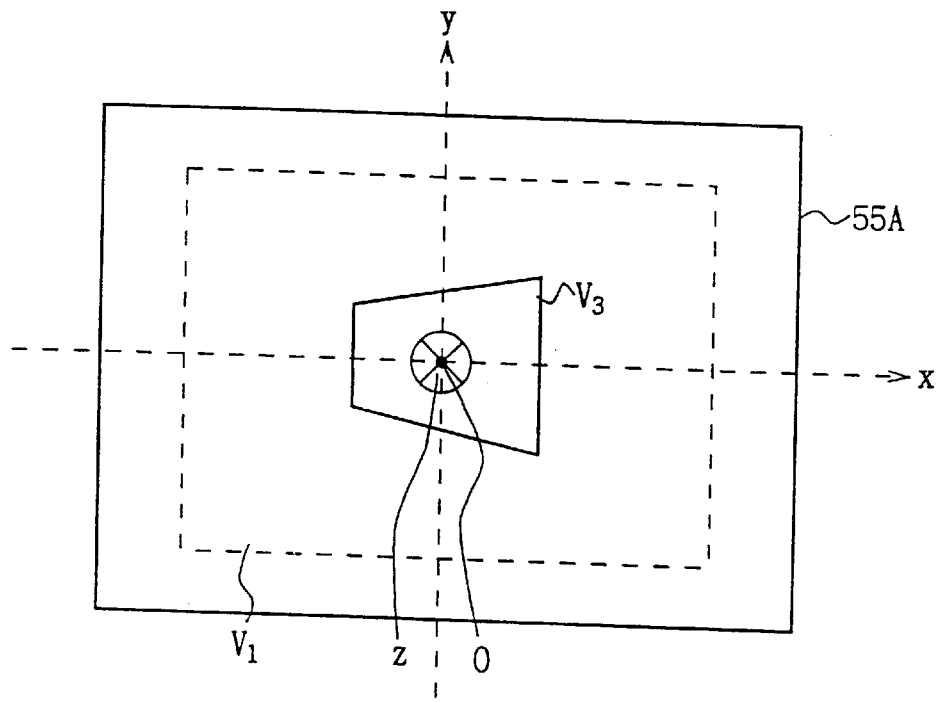
FIG. 6 is a schematic diagram explaining the basic three-dimensional moving transformation and perspective transformation.

In connection, FIG. 5 shows the state where the space represented by the three-dimensional coordinates of xyz is viewed from the plus side of the y-axis to the minus side, and the source video signal $V_1$ is overlapped on the screen surface 55A which exists on xy-plane. FIG. 6 shows the state where the space represented by the three-dimensional coordinates of xyz is viewed from the view point PZ on the z-axis to the minus side of the z-axis through the screen surface 55A, and the source video signal $V_1$ exists in the screen surface 55A on xy-plane.

The operator operates the operation key of the control panel so that the three-dimensional image transformation processing is performed on the source video signal $V_1$ in the xyz-coordinate space. More specifically, the three-dimensional transformation matrix $T_0$ composed of parameters set for each frame is performed for each pixel of the source video signal $V_1$ by the operation of operator, so that the source video signal $V_1$ is three-dimensional-transformed in the spatial position indicated by the three-dimensional transformed video signal $V_2$. The three-dimensional transformation in the case of FIGS. 5 and 6 is an example that the source video signal $V_1$ is rotated by approximately 45° with the y-axis being centered, and moreover parallel moved in the plus direction of the z-axis.

The three-dimensional transformation matrix $T_0$ used for three-dimensional transformation is represented by the following equation:

$$T_0 = \begin{matrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{matrix} \quad (1)$$

The parameters $r_{11}$ to $r_{33}$ used for the three-dimensional transformation matrix $T_0$ include: a factor for rotating the source video signal $V_1$ around the x-axis, around the y-axis, and around the z-axis; a factor for magnifying/reducing a scale of the source video signal $V_1$ in the x-axis direction, y-axis direction, and z-axis direction respectively; and a factor for skewing the source video signal $V_1$ in the x-axis direction, y-axis direction, and z-axis direction respectively. The parameters "$l_x$", "$l_y$", and "$l_z$" include a factor for parallel moving the source video signal $V_1$ in the x-axis direction, y-axis direction, and z-axis direction respectively. The parameter "s" includes a factor for magnifying/reducing uniformly the entire source video signal $V_1$ in the respective direction of three dimensions.

Also, since the transformation matrix $T_0$ expresses the coordinates of rotation transformation, etc. and the coordinates of parallel movement transformation and magnification/reduction transformation in the same coordinates, it becomes four lines and four rows. This matrix is generally called as the homogeneous coordinates.

When the source video signal $V_1$ on the screen surface 55A is three-dimensional-transformed at the position of the three-dimensional transformed video signal $V_2$ by the three-dimensional transformation matrix $T_0$, the three-dimensional transformed video signal $V_2$ is projected onto the xy-plane by the perspective transformation matrix.

The perspective transformation is, as shown in FIGS. 5 and 6, a transformation for obtaining the image of the three-dimensional transformed video signal $V_2$ which is seen through on the xy-plane (this is called as the perspective transformed video signal $V_3$) when the transformed video signal $V_2$ is viewed from the virtual view point PZ on the z-axis. In the case of FIG. 5, the perspective transformed video signal $V_3$ is generated on the screen surface 55A of xy-plane by the perspective transformation matrix $P_0$, in which it seems as if there is the image of the three-dimensional transformed video signal $V_2$ at the opposite side (the plus side of the z-axis) of the screen surface 55A viewing from the virtual view point PZ.

The perspective transformation matrix $P_0$ is represented by the equation:

$$P_0 = \begin{matrix} 1 & 0 & 0 & 0 \\ 0 & 1 & 0 & 0 \\ 0 & 0 & 0 & P_z \\ 0 & 0 & 0 & 1 \end{matrix} \quad (2)$$

The parameter $P_Z$ of the perspective transformation matrix $P_0$ is a perspective value for applying rules of perspective when the three-dimensional transformed video signal $V_2$ is seen through on xy-plane. That is, in the case of FIG. 5, the three-dimensional transformed video signal $V_2$ in the three-dimensional space is inclined for xy-plane by 45°. The portion which is distant from the virtual point PZ is seen small and the portion which is close to the virtual point PZ is seen large, when the three-dimensional transformed video signal $V_2$ is seen from the virtual point PZ. Therefore, by using the parameter $P_Z$, the perspective transformed video signal $V_3$ transformed to the position of the screen surface 55A becomes that the three-dimensional transformed video signal $V_2$ in the three-dimensional space is transformed in accordance with the distance from the virtual view point PZ.

The position where the three-dimensional transformed video signal $V_2$ is transformed on the screen surface 55A by the perspective transformation changes in accordance with the distance between the virtual view point PZ and the screen surface 55A, and the distance between the virtual view point PZ and the three-dimensional transformed video signal $V_2$. The perspective value $P_Z$ is set by operator in accordance with the position of the virtual view point PZ, so as to perform the perspective transformation in accordance with the position of virtual view point PZ. Usually, since the position of view point PZ is the coordinate value of the z-axis, "−16", the perspective value $P_Z$ is so set that "1/16" is the reference value.

In this way, the basic processing of three-dimensional transformation comprises a spatial image transforming step for obtaining the three-dimensional transformed video signal $V_2$ from the source video signal $V_1$ by the three-dimensional transformation matrix $T_0$, and a perspective transforming step for transforming the three-dimensional transformed video signal $V_2$ obtained at the spatial image transforming step by the perspective transformation matrix $P_0$. Therefore, the transformation matrix T for obtaining the perspective transformed video signal $V_3$ from the source video signal $V_1$ is represented by the following equation as a multiplication equation of the three-dimensional transformation matrix $T_0$ and the perspective transformation matrix $P_0$:

$$T = T_0 \cdot P_0 \quad (3)$$

$$= \begin{matrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{matrix} \begin{matrix} 1 & 0 & 0 & 0 \\ 0 & 1 & 0 & 0 \\ 0 & 0 & 0 & P_z \\ 0 & 0 & 0 & 1 \end{matrix}$$

$$= \begin{matrix} r_{11} & r_{12} & r_{13} & r_{13}P_z \\ r_{21} & r_{22} & r_{23} & r_{23}P_z \\ r_{31} & r_{32} & r_{33} & r_{33}P_z \\ l_x & l_y & l_z & l_zP_z + s \end{matrix}$$

Here, in the image processing apparatus using the special effect device according to this invention, the two-dimensional source video signal $V_1$ supplied from outside is written once in a frame memory FM and the read address two-dimensionally calculated is supplied to the frame memory FM, so that the spatial image transformation (three-dimensional image transformation and perspective image transformation) desired by an operator can be performed on the video signal read from the frame memory FM. Therefore, both of the source video signal $V_1$ stored in the frame memory FM and the perspective transformed video signal $V_3$ read from the frame memory FM are two-dimensional data. In the calculation of read address, data in the z-axis direction on the three-dimensional space is not used practically.

Therefore, the parameters of third line and third row for calculating the data in the z-axis direction in the equation (3) is not needed to calculate the read address of the frame memory FM.

Thereby, assuming that the three-dimensional transformation matrix having the parameters necessary for calculation of the actual two-dimensional read address is "$T_{33}$", the matrix $T_{33}$ can be represented by the following equation, omitting the parameters in third line and third row from the equation (3):

$$T_{33} = \begin{matrix} r_{11} & r_{12} & r_{13}P_z \\ r_{21} & r_{22} & r_{23}P_z \\ l_x & l_y & l_zP_z + s \end{matrix} \quad (4)$$

Here, the relationship between the positional vector on the frame memory FM and the positional vector on the monitor screen 55 will be described below.

In FIG. 7A, the two-dimensional address on the frame memory FM is ($X_M$, $Y_M$) and the positional vector is [$X_M$ $Y_M$]. In FIG. 7B, the address on the monitor screen 55 is ($X_S$, $Y_S$) and the positional vector is [$X_S$ $Y_S$]. When the two-dimensional positional vector [$X_M$, $Y_M$] on the frame memory FM is expressed by the homogenous coordinates, it can be expressed as vector [$x_m$ $y_m$ $H_0$]. Also, when the positional vector [$X_S$ $Y_S$] on the monitor screen 55 is expressed by the homogeneous coordinates, it can be expressed as a vector [$x_s$ $y_s$ 1].

In addition, the parameter "$H_0$" of the homogeneous coordinates is a parameter for representing the magnification/reduction rate of the vector.

In this way, the three-dimensional transformation matrix $T_{33}$ is effected to the positional vector [$x_m$ $y_m$ $H_0$] on the frame memory FM, so that the positional vector [$x_m$ $y_m$ $H_0$] on the frame memory FM is transformed into the positional vector [$x_s$ $y_s$ 1] on the monitor screen 55. Therefore, the relation equation between the positional vector [$x_m$ $y_m$ $H_0$] on the frame memory FM and the positional vector [$x_s$ $y_s$ 1] on the monitor screen 55 is expressed by the following equation:

$$[x_s \, y_s \, 1] = [x_m \, y_m \, H_0] \cdot T_{33} \quad (5)$$

In addition, the relationship between the parameter "$H_0$" of the homogeneous coordinates used in the positional vector [$x_m$ $y_m$ $H_0$] on the frame memory FM and the parameter "1" of the homogeneous coordinates used in the positional vector [$x_s$ $y_s$ 1] on the monitor screen 55 expresses that the positional vector [$x_m$ $y_m$] of the homogeneous coordinates on the frame memory FM is transformed by the three-dimensional transformation matrix $T_{33}$ into the positional vector [$x_s$ $y_s$], and that a value "$H_0$" of the positional vector [$x_m$ $y_m$] of the homogeneous coordinates on the frame memory FM is transformed into a value "1" of the positional vector [$x_s$ $y_s$] of the homogeneous coordinates on the monitor screen 55.

In this way, the equation (5) is a relation equation for obtaining the point on the monitor screen 55 corresponding to the point on the frame memory FM by the matrix $T_{33}$. Here, in the image processing apparatus using the special effect device, the source video signal is stored in the frame memory FM with the state before transformation, and the point of the frame memory FM corresponding to the point on the monitor screen 55 obtained by the transformation matrix $T_{33}$ is specified by the read address, so that the spatial image transformation is performed on the source video signal.

In this apparatus, it is not necessary to calculate by the equation (5) to obtain the point on the monitor screen 55 corresponding to the point on the frame memory FM, but to obtain the point on the frame memory FM corresponding to the point on the monitor screen 55. Therefore, the equation (5) is transformed to use the relation equation expressed by the following equation:

$$[x_m \ y_m \ H_0] = [x_s \ y_s \ 1] \cdot T_{33}^{-1} \quad (6)$$

so that when the positional vector $[x_s \ y_s \ 1]$ on the monitor screen 55 is specified, the positional vector $[x_m \ y_m \ H_0]$ on the frame memory FM is calculated by the transformation matrix $T_{33}^{-1}$. The transformation matrix $T_{33}^{-1}$ is the inverse matrix of the transformation matrix $T_{33}$.

Next, to obtain the two-dimensional positional vector $[X_M \ Y_M]$ on the frame memory FM, the transformation matrix $T_{33}$ and the inverse matrix $T_{33}^{-1}$ are set as described below. More specifically, respective factors of the transformation matrix $T_{33}$ are set to parameters $a_{11}$ to $a_{33}$ as follows:

$$T_{33} = \begin{vmatrix} r_{11} & r_{12} & r_{13}P_z \\ r_{21} & r_{22} & r_{23}P_z \\ l_x & l_y & l_zP_z + s \end{vmatrix} = \begin{vmatrix} a_{11} & a_{12} & a_{13} \\ a_{21} & a_{22} & a_{23} \\ a_{31} & a_{32} & a_{33} \end{vmatrix} \quad (7)$$

and at the same time, the parameters of the inverse matrix $T_{33}^{-1}$ are set to parameters $b_{11}$ to $b_{33}$ as follows:

$$T_{33}^{-1} = \begin{vmatrix} a_{11} & a_{12} & a_{13} \\ a_{21} & a_{22} & a_{23} \\ a_{31} & a_{32} & a_{33} \end{vmatrix}^{-1} = \begin{vmatrix} b_{11} & b_{12} & b_{13} \\ b_{21} & b_{22} & b_{23} \\ b_{31} & b_{32} & b_{33} \end{vmatrix} \quad (8)$$

where, $$b_{i,j} = \frac{a_{ji}}{\det(T_{33})}$$

The equation (8) is substituted for the equation (6) to obtain the following equation:

$$[x_m \ y_m \ H_0] = [x_s \ y_s \ 1] \begin{vmatrix} b_{11} & b_{12} & b_{13} \\ b_{21} & b_{22} & b_{23} \\ b_{31} & b_{32} & b_{33} \end{vmatrix}$$

$$= \begin{matrix} [b_{11}x_s + b_{21}y_s + b_{31} \\ b_{12}x_s + b_{22}y_s + b_{32} \\ b_{13}x_s + b_{23}y_s + b_{33}] \end{matrix} \quad (9)$$

Thereby, the following equation can be obtained:

$$x_m = b_{11}x_s + b_{21}y_s + b_{31} \quad (10)$$

$$y_m = b_{12}x_s + b_{22}y_s + b_{32}$$

$$H_0 = b_{13}x_s + b_{23}y_s + b_{33}$$

Here, the case where the positional vector $[x_m \ y_m \ H_0]$ of the homogeneous coordinates on the frame memory FM is transformed into the two-dimensional positional vector $[X_M \ Y_M]$ on the frame memory FM will be described.

Since the parameter "$H_0$" used when the two-dimensional positional vector $[X_M \ Y_M]$ is transformed into the homogeneous coordinates is a parameter representing the size of the positional vector $[x_m \ y_m]$ of the homogeneous coordinates, the parameters "$x_m$" and "$y_m$" representing the direction of the positional vector of the homogeneous coordinates may be normalized with the parameter "$H_0$" representing the magnification/reduction rate of the positional vector of homogeneous coordinates, to transform the positional vector of the homogeneous coordinates into the two-dimensional positional vector. Therefore, respective parameters "$X_s$" and "$Y_s$" of the two-dimensional positional vector on the monitor screen 55 are expressed by the following equations:

$$X_M = \frac{x_m}{H_0} \quad (11)$$

$$Y_M = \frac{y_m}{H_0}$$

Similarly, in the case where the vector $[x_s \ y_s \ 1]$ of homogeneous coordinates on the monitor screen 55 is transformed into the two-dimensional positional vector $[X_S \ Y_S]$, the parameters "$x_s$" and "$y_s$" representing the direction of the positional vector of homogeneous coordinates may also be normalized with the parameter "1" representing the magnification/reduction rate of the positional vector of homogeneous coordinates. Therefore, respective parameters "$X_S$" and "$Y_S$" of two-dimensional positional vector on the monitor screen 55 are expressed by the following equations:

$$X_S = x_s$$

$$Y_S = y_s \quad (12)$$

Thus, the address $(X_M, Y_M)$ on the frame memory FM can be obtained by the equation (10) as the following equation:

$$X_M = \frac{x_m}{H_0} \quad (13)$$

$$= \frac{b_{11}x_s + b_{21}y_s + b_{31}}{b_{13}x_s + b_{23}y_s + b_{33}}$$

$$= \frac{b_{11}X_S + b_{21}Y_S + b_{31}}{b_{13}X_S + b_{23}Y_S + b_{33}}$$

$$Y_M = \frac{y_m}{H_0} \quad (14)$$

$$= \frac{b_{12}x_s + b_{22}y_s + b_{32}}{b_{13}x_s + b_{23}y_s + b_{33}}$$

$$= \frac{b_{12}X_S + b_{22}Y_S + b_{32}}{b_{13}X_S + b_{23}Y_S + b_{33}}$$

Next, respective parameters of $T_{33}^{-1}$ will be obtained.

$$b_{11} = \frac{-a_{32}a_{23} + a_{22}a_{33}}{W_1} \quad (15)$$

$$b_{12} = \frac{a_{32}a_{13} - a_{12}a_{33}}{W_1} \quad (16)$$

$$b_{13} = \frac{-a_{22}a_{13} + a_{12}a_{23}}{W_1} \quad (17)$$

$$b_{21} = \frac{a_{31}a_{23} - a_{21}a_{33}}{W_1} \quad (18)$$

$$b_{22} = \frac{-a_{31}a_{13} + a_{11}a_{33}}{W_1} \quad (19)$$

$$b_{23} = \frac{a_{21}a_{13} - a_{11}a_{23}}{W_1} \quad (20)$$

$$b_{31} = \frac{-a_{22}a_{31} + a_{21}a_{32}}{W_1} \quad (21)$$

$$b_{32} = \frac{a_{12}a_{31} - a_{11}a_{32}}{W_1} \quad (22)$$

$$b_{33} = \frac{-a_{12}a_{21} + a_{11}a_{22}}{W_1} \quad (23)$$

where, $$W_1 = -a_{22}a_{31}a_{13} + a_{21}a_{32}a_{13} + a_{12}a_{31}a_{23} - \quad (24)$$
$$a_{11}a_{32}a_{23} - a_{12}a_{21}a_{33} + a_{11}a_{22}a_{33}$$

Here, from the relation of the equation (7), the values of $a_{11}$ to $a_{33}$ become as follow:

$$a_{11} = r_{11}, \quad a_{12} = r_{12}, \quad a_{13} = r_{13}P_z \quad (25)$$

$$a_{21} = r_{21}, \quad a_{22} = r_{22}, \quad a_{23} = r_{23}P_z \quad (26)$$

$$a_{31} = l_x, \quad a_{32} = l_y, \quad a_{33} = l_z P_z + s \quad (27)$$

These equations are substituted for the equations (15) to (24) to obtain the following equations:

$$b_{11} = \frac{-l_y r_{23} P_z + r_{22}(l_z P_z + s)}{W_1} \quad (28)$$

$$b_{12} = \frac{l_y r_{13} P_z + r_{12}(l_z P_z + s)}{W_1} \quad (29)$$

$$b_{13} = \frac{-r_{22} r_{13} P_z + r_{12} r_{23} P_z}{W_1} \quad (30)$$

$$b_{21} = \frac{l_x r_{23} P_z - r_{21}(l_z P_z + s)}{W_1} \quad (31)$$

$$b_{22} = \frac{-l_x r_{13} P_z - r_{11}(l_z P_z + s)}{W_1} \quad (32)$$

$$b_{23} = \frac{r_{21} r_{13} P_z - r_{11} r_{23} P_z}{W_1} \quad (33)$$

$$b_{31} = \frac{-r_{22} l_x + r_{12} l_y}{W_1} \quad (34)$$

$$b_{32} = \frac{r_{12} l_x - r_{11} l_y}{W_1} \quad (35)$$

$$b_{33} = \frac{-r_{12} r_{21} + r_{11} r_{22}}{W_1} \quad (36)$$

where, $$W_1 = -r_{22}l_x r_{13}P_z + \quad (37)$$
$$r_{21}l_y r_{13}P_z +$$
$$r_{12}l_x r_{23}P_z -$$
$$r_{11}l_y r_{23}P_z -$$
$$r_{12}r_{21}(l_z P_z + S) +$$
$$r_{11}r_{22}(l_z P_z + S)$$

In this way, the values of the equations (28) to (37) are substituted for the equations (13) and (14), so that the read address $(X_M, Y_M)$ supplied to the frame memory FM are given as follows:

$$X_M = \frac{1}{H_0}[\{-l_x r_{23} P_z + r_{22}(l_z P_z + s)\} X_s + \quad (38)$$
$$\{l_y r_{13} P_z + r_{12}(l_z P_z + s)\} Y_s +$$
$$(-r_{22} r_{13} P_z + r_{12} r_{23} P_z)]$$

$$Y_M = \frac{1}{H_0}[\{l_x r_{23} P_z - r_{21}(l_z P_z + s)\} X_s + \quad (39)$$
$$\{-l_x + r_{11}(l_z P_z + s)\} Y_s +$$
$$(r_{21} r_{13} P_z - r_{11} r_{23} P_z)]$$

where, "$H_0$" is as follows:

$$H_0 = (-r_{22}l_x + r_{21}l_y)X_s + \quad (40)$$
$$(r_{12}l_x - r_{11}l_y)Y_s +$$
$$(-r_{12}r_{21} + r_{11}r_{22})$$

Therefore, the read address $(X_M, Y_M)$ supplied to the frame memory FM can be expressed by using respective parameters ($r_{11}$ to $r_{33}$, $l_x$, $l_y$, $l_z$, and s) of the three-dimensional transformation matrix $T_0$ which are determined by the spatial image transforming device desired by an operator, and using the perspective value $P_z$ which is a parameter previously set.

Therefore, with respect to the equations (6) to (40), the screen address $(X_S, Y_S)$ is supplied for each pixel so as to correspond to the order of raster scanning of the monitor screen 55, and the read address $(X_M, Y_M)$ on the frame memory FM corresponding to the supplied screen address can be calculated successively.

(4) Hexahedron in Virtual Space

Figure 8:
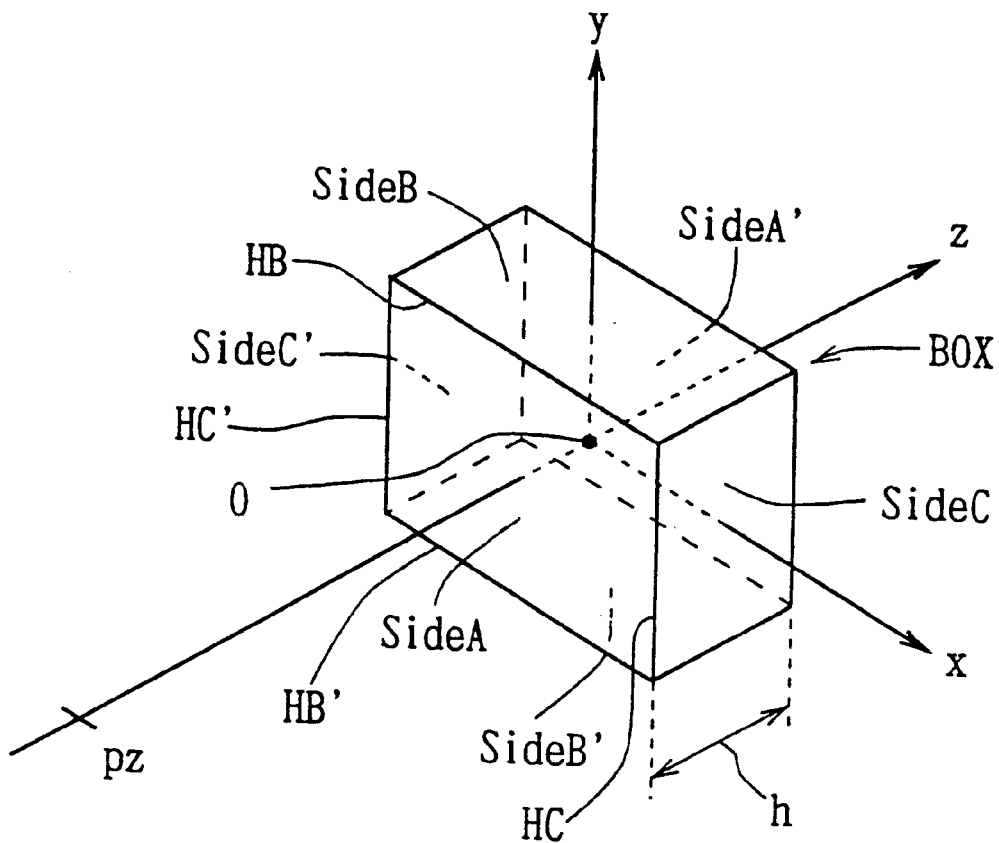
FIG. 8 is a schematic diagram explaining a solid (a rectangular parallelepiped) being at the basic position in the three-dimensional space.

In this embodiment, as shown in FIG. 8, a rectangular parallelepiped BOX in the three-dimensional virtual space on which the three-dimensionally transformed source video signal is mapped exists with the position that the origin O of the three-dimensional coordinates is centered as a standard position.

The rectangular parallelepiped BOX has an object image displaying face (SideA) on which the three-dimensionally transformed source video signal $V_{1A}$ is mapped (FIG. 3), a plane (SideA') facing to the object image displaying face (SideA), a first side face (SideB) on which the three-dimensionally transformed source video signal $V_{1B}$ is mapped (FIG. 3), a plane (SideB') facing to the first side face, a second side face (SideC) on which the three-dimensionally transformed source video signal $V_{1C}$ is mapped (FIG. 3) and the second side face (SideC).

In the rectangular parallelepiped BOX, the thickness between the object image displaying face (SideA) and the facing plane (SideA'), that is the thickness "h" for the object image displaying face (SideA) is set by an operator. The object image displaying face (SideA) positioned at a standard position as shown in FIG. 8 is positioned at a place where it moves for a distance h/2 in the minus direction of the z-axis from the xy-plane. The facing plane (SideA') of the object image displaying face (SideA) is positioned at a place where it moves for a distance h/2 in the plus direction of the z-axis from the xy-plane.

In connection, the source video signals $V_{1A}$, $V_{1B}$, and $V_{1C}$ before the three-dimensional transformation are respectively on the xy-plane on which the screen surface exists. By using the transformation matrix $M_A$ or $M_A'$ described later, the source video signal $V_{1A}$ is mapped on the object image displaying face (SideA) of the rectangular parallelepiped BOX or the facing plane (SideA') by the standard position, the source video signal $V_{1B}$ is mapped on the first side face (SideB) of the rectangular parallelepiped BOX which is positioned at the standard position or the facing plane (SideB'), and the source video signal $V_{1C}$ is mapped on the second side face (SideC) of the rectangular parallelepiped BOX which is positioned at the standard position or the facing plane (SideC').

In this way, when the source video signals $V_{1A}$, $V_{1B}$, and $V_{1C}$ are mapped on respective faces of the rectangular parallelepiped BOX placed at the standard position, the rectangular parallelepiped BOX moves from the standard position to an arbitrary position in the three-dimensional space by the operation of operator, so that the video signals mapped on respective faces of the rectangular parallelepiped BOX by the three-dimensional transformation matrix $T_0$ of which parameters are changed in accordance with the movement of the rectangular parallelepiped BOX, moves in accordance with the movement with keeping the state of sticking on each face of the rectangular parallelepiped BOX.

(5) Mapping on Object Image Displaying Face (SideA)

Figure 9A:
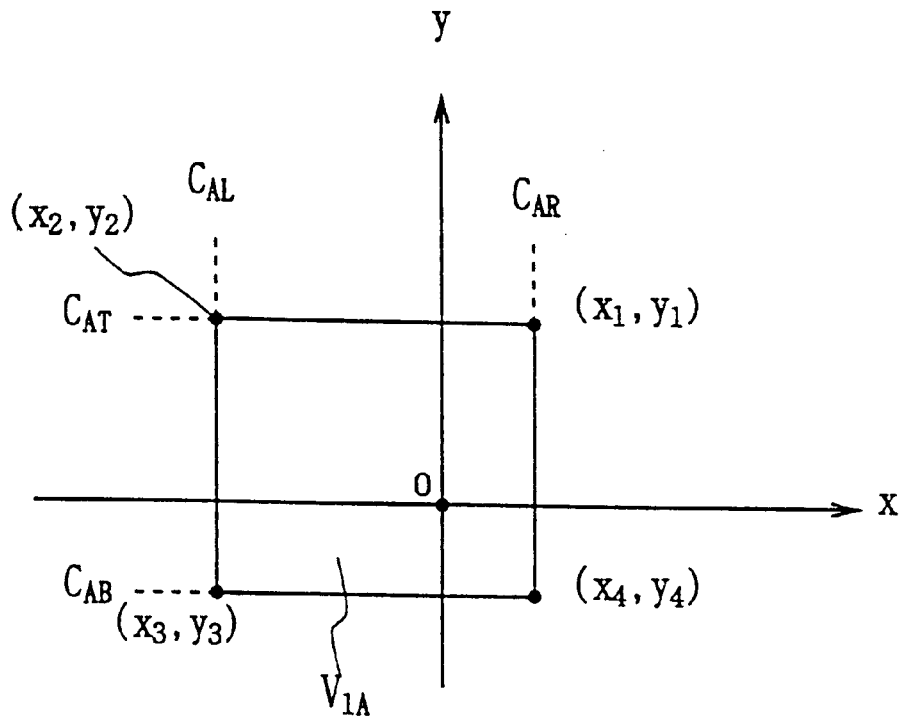
FIGS. 9A and 9B are schematic diagrams explaining the source video signal of an object image.

In the image forming part 20 of FIG. 3, an operator operates to cut the desired area of the source video signal $V_{1A}$ input to the cropping circuit 21. The source video signal $V_{1A}$ is still a two-dimensional image placed on the xy-plane at the time when it is input to the cropping circuit 21. More specifically, in FIG. 9A that the three-dimensional coordinates of xyz is viewed in the plus direction of the z-axis from the position of the view point PZ of the z-axis, when the cropping position of left end of the source video signal $V_{1A}$ on the xy-plane is represented by $C_{AL}$, the cropping position of right end is $C_{AR}$, the cropping position of top end is $C_{AT}$, and the cropping position of bottom end is $C_{AB}$, the coordinates of four apexes of the cropped source video signal $V_{1A}$ are expressed as follows:

$$(x_1, y_1) = (C_{AR}, C_{AT}) \tag{41}$$
$$(x_2, y_2) = (C_{AL}, C_{AT})$$
$$(x_3, y_3) = (C_{AL}, C_{AB})$$
$$(x_4, y_4) = (C_{AR}, C_{AB})$$

Figure 9B:
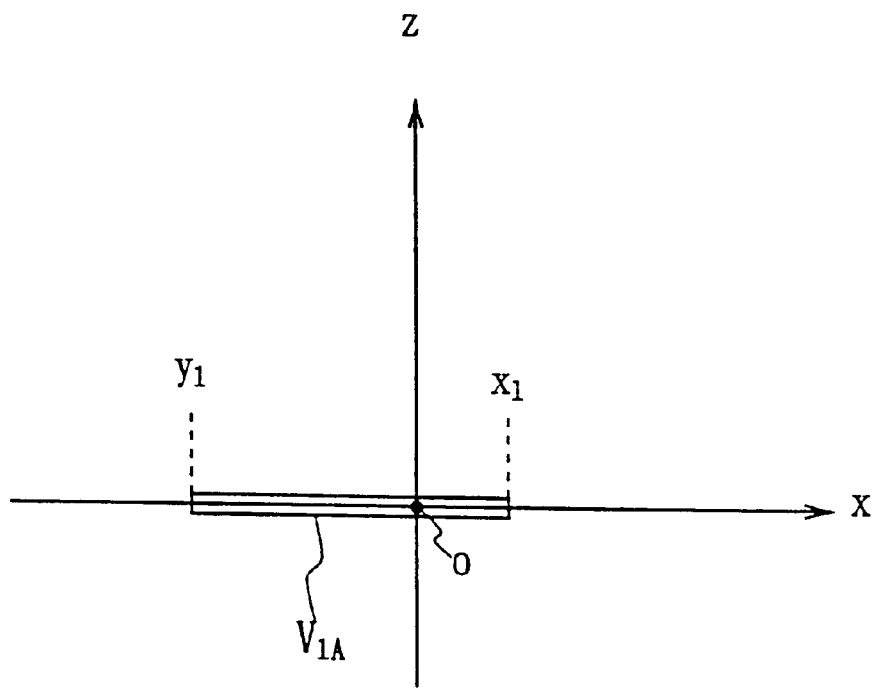

In connection, FIG. 9B shows the state where the three-dimensional coordinates of xyz is viewed from the plus direction of the y-axis to the minus direction of the y-axis. The cropped source video signal $V_{1A}$ exists from a coordinate "$x_2$" of the x-axis over a coordinate "$x_1$" on the xy-plane, and there is no cubic thickness in the z-axis direction.

In this way, the source video signal $V_{1A}$ cropped by the cropping circuit 21 is stored in a frame memory $FM_{22}$ with the state where it is not transformed.

The source video signal $V_{1A}$ stored in the frame memory $FM_{22}$ is parallel displaced to the minus direction of the z-axis for a distance h/2 by the movement matrix $L_A$. The movement matrix $L_A$ is a matrix for making the z-axis coordinates of the source video signal $V_{1A}$ to be $-h/2$, and is expressed by the following equation:

$$L_A = \begin{matrix} 1 & 0 & 0 & 0 \\ 0 & 1 & 0 & 0 \\ 0 & 0 & 1 & 0 \\ 0 & 0 & -h/2 & 1 \end{matrix} \tag{42}$$

Figure 10:
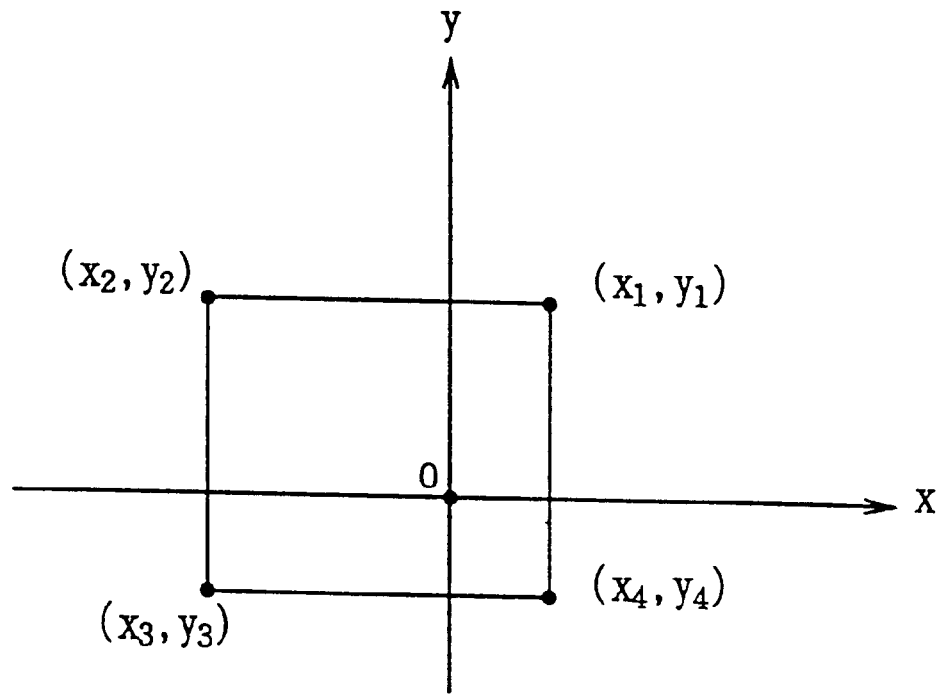
FIGS. 10A and 10B are schematic diagrams explaining the transformation of the object image in the z-axis direction.
Figure 10:
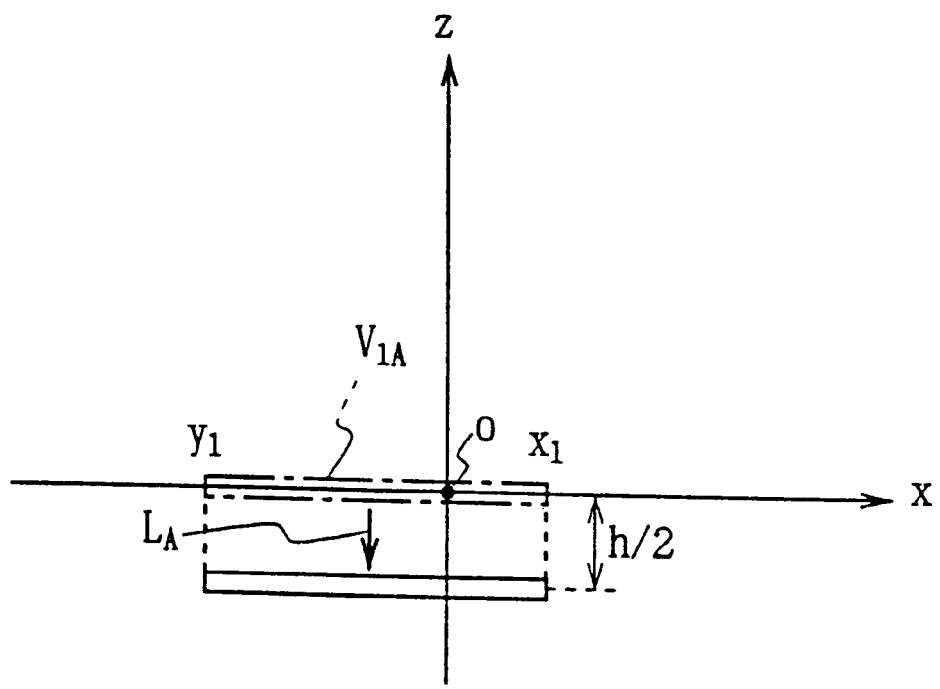

Therefore, as shown in FIG. 10B in which the three-dimensional coordinates of xyz is viewed from the plus direction of the y-axis to the minus direction of the y-axis, the source video signal $V_{1A}$ placed on the xy-plane is parallel displaced for $-h/2$ to the minus direction of the z-axis by the movement matrix $L_A$. As a result, the state is obtained that the source video signal $V_{1A}$ moves to the position ("$-h/2$" in the z-axis) where the object image displaying face (SideA) of the rectangular parallelepiped BOX (FIG. 8) to be mapped exists. In this state, the x-coordinates ($x_2$ to $x_1$) of the source video signal $V_{1A}$ is not changed.

In connection, FIG. 10A shows the state that the source video signal $V_{1A}$ parallel displaced by the movement matrix $L_A$ is viewed from the position of view point PZ on the z-axis. In this state, the coordinates of each apex of the source video signal $V_{1A}$ is not changed.

The rate transformation and the skew transformation are performed by rate/skew transformation matrix $T_{rs}$ on the source video signal $V_{1A}$ thus parallel displaced. The rate transformation is a transformation for two-dimensionally magnifying/reducing the source video signal $V_{1A}$, which is parallel displaced in the minus direction of the z-axis for a distance h/2 on the two-dimensional plane, with a desired magnification/reduction rate in the plus and minus direction of the x-axis and in the plus and minus direction of the y-axis with the center of the source video signal $V_{1A}$. In the rate transformation, when the magnification/reduction rate of the x-axis direction is set to "$r_x$", the magnification/reduction rate of the y-axis is set to "$r_y$", the rate transformation matrix $T_{rate}$ is expressed by the following:

$$T_{rate} = \begin{matrix} r_x & 0 & 0 & 0 \\ 0 & r_y & 0 & 0 \\ 0 & 0 & 1 & 0 \\ 0 & 0 & 0 & 1 \end{matrix} \tag{43}$$

The skew transformation is a transformation for two-dimensionally distorting the source video signal $V_{1A}$, which is parallel displaced in the minus direction of the z-axis for a distance h/2 on the two-dimensional plane, with a desired skew rate respectively in the plus and minus direction of the x-axis and in the plus and minus direction of the y-axis with the center of the source video signal $V_{1A}$ as a standard. In the skew transformation, when the skew rate in the x-axis direction is set to "$s_x$" and the skew rate in the y-axis direction is set to "$s_y$", the skew transformation matrix $T_{skew}$ is expressed by the following equation:

$$T_{skew} = \begin{array}{cccc} 1 & s_x & 0 & 0 \\ s_y & 1 & 0 & 0 \\ 0 & 0 & 1 & 0 \\ 0 & 0 & 0 & 1 \end{array} \quad (44)$$

Therefore, the rate/skew transformation matrix $T_{rs}$ which is a decoding transformation matrix of the rate transformation and the skew transformation is expressed by the following equation:

$$T_{rs} = T_{rate} \cdot T_{skew} \quad (45)$$

$$= \begin{array}{cccc} r_x & 0 & 0 & 0 \\ 0 & r_y & 0 & 0 \\ 0 & 0 & 1 & 0 \\ 0 & 0 & 0 & 1 \end{array} \cdot \begin{array}{cccc} 1 & s_x & 0 & 0 \\ s_y & 1 & 0 & 0 \\ 0 & 0 & 1 & 0 \\ 0 & 0 & 0 & 1 \end{array}$$

$$= \begin{array}{cccc} r_x & r_x s_x & 0 & 0 \\ r_y s_y & r_y & 0 & 0 \\ 0 & 0 & 1 & 0 \\ 0 & 0 & 0 & 1 \end{array}$$

In addition, when the coordinates of four points on the two-dimensional plane which are transformed by the rate/skew transformation matrix $T_{rs}$ are set to $(x_1', y_1')$, $(x_2', y_2')$, $(x_3', y_3')$ and $(x_4', y_4')$, as shown in FIG. 11A, they are expressed by the following equations:

$$(x_1', y_1') = (x_1, y_1) T_{rs} \quad (46)$$
$$= (r_x x_1 + r_y s_y y_1, \ r_x s_x x_1 + r_y y_1)$$
$$(x_2', y_2') = (x_2, y_2) T_{rs}$$
$$= (r_x x_2 + r_y s_y y_2, \ r_x s_x x_2 + r_y y_2)$$
$$(x_3', y_3') = (x_3, y_3) T_{rs}$$
$$= (r_x x_3 + r_y s_y y_3, \ r_x s_x x_3 + r_y y_3)$$
$$(x_4', y_4') = (x_4, y_4) T_{rs}$$
$$= (r_x x_4 + r_y s_y y_4, \ r_x s_x x_4 + r_y y_4)$$

As described above, when a processing for mapping the first source video signal $V_{1A}$ on the object image displaying face (SideA) is arranged, the following equation is obtained from the equations (42) and (45) using $M_A$ as a matrix for representing the mapping processing:

$$M_A = L_A \cdot T_{rs} \quad (47)$$

Thereby, four points $(x_1, y_1)$, $(x_2, y_2)$, $(x_3, y_3)$, and $(x_4, y_4)$ on two-dimensional plane of the source video signal $V_{1A}$ shown in FIG. 9 are mapped on four points $(x_1', y_1', -h/2)$, $(x_2', y_2', -h/2)$, $(x_3', y_3', -h/2)$ and $(x_4', y_4', -h/2)$ of the object image displaying face (SideA) in the three-dimensional space shown in FIGS. 11A and 11B by the matrix $M_A$.

In connection, the transformation processing same as the above case of mapping the source video signal $V_{1A}$ on the object image displaying face (SideA) is performed also on the key signal $K_{1A}$ input to the image forming part 20 corresponding to the first source video signal $V_{1A}$.

(6) Mapping on the Facing Plane (SideA') of Object Image Displaying Face (SideA)

In the image forming part 20 shown in FIG. 3, the source video signal $V_{1A}$ input to the cropping circuit 21 is cut for a desired area by the operation of operator. The source video signal $V_{1A}$ is still a two-dimensional image placed on the xy-plane at the time of inputting to the cropping circuit 21. That is, in FIG. 9A that the three-dimensional coordinates of xyz is viewed in the plus direction of the z-axis from the position of view point PZ of the x-axis, when the cropping position of left end of source video signal $V_{1A}$ on the xy-plane is represented by "$C_{AL}$", the cropping position of right end is "$C_{AR}$", the cropping position of top end is "$C_{AT}$", and the cropping position of bottom end is "$C_{AB}$", the coordinates of four apexes of the cropped source video signal $V_{1A}$ becomes the equation (41) described above.

The source video signal $V_{1A}$ thus cropped at the cropping circuit 21 is stored in the frame memory $FM_{22}$ (FIG. 3) in the state where it is not transformed.

The source video signal $V_{1A}$ stored in the frame memory $FM_{22}$ is parallel displaced for a distance h/2 in the plus direction of the z-axis by the movement matrix $L_A$. The movement matrix $L_A'$ is a matrix for making the z-axis coordinates of source video signal $V_{1A}$ to be +h/2, and is expressed by the following equation:

$$L_A' = \begin{array}{cccc} 1 & 0 & 0 & 0 \\ 0 & 1 & 0 & 0 \\ 0 & 0 & 1 & 0 \\ 0 & 0 & h/2 & 1 \end{array} \quad (48)$$

Therefore, the source video signal $V_{1A}$ placed on xy-plane is parallel displaced for h/2 in the plus direction of the z-axis by the movement matrix $L_A'$. As a result, the state is obtained that the source video signal $V_{1A}$ moves to the position (z-axis coordinate value is +h/2) where the facing plane (SideA') of the object image displaying face (SideA) of the rectangular parallelepiped BOX (FIG. 8) to be mapped exists. In this state, the x-coordinate ($x_2$ to $x_1$) of the source video signal $V_{1A}$ is not changed.

The rate transformation and the skew transformation are performed by rate/skew transformation matrix $T_{rs}$ on the source video signal $V_{1A}$ thus parallel displaced. The rate transformation is a transformation for two-dimensionally magnifying/reducing the source video signal $V_{1A}$, which is parallel displaced in the plus direction of the z-axis for a distance h/2 on the two-dimensional plane, with a desired magnification/reduction rate respectively in the plus and minus direction of the x-axis and in the plus and minus direction of the y-axis with the center of the source video signal $V_{1A}$ as a standard. The rate transformation $T_{rate}$ is expressed by the same equation as the above equation (43).

The skew transformation is a transformation for two-dimensionally distorting the source video signal $V_{1A}$, which is parallel displaced in the plus direction of the z-axis for a distance h/2 on the two-dimensional plane, with a desired skew rate respectively in the plus and minus direction of the x-axis and in the plus and minus direction of the y-axis with the center of the source video signal $V_{1A}$ as a standard. The skew transformation matrix $T_{skew}$ is expressed by the same equation as the above equation (44).

Therefore, the rate/skew transformation matrix $T_{rs}$ which is a decoding transformation matrix of the rate transformation and the skew transformation is also expressed by the same equation as the above equation (45).

In addition, the coordinates of four points $(x_1', y_1')$, $(x_2', y_2')$, $(x_3', y_3')$, and $(x_4', y_4')$ on the two-dimensional plane which are transformed by the rate/skew transformation matrix $T_{rs}$ are expressed by the same equations as the above equations (46).

As described above, when a processing for mapping the first source video signal $V_{1A}$ on the facing plane (SideA') of the object image displaying face (SideA) is arranged, the following equation is obtained using $M_A'$ as a matrix for representing the mapping processing:

$$M_A' = L_A' \cdot T_{rs} \qquad (49)$$

Thereby, four points $(x_1, y_1)$, $(x_2, y_2)$, $(x_3, y_3)$, and $(x_4, y_4)$ on two-dimensional plane of the source video signal $V_{1A}$ shown in FIG. 9 are mapped on four points $(x_1', y_1', -h/2)$, $(x_2', y_2', -h/2)$, $(x_3', y_3', -h/2)$, and $(x_4', y_4', -h/2)$ of the facing plane (SideA') of the object image displaying face (SideA) in three-dimensional space by the matrix $M_A'$.

In connection, the transformation processing same as the above case of mapping the source video signal $V_{1A}$ on the facing plane (Side') of the object image displaying face (SideA) is performed also on the key signal $K_{1A}$ input to the image forming part 20 corresponding to the first source video signal $V_{1A}$.

(7) Mapping on First Side Face (SideB)

In the image forming part 30 of FIG. 3, an operator operates to cut the desired area of the source video signal $V_{1B}$ input to the cropping circuit 31. The source video signal $V_{1B}$ is still a two-dimensional image placed on the xy-plane at the time when it is input to the cropping circuit 31. More specifically, in FIG. 12A that the three-dimensional coordinates of xyz is viewed in the plus direction of the z-axis from the position of the view point PZ of the z-axis, when the cropping position of left end of the source video signal $V_{1B}$ on the xy-plane is represented by $C_{BL}$, the cropping position of right end is $C_{BR}$, the cropping position of top end is $C_{BT}$, and the cropping position of bottom end is $C_{BB}$, the coordinates of four apexes of the cropped source video signal $V_{1B}$ are expressed as follows: $(C_{BR}, C_{BT})$; $(C_{BL}, C_{BT})$; $(C_{BL}, C_{BB})$; and $(C_{BR}, C_{BB})$.

In connection, FIG. 12B shows the state where the three-dimensional coordinates of xyz is viewed from the plus direction of the y-axis to the minus direction of the y-axis. The cropped source video signal $V_{1B}$ exists from "$C_{BL}$" over "$C_{BR}$" on the xy-plane, and there is no cubic thickness in the z-axis direction.

In this way, the source video signal $V_{1B}$ cropped at the cropping circuit 31 is stored in a frame memory $FM_{32}$ (FIG. 3) with the state where it is not transformed.

The source video signal $V_{1B}$ stored in the frame memory $FM_{32}$ after it has been cropped by the cropping circuit 31 is parallel displaced by a parallel movement matrix $L_{BO}$ so that the center of the cropped source video signal $V_{1B}$ is positioned at the origin O of xy-plane. From the coordinates position of four points $C_{BL}$, $C_{BR}$, $C_{BT}$, and $C_{BB}$ shown by cropping, the parallel movement matrix $L_{BO}$ is expressed by the following equation:

$$L_{BO} = \begin{bmatrix} 1 & 0 & 0 & 0 \\ 0 & 1 & 0 & 0 \\ 0 & 0 & 1 & 0 \\ -(C_{BR}+C_{BL})/2 & -(C_{BT}+C_{BB})/2 & 0 & 1 \end{bmatrix} \qquad (50)$$

Figure 13:
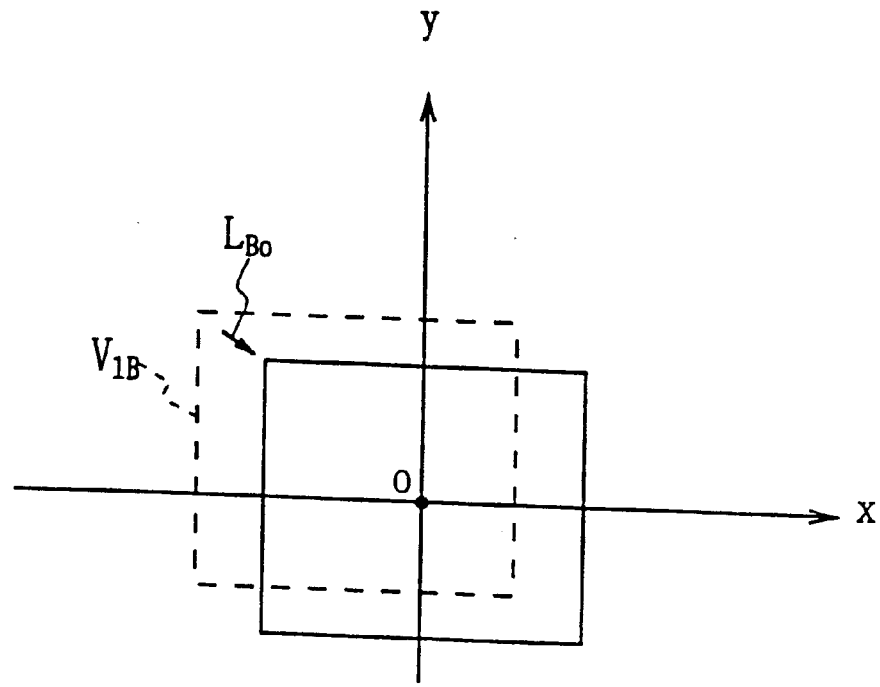
FIGS. 13A and 13B are schematic diagrams explaining the parallel movement of the source video signal of the first side face image.
Figure 13:
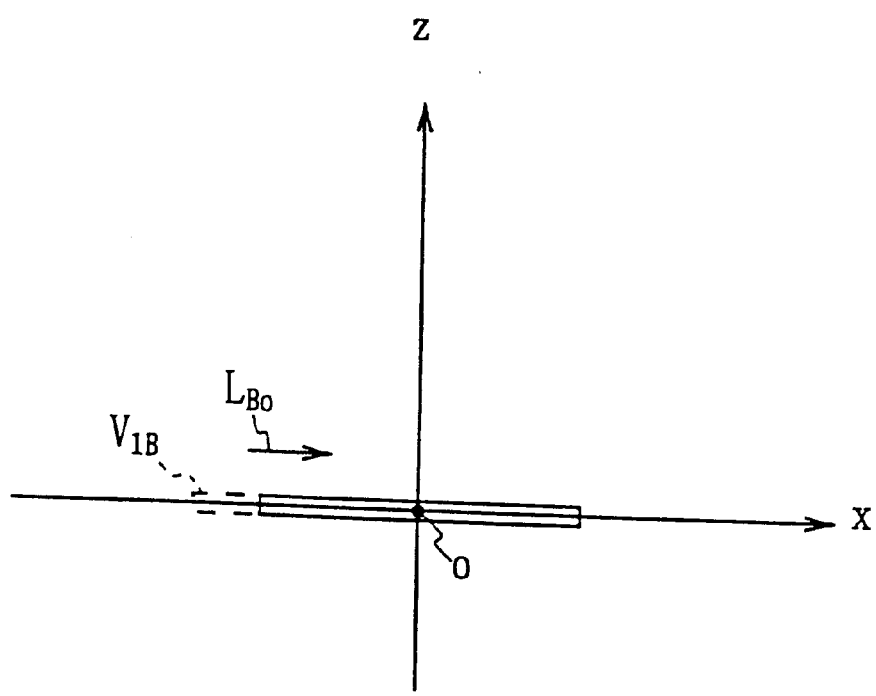

Therefore, as shown in FIG. 13A in which the three-dimensional coordinates of xyz is viewed from the position of view point PZ on the z-axis, the source video signal $V_{1B}$ is so moved by the parallel movement matrix $L_{BO}$ that the center of the source video signal $V_{1B}$ overlaps with the origin O.

In connection, FIG. 13B shows the state that the three-dimensional coordinates of xyz is overlooked from the plus direction of the y-axis to the minus direction of the y-axis, and it can be found that the source video signal $V_{1B}$ moves on the xy-plane by the parallel movement matrix $L_{BO}$.

The magnification and reduction are performed by magnification/reduction matrix $S_B$ on the source video signal $V_{1B}$ thus parallel displaced. The magnification or reduction is for magnifying or reducing the source video signal $V_{1B}$ in the x-axis direction, so that the length in the x-direction of the cropped source video signal $V_{1B}$ coincides with the length of an edge $H_B$ which comes in contact with the first side face (SideB) of the object image displaying face (SideA) described above in FIG. 8, and simultaneously for magnifying or reducing the source video signal $V_{1B}$ in the y-axis direction, so that the length in the y-direction of the source video signal $V_{1B}$ coincides with the thickness "h" of the rectangular parallelepiped BOX described above in FIG. 6.

In this magnification/reduction, when the magnification/reduction rate in the x-axis direction is set to $r_{Bx}$, and the magnification/reduction rate in the y-axis direction is $r_{By}$, the following equations can be obtained:

$$r_{Bx} = \frac{H_B}{C_{BR} - C_{BL}} \qquad (51)$$

$$r_{By} = \frac{h}{C_{BT} - C_{BB}}$$

using the length in x-axis direction of the cropped source video signal $V_{1B}$, $(C_{BR}-C_{BL})$, and the length in the y-axis direction, $(C_{BT}-C_{BB})$. Therefore, when the magnification/reduction rate "$r_x$" in the x-axis direction and the magnification/reduction rate "$r_y$" in the y-axis direction of the rate transformation matrix $T_{rate}$ described above in the equation (43) are replaced to the magnification/reduction rates "$r_{Bx}$" and "$r_{By}$" expressed by the equation (51) respectively, the magnification/reduction transformation matrix $S_B$ is represented by the following equation:

$$S_B = \begin{bmatrix} r_{Bx} & 0 & 0 & 0 \\ 0 & r_{By} & 0 & 0 \\ 0 & 0 & 1 & 0 \\ 0 & 0 & 0 & 1 \end{bmatrix} \qquad (52)$$

Figure 14:
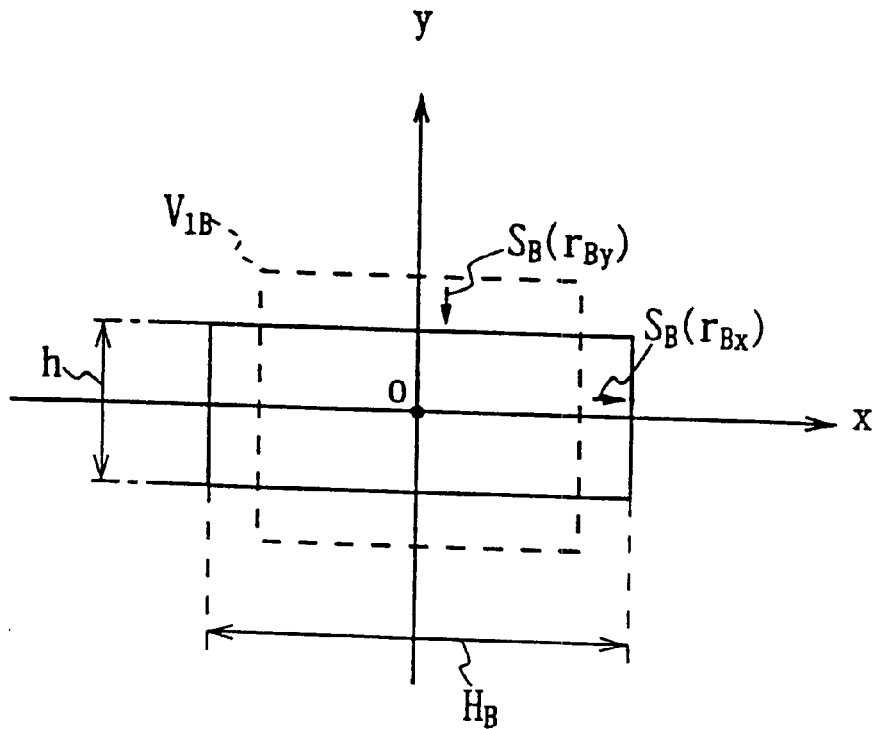
FIGS. 14A and 14B are schematic diagrams explaining the transformation of the source video signal of the first side face image.
Figure 14:
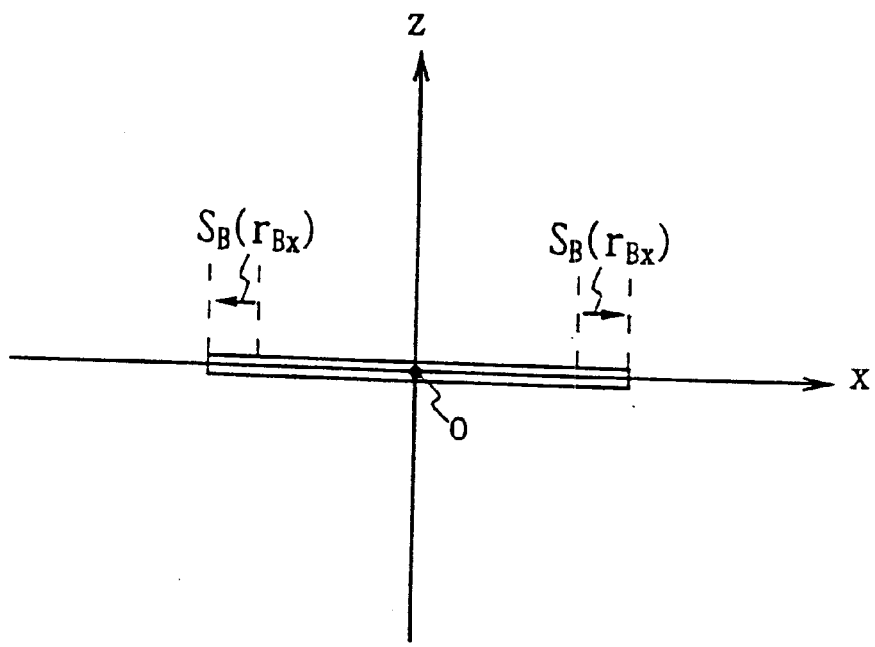

Therefore, as shown in FIG. 14A, the cropped source video signal $V_{1B}$, which is placed at a position where the center overlaps with the origin O, is magnified and reduced in the x-axis direction and y-axis direction by the magnification/reduction transformation matrix $S_B$, with the origin O being centered. At this time, as shown in FIG. 14B that the three-dimensional coordinates of xyz is overlooked from the plus direction of the y-axis to the minus direction, in the transformation of the source video signal $V_{1B}$ by the magnification/reduction transformation matrix $S_B$, it can be found that the source video signal $V_{1B}$ is two-dimensionally transformed on the xy-plane.

Figure 15:
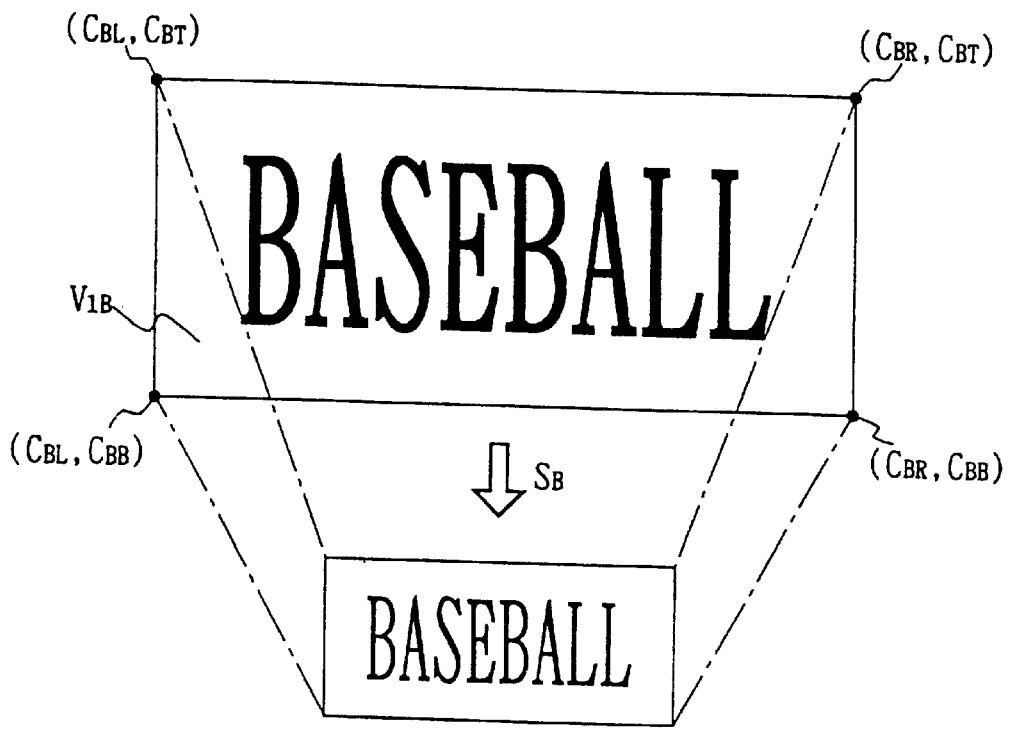
FIG. 15A is a schematic diagram explaining the cropping priority mode.
FIG. 15B is a schematic diagram explaining the reduction/magnification rate priority mode.
Figure 15:
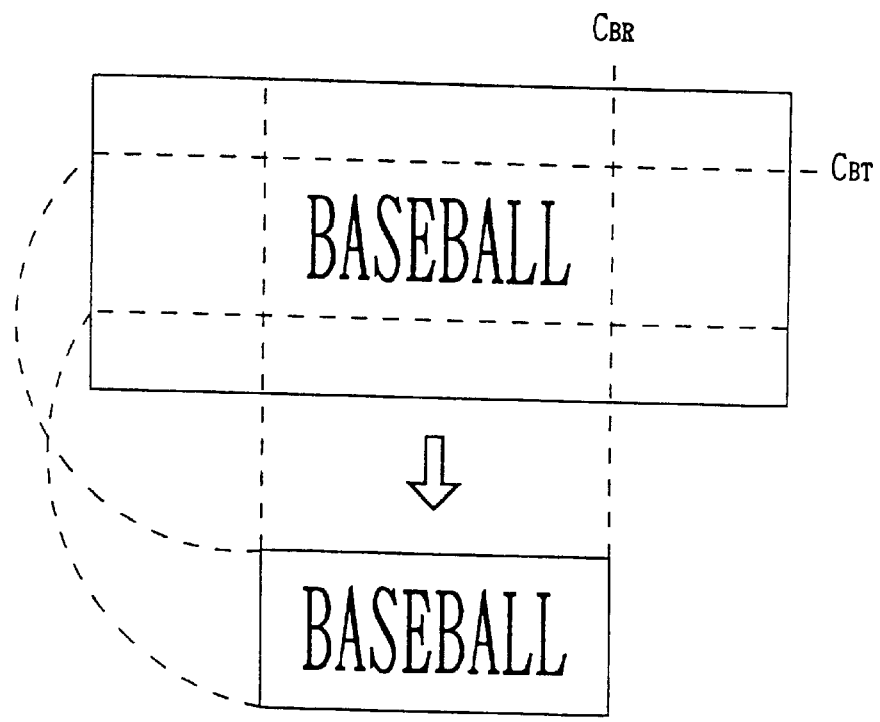

In addition, in this embodiment, the magnification/reduction rate $r_{Bx}$ and $r_{By}$ which are matched to the edge $H_B$ of the object image displaying face (SideA) and the thickness "h" are obtained from the four cropping values $C_{BR}$, $C_{BL}$, $C_{BT}$, and $C_{BB}$ specified by operator. Thereby, as shown in FIG. 15A, the area of the source video signal $V_{1B}$ cropped by the four points $(C_{BL}, C_{BT})$, $(C_{BR}, C_{BT})$, $(C_{BL}, C_{BB})$, and $(C_{BR}, C_{BB})$ is magnified or reduced as a whole (this is referred to as "cropping priority").

On the contrary, the operator can directly crop the source vido signal $V_{1B}$ with the desired magnification/reduction rate by inputting the magnification/reduction rate $r_{Bx}$ and $r_{By}$ and two cropping values $C_{BR}$ and $C_{BB}$. In this case, as shown in FIG. 15B, both of magnification/reduction rate are set to "1" to input two cropping values $C_{BR}$ and $C_{BT}$, so that the image in necessary area is cut as it is to obtain the necessary magnified/reduced image.

The source video signal $V_{1B}$ thus magnified or reduced is rotated for 90° around the x-axis by the rotational transformation matrix $R_{Bx}$. the rotational transformation matrix $R_{Bx}$ is a matrix for transforming the source video signal $V_{1B}$ on xy-plane onto xz-plane, and is expressed by the following equation:

$$R_{Bx} = \begin{array}{cccc} 1 & 0 & 0 & 0 \\ 0 & \cos(\pi/2) & -\sin(\pi/2) & 0 \\ 0 & \sin(\pi/2) & \cos(\pi/2) & 0 \\ 0 & 0 & 0 & 1 \end{array} \quad (53)$$

$$= \begin{array}{cccc} 1 & 0 & 0 & 0 \\ 0 & 0 & -1 & 0 \\ 0 & 1 & 0 & 0 \\ 0 & 0 & 0 & 1 \end{array}$$

Figure 16:
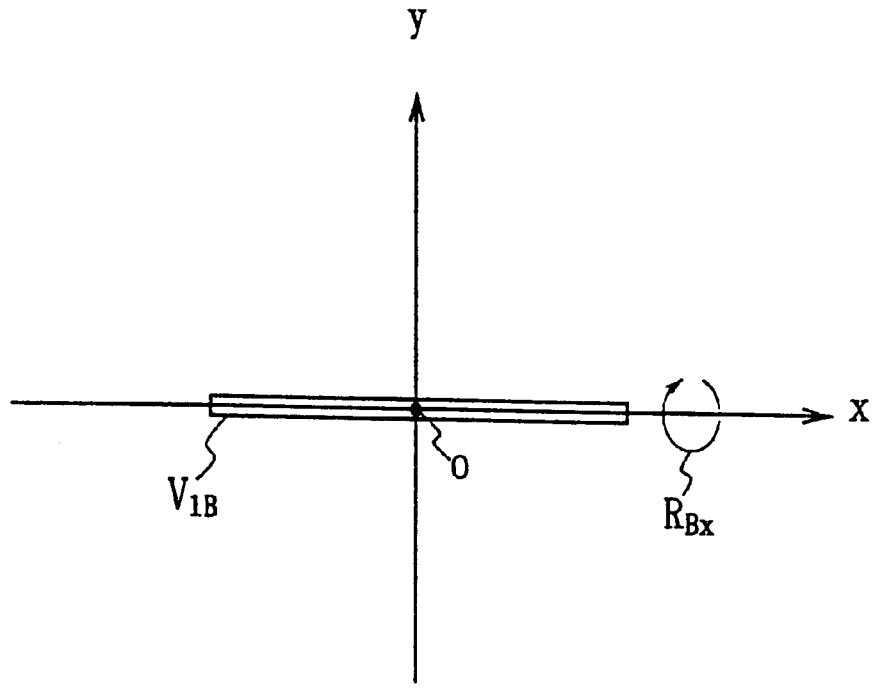
FIGS. 16A and 16B are schematic diagrams explaining the rotating transformation around the x-axis of the source video signal of the first side face image.
Figure 16:
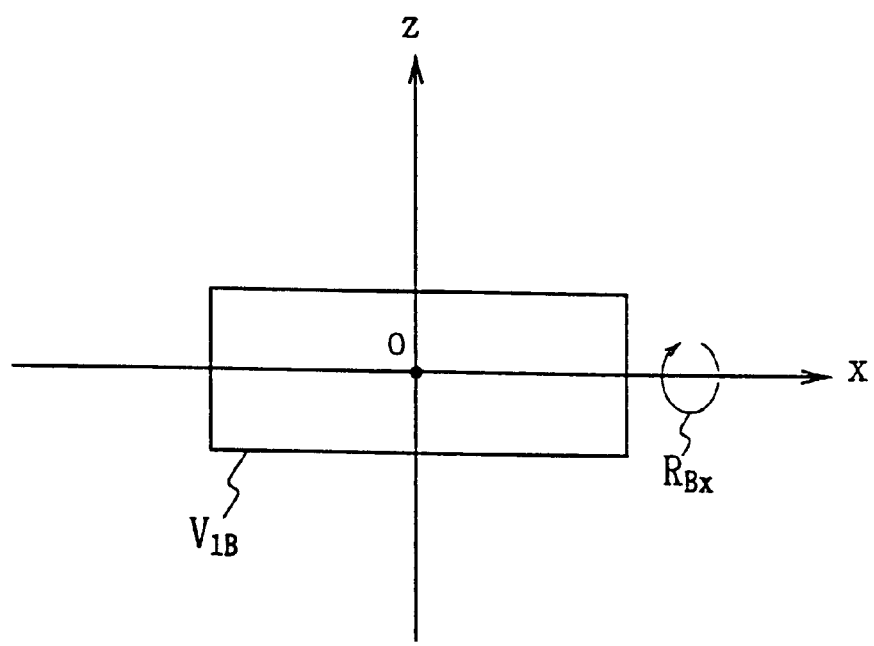

Therefore, the magnified/reduced source video signal $V_{1B}$ on the xy-plane described above in FIG. 14 is rotationally transformed on the xz-plane by the rotational transformation matrix $R_{Bx}$, as shown in FIG. 16B that the three-dimensional coordinates of xyz is overlooked from the plus direction of the y-axis to the minus direction. As a result, the first side face (SideB) of the rectangular parallelepiped BOX (FIG. 8) on which an image is mapped is positioned at an angle of 90° for the object image displaying face (SideA), so that the source video signal (FIG. 16B) is rotationally displaced to a position of the same angle (90°) for the object image displaying face (SideA).

In connection, FIG. 16A shows the state where the source video signal $V_{1B}$ transformed on the xz-plane by the rotational transformation matrix $R_{Bx}$ is viewed from a position of view point PZ on the z-axis. In this state, the source video signal $V_{1B}$ has no thickness in the y-axis direction.

The source video signal $V_{1B}$ (FIG. 16) thus transformed on xz-plane is rotated by a predetermined angle $\theta_B$ around the z-axis by the rotational transformation matrix $R_{Bz}$. The rotational transformation matrix $R_{Bz}$ is a transformation matrix for inclining the source vido signal $V_{1B}$ (FIG. 16) on the xz-plane by a predetermined angle $\theta_B$ for the x-axis, and is expressed by the following equation:

$$R_{Bz} = \begin{array}{cccc} \cos\theta_B & -\sin\theta_B & 0 & 0 \\ \sin\theta_B & \cos\theta_B & 0 & 0 \\ 0 & 0 & 1 & 0 \\ 0 & 0 & 0 & 1 \end{array} \quad (54)$$

Figure 17A:
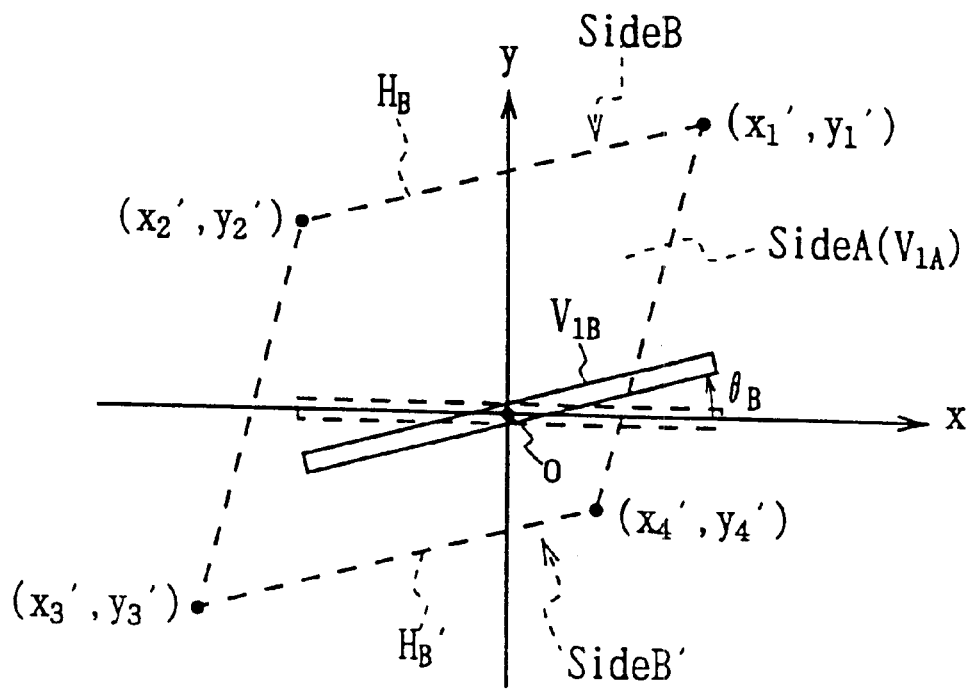
FIGS. 17A and 17B are schematic diagrams explaining the case where the source video signal of the first side face image is inclined by an angle $\theta_B$ for the x-axis.

Therefore, the source video signal $V_{1B}$ on the xz-plane described above in FIG. 16 is rotationally transformed at a position where the it is inclined by a predetermined angle $\theta_B$ for the x-axis with the origin O being centered, as shown in FIG. 17A that the three-dimensional coordinates of xyz is viewed from the position of view point PZ on the z-axis. As a result, the source video signal $V_{1A}$ to be mapped on the object image displaying face (SideA) of the rectangular parallelepiped BOX (FIG. 8) is skew transformed as described above in FIG. 11, so that the source video signal (FIG. 17A) rotationally transformed by the rotational transformation matrix $R_{Bz}$ is rotationally displaced to a position parallel to the first side face (SideB), with keeping an angle at 90° for the object image displaying face (SideA).

Figure 11:
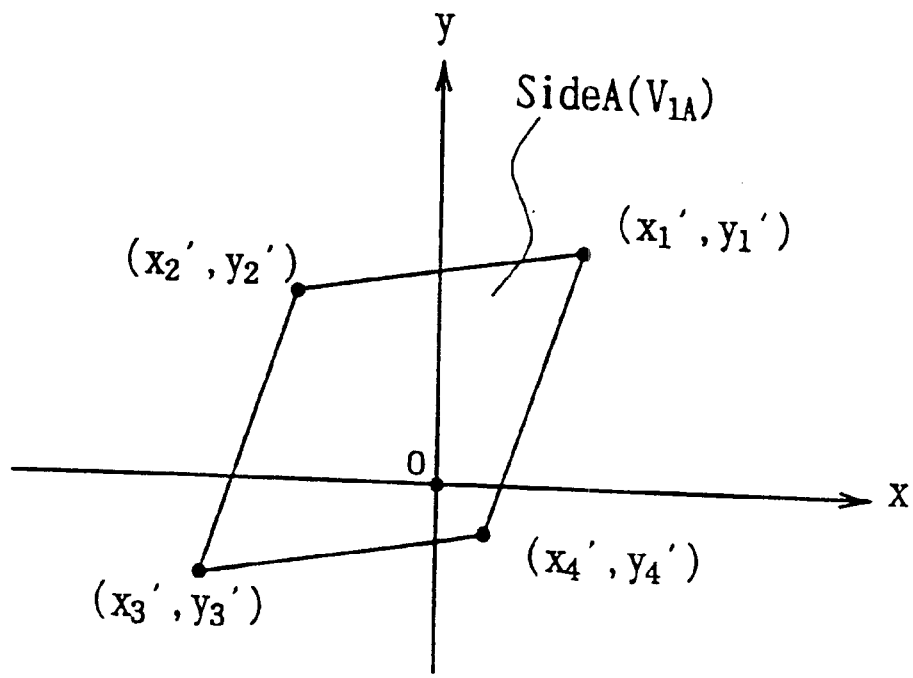
FIGS. 11A and 11B are schematic diagrams explaining the change of the object image.
Figure 11:
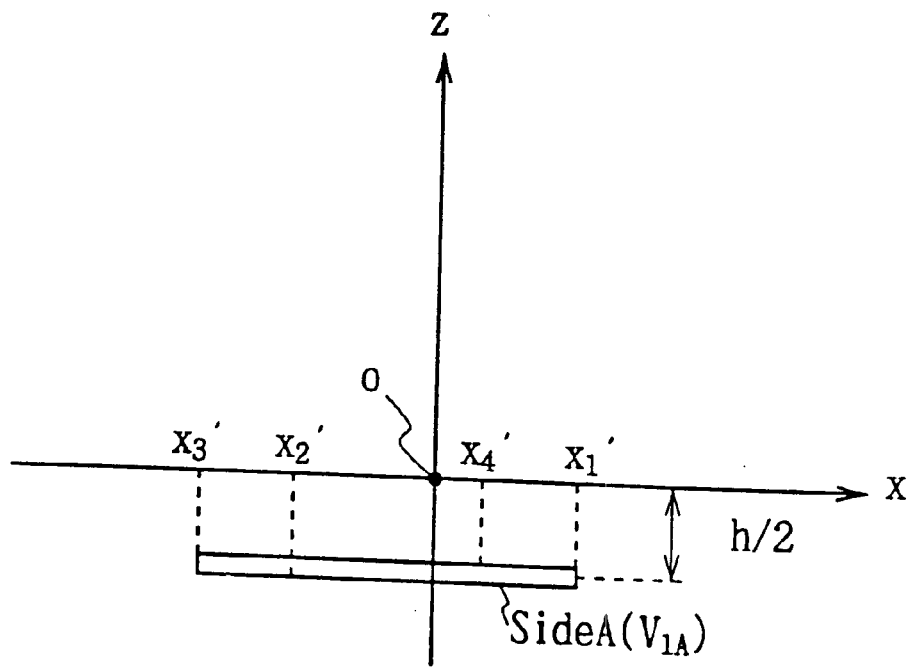

The parameter $\theta_B$ of the rotational transformation matrix $R_{Bz}$ can be obtained from the coordinate values of two points $(x_1', y_1')$, $(x_2', y_2')$, or $(x_4', y_4')$, $(x_3', y_3')$ of the first source video signal $V_{1A}$ skewed in FIG. 11, which can be represented by the following equation:

$$\theta_B = \tan^{-1}(-(y_1'-y_2'), (x_1'-x_2')) \quad (55)$$

Figure 17B:
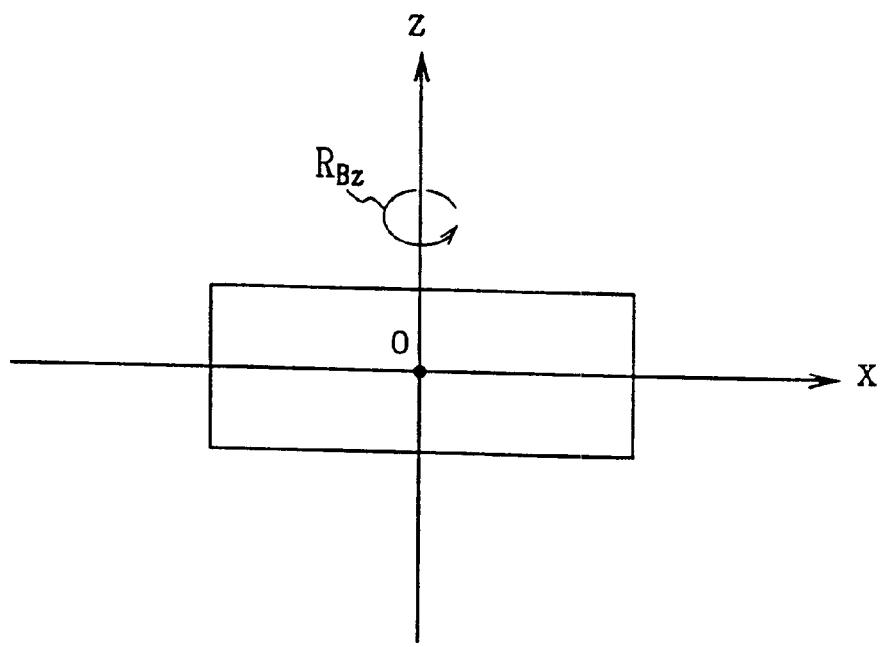

In connection, FIG. 17B shows the state that the source video signal $V_{1B}$ which is rotationally displaced by the rotational transformation matrix $R_{Bz}$ is viewed from the plus direction of the y-axis to the minus direction of the y-axis.

The source video signal $V_{1B}$ (FIGS. 17A and 17B) rotationally transformed so as to incline for a predetermined angle $\theta_B$ for the x-axis is parallel displaced along the xy-plane by the parallel movement matrix $L_B$. The parallel movement matrix $L_B$ is a transformation matrix for displacing the source video signal $V_{1B}$ shown in FIGS. 17A and 17B so as to overlap on the first side face (SideB) of the rectangular parallelepiped BOX. In this case, the edge $H_B$ of the first side face (SideB) of the object image displaying face (SideA) in FIGS. 17A and 17B is represented by a straight line connecting two points $(x_1', y_1')$ and $(x_2', y_2')$. Therefore, to map the source video signal $V_{1B}$ shown in FIGS. 17A and 17B on the first side face (SideB), it is needed that the source video signal $V_{1B}$ is displaced so as to coincide with the edge $H_B$ by the parallel movement matrix $L_B$.

The source video signal $V_{1B}$ may be parallel displaced so that the center of the source video signal $V_{1B}$ coincides with the middle position of the two points $(x_1', y_1')$ and $(x_2', y_2')$. The parallel movement matrix $L_B$ is expressed by the following equation:

$$L_B = \begin{array}{cccc} 1 & 0 & 0 & 0 \\ 0 & 1 & 0 & 0 \\ 0 & 0 & 1 & 0 \\ \frac{(x_1'+y_1')}{2} & \frac{(x_2'+y_2')}{2} & 0 & 1 \end{array} \quad (56)$$

Figure 18A:
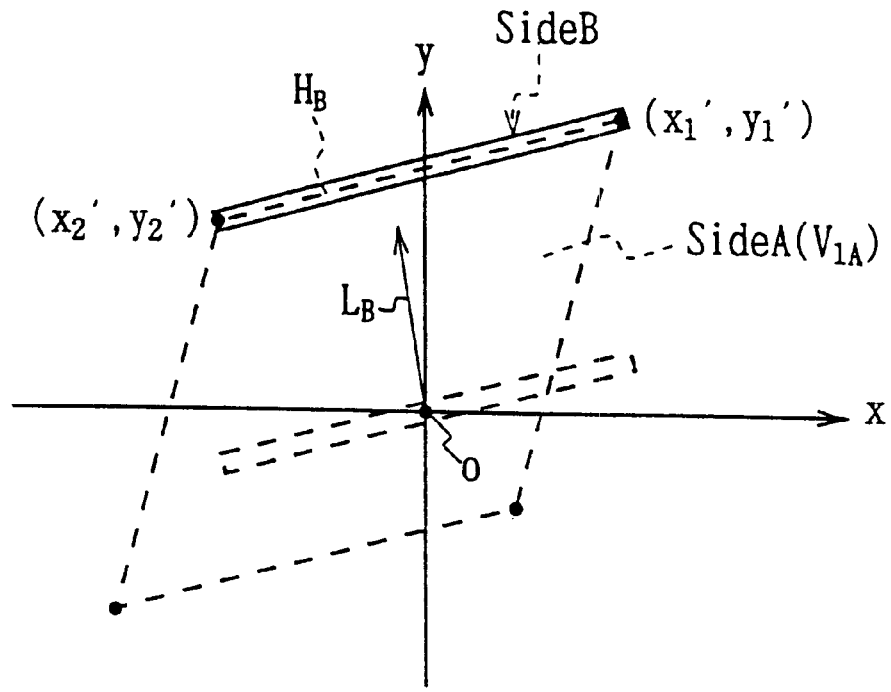
FIGS. 18A and 18B are schematic diagrams explaining the movement for overlapping the source video signal of a first side face image on the first side face of the solid.

Therefore, the source video signal $V_{1B}$ described above in FIGS. 17A and 17B is parallel displaced on the xy-plane by the parallel movement matrix $L_B$ so as to coincide with the edge $H_B$, thereby mapped on the first side face (SideB) of the rectangular parallelepiped BOX (FIG. 8), as shown in FIG. 18A in which the three-dimensional coordinates of xyz is viewed from the view point PZ.

Figure 18B:
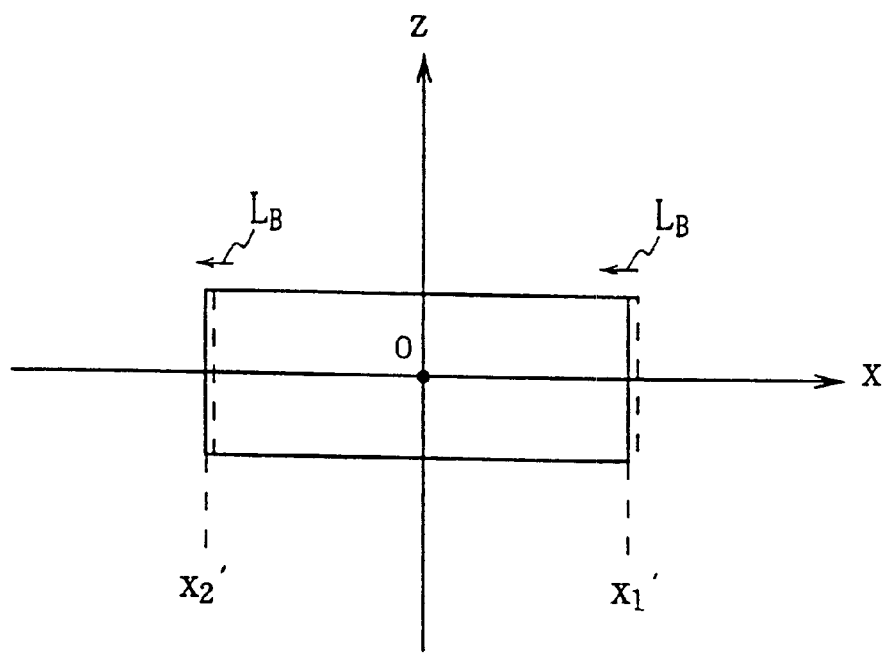

In addition, FIG. 18B shows the state where the source video signal $V_{1B}$ parallel displaced by the parallel movement matrix $L_B$ is viewed from the plus direction of the y-axis to the minus direction of the y-axis.

As described above, when a processing of mapping the second source video signal $V_{1B}$ on the first side face (SideB) is arranged, with setting a matrix representing the mapping processing to "$M_B$", the following equation can be obtained:

$$M_B = L_{BO} \cdot S_B \cdot B_{Bx} \cdot R_{Bz} \cdot L_B \quad (57)$$

Therefore, the source video signal $V_{1B}$ on xy-plane shown in FIGS. 12A and 12B is mapped on the first side face (SideB) of the rectangular parallelepiped BOX (FIG. 8).

In connection, the same transformation processing as the case described above of mapping the source video signal $V_{1B}$ on the first side face (SideB) is performed also on the key signal $K_{1B}$ input to the image forming part 30 corresponding to the second source video signal $V_{1B}$.

(8) Mapping on Facing Plane (SideB') of First Side Face (SideB)

In the image forming part 30 of FIG. 3, an operator operates to cut the desired area of the source video signal $V_{1B}$ input to the cropping circuit 31. The source video signal $V_{1B}$ is still a two-dimensional image placed on the xy-plane at the time when it is input to the cropping circuit 31. More specifically, in FIG. 12A that the three-dimensional coordinates of xyz is viewed toward the plus direction of the z-axis from the position of the view point PZ of the z-axis, when the cropping position of left end of the source video signal $V_{1B}$ on the xy-plane is represented by "$C_{BL}$", the cropping position of right end is "$C_{BR}$", the cropping position of top end is "$C_{BT}$", and the cropping position of bottom end is "$C_{BB}$", the coordinates of four apexes of the cropped source video signal $V_{1B}$ are expressed as follows: $(C_{BR}, C_{BT})$; $(C_{BL}, C_{BT})$; $(C_{BL}, C_{BB})$; and $(C_{BR}, C_{BB})$.

The source video signal $V_{1B}$ thus cropped at the cropping circuit 31 is stored in a frame memory $FM_{32}$ (FIG. 3) with the state where it is not transformed.

The source video signal $V_{1B}$ stored in the frame memory $FM_{32}$ after it has been cropped by the cropping circuit 31 is parallel displaced by a parallel movement matrix $L_{BO}$ so that the center of the cropped source video signal $V_{1B}$ is positioned at the origin O of xy-plane. The parallel movement matrix $L_{BO}$ has the same equation as the equation (50) described above. Therefore, as described in FIG. 13A, the source video signal $V_{1B}$ is so moved by the parallel movement matrix $L_{BO}$ that the center of the source video signal $V_{1B}$ overlaps with the origin O.

The magnification and reduction are performed by magnification/reduction matrix $S_B$ on the source video signal $V_{1B}$ thus parallel displaced. The magnification/reduction transformation matrix $S_B$ is the same equation as the equation (52) described above.

Therefore, similar to the case shown in FIG. 14A, the cropped source video signal $V_{1B}$, which is placed at a position where the center overlaps with the origin O, is magnified and reduced in the x-axis direction and the y-axis direction by the magnification/reduction transformation matrix $S_B$, with the origin O being centered.

In addition, in mapping on the facing plane (SideB'), similar to the case described in FIG. 15A, the magnification/reduction rate $r_{Bx}$ and $r_{By}$ which are suited for the edge $H_B$ of the object image displaying face (SideA) and the thickness "h" are obtained from the four cropping values $C_{BR}$, $C_{BL}$, $C_{BT}$, and $C_{BB}$ specified by operator. Thereby, the area of the source video signal $V_{1B}$ cropped by the four points $(C_{BL}, C_{BT})$, $(C_{BR}, C_{BT})$, $(C_{BL}, C_{BB})$, and $(C_{BR}, C_{BB})$ is magnified or reduced as a whole (this is referred to as "cropping priority").

On the contrary, the operator can directly crop the source video signal $V_{1B}$ with the desired magnification/reduction rate by inputting the magnification/reduction rate $r_{Bx}$ and $r_{By}$ and two cropping values $C_{BR}$ and $C_{BB}$. In this case, as described relating to FIG. 15B, both of magnification/reduction rate are set to "1" to input two cropping values $C_{BR}$ and $C_{BT}$, so that the image in necessary area is cut as it is to obtain the necessary magnified/reduced image.

The source video signal $V_{1B}$ thus magnified or reduced is rotated for 90° around the x-axis by the rotational transformation matrix $R_{Bx}$. The rotational transformation matrix $R_{Bx}$ is the same equation as the equation (53). Therefore, the magnified/reduced source video signal $V_{1B}$ on xy-plane is rotationally transformed onto xz-plane by the rotational transformation matrix $R_{Bx}$, as described in FIG. 16. As a result, the facing plane (SideB') of the first side face (SideB) of the rectangular parallelepiped BOX (FIG. 8) to be mapped is positioned at an angle of 90° for the object image displaying face (SideA), so that the source video signal (FIG. 16(B)) is rotationally displaced to a position of the same angle (90°) for the object image displaying face (SideA).

The source video signal $V_{1B}$ (FIGS. 16A and 16B) thus transformed on the xz-plane is rotated by a predetermined angle $\theta_B$ around the z-axis by the rotational transformation matrix $P_{Bz}$. The rotational transformation matrix $R_{Bz}$, is a transformation matrix for inclining the source video signal $V_{1B}$ (FIGS. 16A and 16B) on the xz-plane by a predetermined angle $\theta_B$ for the x-axis, and is expressed by the same equation as the equation (54) described above. Therefore, the source video signal $V_{1B}$ on the xz-plane described above in FIGS. 16A and 16B is rotationally transformed to a position where the it is inclined for a predetermined angle $\theta_B$ from the x-axis with the origin O being centered, as described relating to FIGS. 17A and 17B. As a result, the source video signal $V_{1A}$ to be mapped on the object image displaying face (SideA) of the rectangular parallelepiped BOX (FIG. 8) is skew-transformed as described above in FIG. 11, so that the source video signal (FIG. 17A) rotationally transformed by the rotational transformation matrix $R_{Bz}$ is rotationally displaced to a position parallel to facing plane (SideB') of the first side face (SideB), with keeping an angle at 90° for the object image displaying face (SideA).

The parameter $\theta_B$ of the rotational transformation matrix $R_{Bz}$ can be obtained from the coordinate values of two points $(x_1', y_1')$ and $(x_2', y_2')$, or $(x_4', y_4')$ and $(x_3', y_3')$ of the first source video signal $V_{1A}$ skewed in FIGS. 11A and 11B, which can be represented by the same equation as the equation (55).

The source video signal $V_{1B}$ (FIGS. 17A and 17B) rotationally transformed so as to incline by a predetermined angle $\theta_B$ for the x-axis is parallel displaced along the xy-plane by the parallel movement matrix $L_B'$. The parallel movement matrix $L_B$ is a transformation matrix for displacing the source video signal $V_{1B}$ shown in FIGS. 17A and 17B so as to overlap on the facing plane (SideB') of the first side face (SideB) of the rectangular parallelepiped BOX (FIG. 8). In this case, the edge $H_B'$ of the facing plane (SideB') facing to the edge $H_B'$ of the first side face (SideB) of the object image displaying face (SideA) in FIGS. 17A and 17B is represented by a straight line connecting two points $(x_4', y_4')$ and $(x_3', y_3')$. Therefore, to map the source video signal $V_{1B}$ shown in FIGS. 17A and 17B on the facing plane (SideB') of the first side face (SideB), it is needed that the source video signal $V_{1B}$ is displaced so as to coincide with the edge $H_B'$ by the parallel movement matrix $L_B'$.

Therefore, the source video signal $V_{1B}$ may be parallel displaced so that the center of the source video signal $V_{1B}$ coincides with the middle position of the two points $(x_4', y_4')$ and $(x_3', y_3')$. The parallel movement matrix $L_B'$ is expressed by the following equation:

$$L_B' = \begin{matrix} 1 & 0 & 0 & 0 \\ 0 & 1 & 0 & 0 \\ 0 & 0 & 1 & 0 \\ \frac{(x_4'+x_3')}{2} & \frac{(y_4'+y_3')}{2} & 0 & 1 \end{matrix} \quad (58)$$

Therefore, the source video signal $V_{1B}$ described above relating to FIGS. 17A and 17B is parallel displaced on the xy-plane by the parallel movement matrix $L_B'$ so as to coincide with the edge $H_B'$, thereby it is mapped on the facing plane (SideB') of the first side face (SideB) of the rectangular parallelepiped BOX (FIG. 8).

As described above, when a processing of mapping the second source video signal $V_{1B}$ on the facing plane (SideB') of the first side face (SideB) is arranged, with setting a matrix representing the mapping processing to "$M_B'$", the following equation can be obtained from the equations (50), (52), (53), (54), and (58):

$$M_B' = L_{BO} \cdot S_B \cdot R_{Bx} \cdot R_{Bz} \cdot L_B' \tag{59}$$

Figure 12:
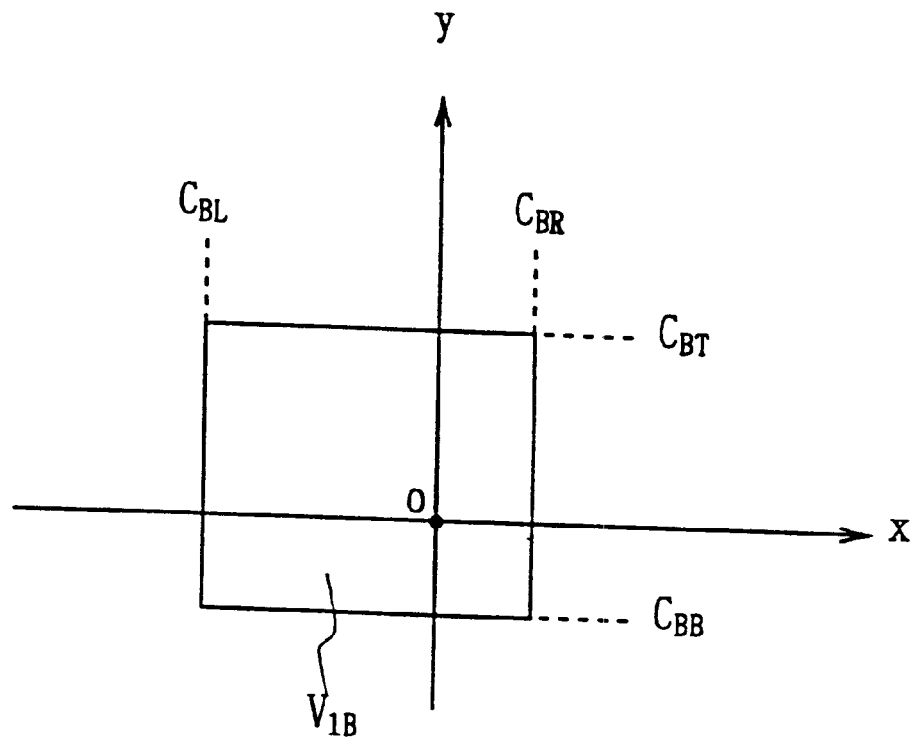
FIGS. 12A and 12B are schematic diagrams explaining the source video signal of a first side face image.
Figure 12:
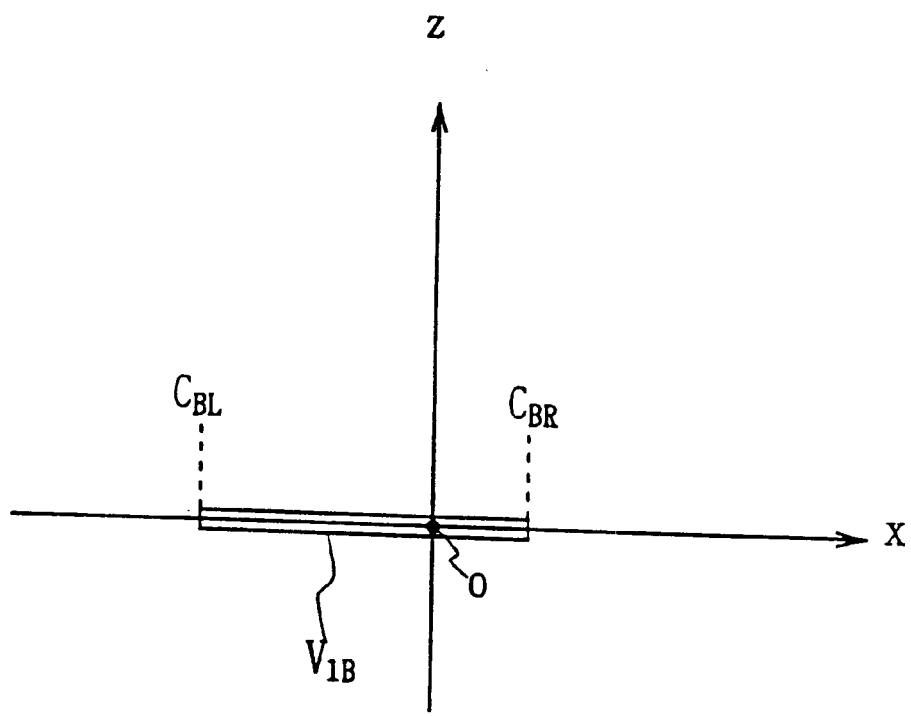

Therefore, the source video signal $V_{1B}$ on xy-plane shown in FIG. 12 is mapped on the facing plane (SideB') of the first side face (SideB) of the rectangular parallelepiped BOX (FIG. 8).

In connection, the same transformation processing as the case described above of mapping the source video signal $V_{1B}$ on the facing plane (SideB') of the first side face (SideB) is performed also on the key signal $K_{1B}$ input to the image forming part 30 corresponding to the second source video signal $V_{1B}$.

(9) Mapping on Second Side Face (SideC)

In the image forming part 40 of FIG. 3, an operator operates to cut the desired area of the source video signal $V_{1C}$ input to the cropping circuit 41. The source video signal $V_{1C}$ is still a two-dimensional image placed on the xy-plane at the time when it is input to the cropping circuit 41. More specifically, in FIG. 19A that the three-dimensional coordinates of xyz is viewed in the plus direction of the z-axis from the position of the view point PZ of the z-axis, when the cropping position of left end of the source video signal $V_{1C}$ on the xy-plane is represented by $C_{CL}$, the cropping position of right end is $C_{CR}$, the cropping position of top end is $C_{CT}$, and the cropping position of bottom end is $C_{CB}$, the coordinates of four apexes of the cropped source video signal $V_{1C}$ are expressed as follows: ($C_{CR}$, $C_{CT}$); ($C_{CL}$, $C_{CT}$); ($C_{CL}$, $C_{CB}$); and ($C_{CR}$, $C_{CB}$)

In connection, FIG. 19B shows the state where the three-dimensional coordinates of xyz is viewed from the plus direction of the y-axis to the minus direction of the y-axis. The cropped source video signal $V_{1C}$ exists from "$C_{1C}$" over "$C_{CR}$" on the xy-plane, and there is no cubic thickness in the z-axis direction.

The source video signal $V_{1C}$ thus cropped at the cropping circuit 41 is stored in a frame memory $FM_{42}$ (FIG. 3) with the state where it is not transformed.

The source video signal $V_{1C}$ stored in the frame memory $FM_2$ after it has been cropped by the cropping circuit 41 is parallel displaced by a parallel movement matrix $L_{CO}$ so that the center of the cropped source video signal $V_{1C}$ is positioned at the origin O of xy-plane. From the coordinates position of four points $C_{CL}$, $C_{CR}$, $C_{CT}$, and $C_{CB}$ specified by cropping, the parallel movement matrix $L_{CO}$ is expressed by the following equation:

$$L_{CO} = \begin{matrix} 1 & 0 & 0 & 0 \\ 0 & 1 & 0 & 0 \\ 0 & 0 & 1 & 0 \\ -(C_{CR}+C_{CL})/2 & -(C_{CT}+C_{CB})/2 & 0 & 1 \end{matrix} \tag{60}$$

Figure 20:
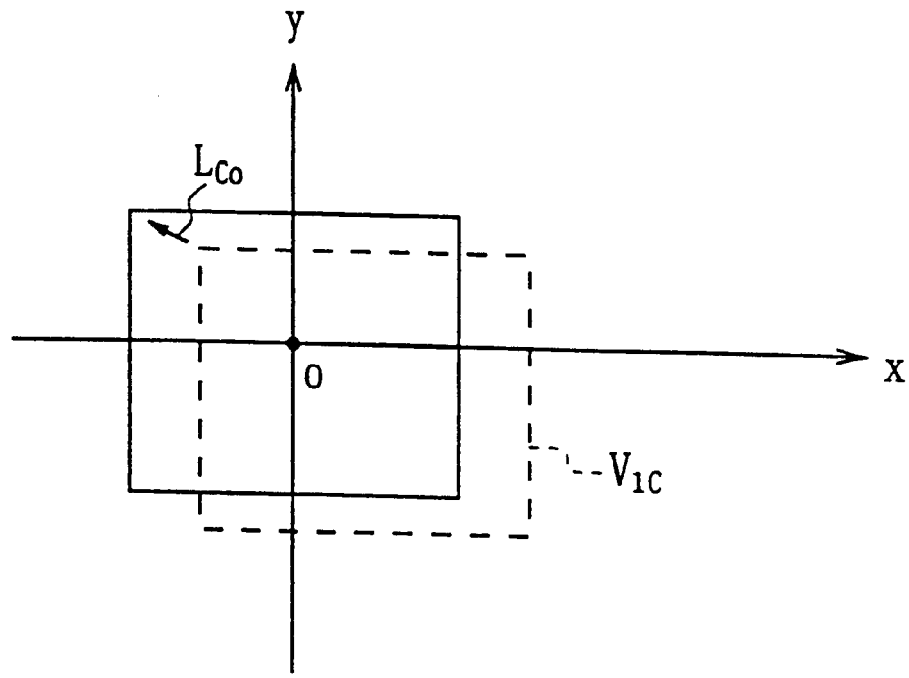
FIGS. 20A and 20B are schematic diagrams explaining the parallel movement of the source video signal of the second side face image.
Figure 20:
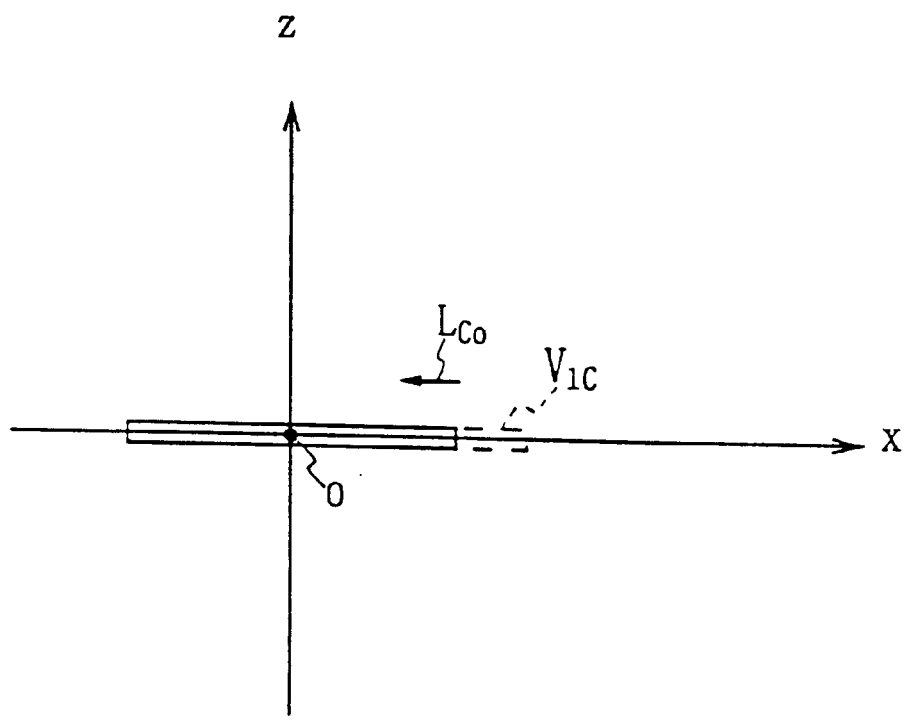

Therefore, as shown in FIG. 20A in which the three-dimensional coordinates of xyz is viewed from the position of view point PZ on the z-axis, the source video signal $V_{1C}$ is so moved by the parallel movement matrix $L_{CO}$ that the center of the source video signal $V_{1C}$ overlaps with the origin O.

In connection, FIG. 20B shows the state that the three-dimensional coordinates of xyz is overlooked from the plus direction of the y-axis to the minus direction of the y-axis, and it can be seen that the source video signal $V_{1C}$ moves on the xy-plane by the parallel movement matrix $L_{CO}$.

The magnification and reduction are performed by magnification/reduction matrix $S_C$ on the source video signal $V_{1C}$ thus parallel displaced. The magnification or reduction is for magnifying or reducing the source video signal $V_{1C}$ in the x-axis direction, so that the length in the x-direction of the cropped source video signal $V_{1C}$ coincides with the length of an edge $H_C$ which comes in contact with the second side face (SideC) of the object image displaying face (SideA) described above in FIG. 8, and simultaneously for magnifying or reducing the source video signal $V_{1C}$ in the y-axis direction, so that the length in the y-direction of the source video signal $V_{1C}$ coincides with the thickness "h" of the rectangular parallelepiped BOX described above in FIG. 8.

In this magnification/reduction, when the magnification/reduction rate in the x-axis direction is set to $r_{Cx}$, and the magnification/reduction rate in the y-axis direction is $r_{Cy}$, the following equations can be obtained:

$$r_{Cx} = \frac{H_C}{C_{CR} - C_{CL}} \tag{61}$$
$$r_{Cy} = \frac{h}{C_{CT} - C_{CB}}$$

using the length in the x-axis direction of the cropped source video signal $V_{1C}$, ($C_{CR}$-$C_{CL}$), and the length in the y-axis direction, ($C_{CT}$-$C_{CB}$). Therefore, when the magnification/reduction rate "$r_x$" in the x-axis direction and the magnification/reduction rate "$r_y$" in the y-axis direction of the rate transformation matrix $T_{rate}$ described above in the equation (43) are replaced to the magnification/reduction rate "$r_{Cx}$" and the magnification/reduction rate "$r_{Cy}$" expressed by the equation (61) respectively, the magnification/reduction transformation matrix $S_C$ is represented by the following equation:

$$S_C = \begin{matrix} r_{Cx} & 0 & 0 & 0 \\ 0 & r_{Cy} & 0 & 0 \\ 0 & 0 & 1 & 0 \\ 0 & 0 & 0 & 1 \end{matrix} \tag{62}$$

Figure 21:
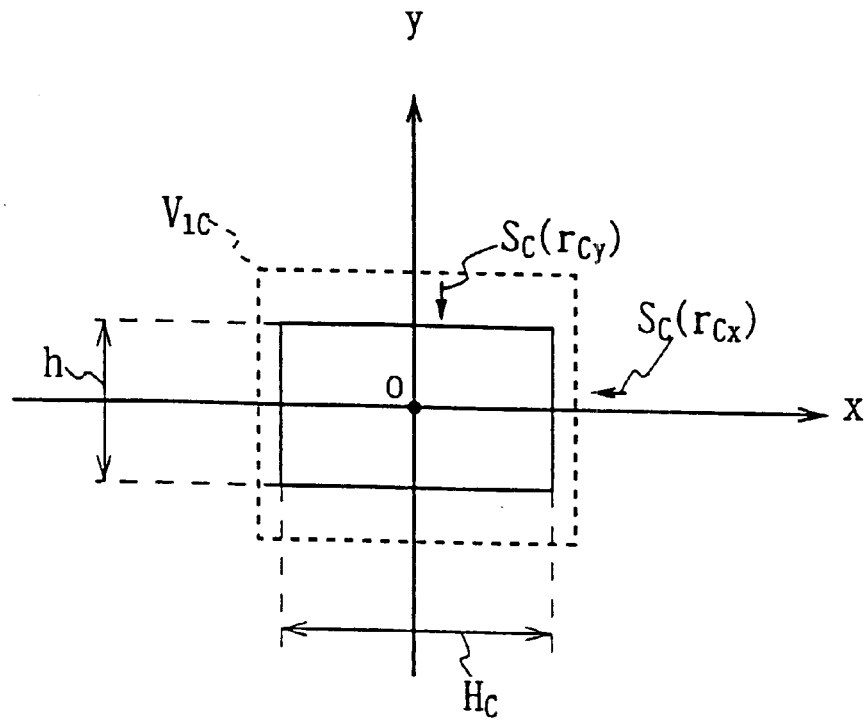
FIGS. 21A and 21B are schematic diagrams explaining the transformation of the source video signal of the second side face image.
Figure 21:
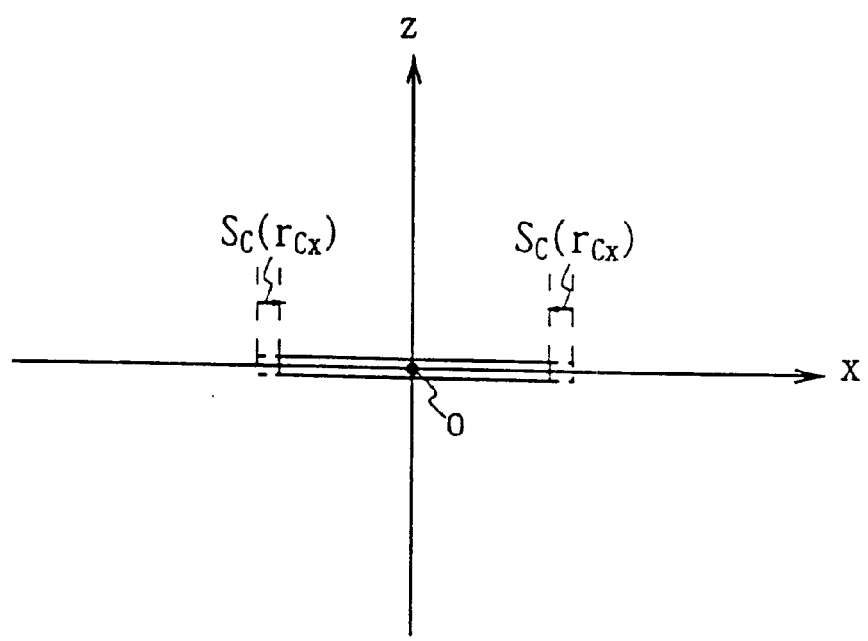

Therefore, as shown in FIG. 21A, the cropped source video signal $V_{1C}$, which is placed at a position where the center overlaps with the origin O, is magnified and reduced in the x-axis direction and y-axis direction by the magnification/reduction transformation matrix $S_{BC}$ with the origin O being centered. At this time, as shown in FIG. 21B that the three-dimensional coordinates of xyz is overlooked from the plus direction of the y-axis to the minus direction, in the transformation of the source video signal $V_{1C}$ by the magnification/reduction transformation matrix $S_C$, it can be found that the source video signal $V_{1C}$ is two-dimensionally transformed on the xy-plane.

Figure 22:
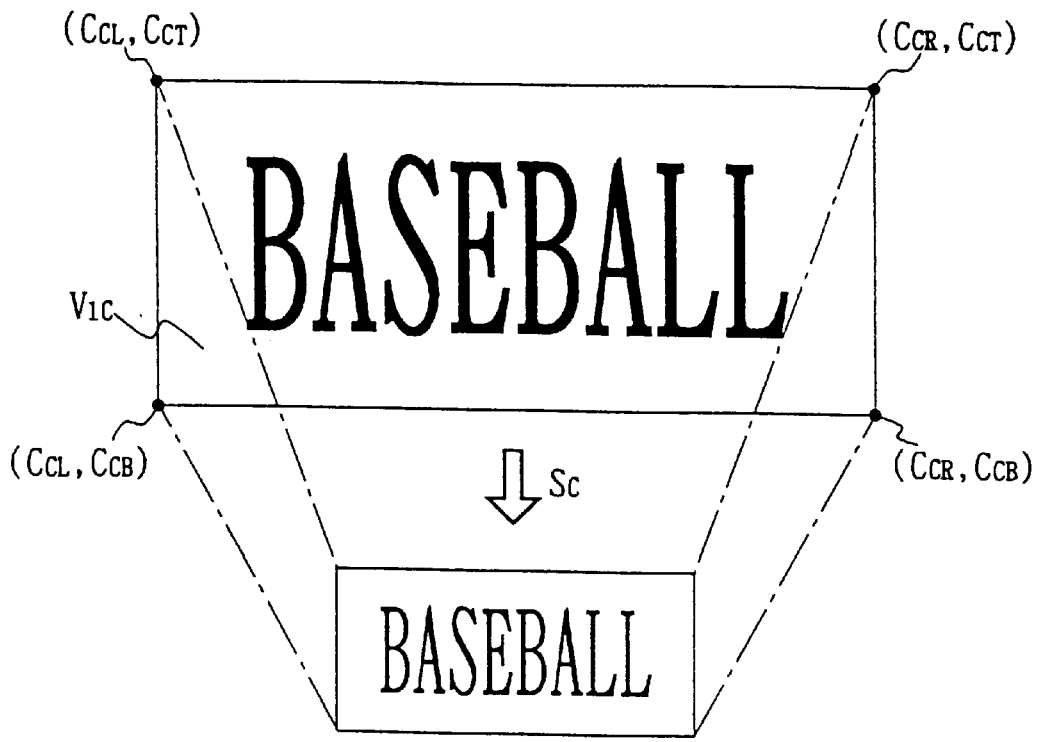
FIG. 22A is a schematic diagram explaining the cropping priority mode.
FIG. 22B is a schematic diagram explaining the reduction/magnification rate priority mode.
Figure 22:
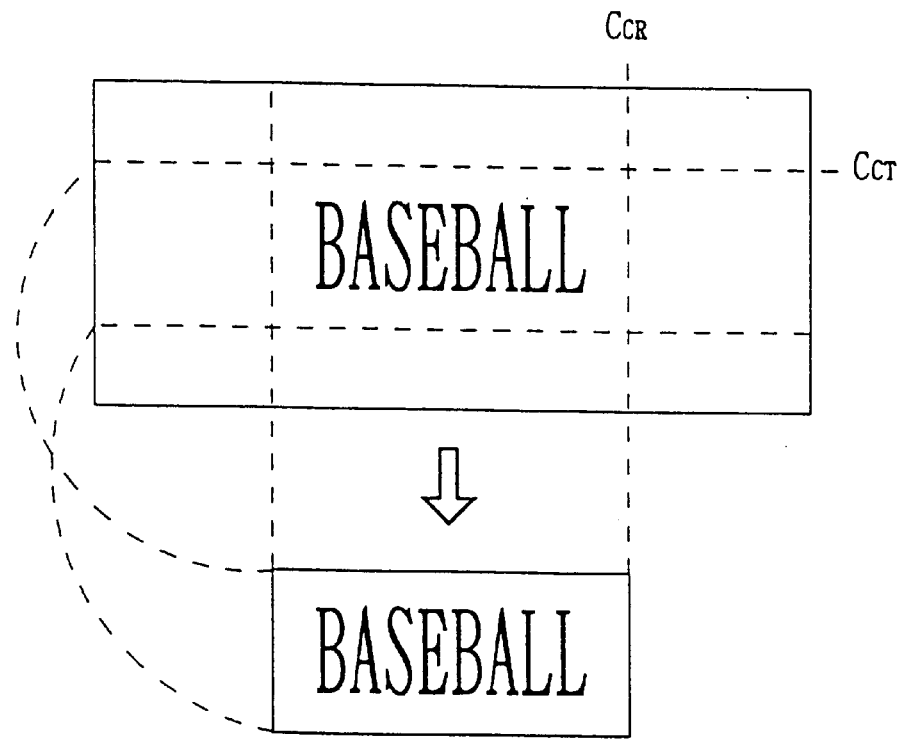

In addition, in this embodiment, the magnification/reduction rate $r_{Cx}$ and $r_{Cy}$ which are suited for the edge $H_c$ of the object image displaying face (SideA) and the thickness "h" are obtained from the four cropping values $C_{CR}$, $C_{CL}$, $C_{CT}$, and $C_{CB}$ specified by operator. Thereby, as shown in FIG. 22A, the area of the source video signal $V_{1C}$ cropped by the four points ($C_{CL}$, $C_{CT}$), ($C_{CR}$, $C_{CT}$), ($C_{CL}$, $C_{CB}$), and ($C_{CR}$, $C_{CB}$) is magnified or reduced as a whole (this is referred to as "cropping priority").

On the contrary, the operator can directly crop the source video signal $V_{1C}$ with the desired magnification/reduction rate by inputting the magnification/reduction rate $r_{Cx}$ and $r_{Cy}$ and two cropping values $C_{CR}$ and $C_{CB}$. In this case, as shown in FIG. 22B, both of magnification/education rate are set to "1" to input two cropping values $C_{CR}$ and $C_{CT}$, so that the image in necessary area is cut as it is to obtain the necessary magnified/reduced image.

The source video signal $V_{1C}$ thus magnified or reduced is rotated for 90° around the x-axis by the rotational transformation matrix $R_{Cx}$. The rotational transformation matrix $R_{Cx}$ is a matrix for transforming the source video signal $V_{1C}$ on xy-plane onto xz-plane, and is expressed by the following equation:

$$R_{Cx} = \begin{matrix} 1 & 0 & 0 & 0 \\ 0 & \cos(\pi/2) & -\sin(\pi/2) & 0 \\ 0 & \sin(\pi/2) & \cos(\pi/2) & 0 \\ 0 & 0 & 0 & 1 \end{matrix} \quad (63)$$

$$= \begin{matrix} 1 & 0 & 0 & 0 \\ 0 & 0 & -1 & 0 \\ 0 & 1 & 0 & 0 \\ 0 & 0 & 0 & 1 \end{matrix}$$

Figure 23A:
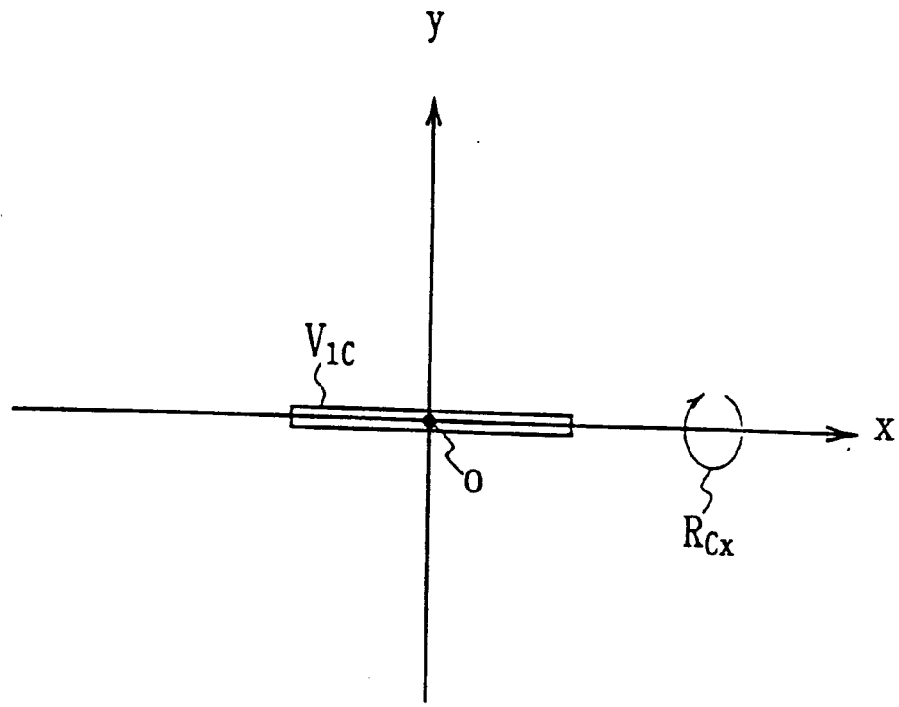
FIGS. 23A and 23B are schematic diagrams explaining the rotating transformation around the x-axis of the source video signal of the second side face image.
Figure 23B:
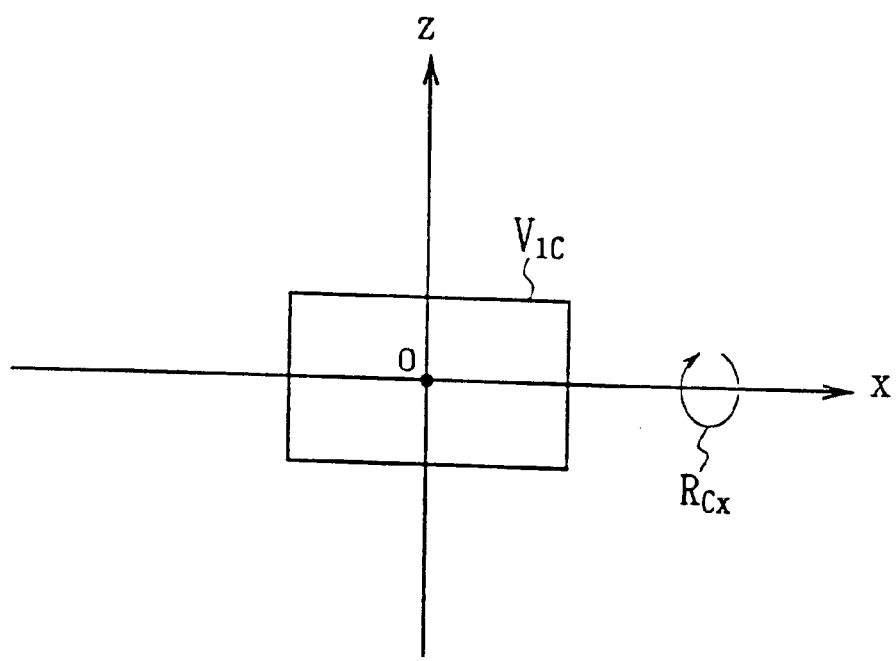

Therefore, the magnified/reduced source video signal $V_{1C}$ on the xy-plane described above in FIGS. 21A and 21B is rotationally transformed on the xz-plane by the rotational transformation matrix $R_{Cx}$, as shown in FIG. 23B that the three-dimensional coordinates of xyz is overlooked from the plus direction of the y-axis to the minus direction. As a result, the second side face (SideC) of the rectangular parallelepiped BOX (FIG. 8) to be mapped is positioned at an angle of 90° for the object image displaying face (SideA), so that the source video signal (FIG. 23B) is rotationally displaced to a position of the same angle (90°) for the object image displaying face (SideA).

In addition, FIG. 23A shows the state where the source video signal $V_{1C}$ transformed on the xz-plane by the rotational transformation matrix $R_{Cx}$ is viewed from a position of view point PZ on the z-axis. In this state, the source video signal $V_{1c}$ has no thickness in the y-axis direction.

The source video signal $V_{1C}$ (FIGS. 23A and 23B) thus transformed on xz-plane is rotated by a predetermined angle $\theta_C$ around the z-axis by the rotational transformation matrix $R_{Cz}$. The rotational transformation matrix $R_{Cz}$ is a transformation matrix for inclining the source video signal $V_{1C}$ (FIGS. 23A and 23B) on the xz-plane by a predetermined angle $\theta_c$ for the x-axis, and is expressed by the following equation:

$$R_{Cz} = \begin{matrix} \cos\theta_C & -\sin\theta_C & 0 & 0 \\ \sin\theta_C & \cos\theta_C & 0 & 0 \\ 0 & 0 & 1 & 0 \\ 0 & 0 & 0 & 1 \end{matrix} \quad (64)$$

Figure 24A:
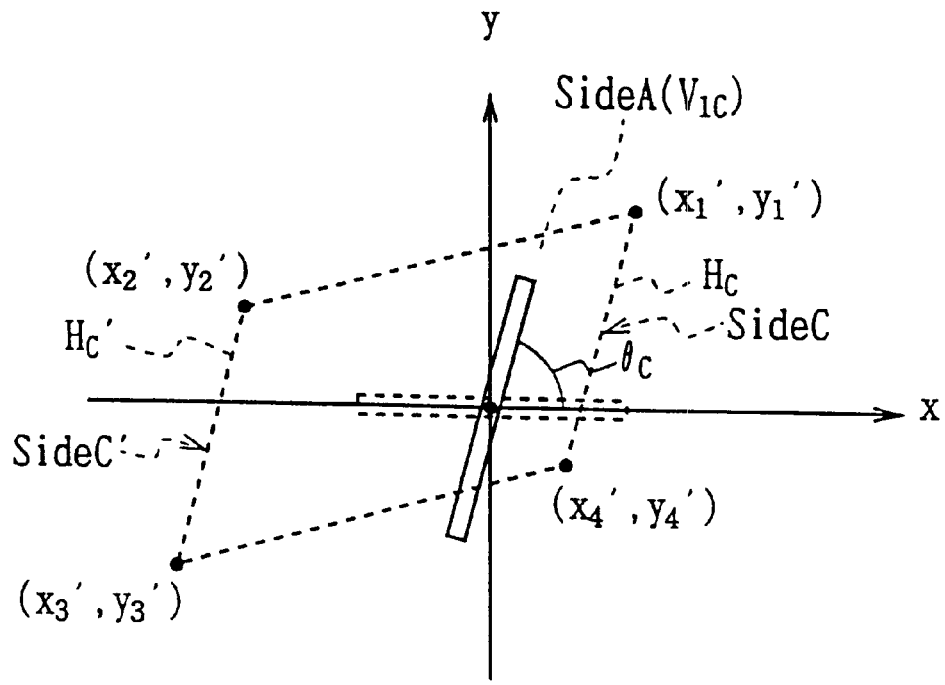
FIGS. 24A and 24B are schematic diagrams explaining the case where the source video signal of the second side face image is inclined by an angle $\theta_c$ for the x-axis.

Therefore, the source video signal $V_{1C}$ on the xz-plane described above in FIG. 23 is rotationally transformed at a position where it is inclined for a predetermined angle $\theta_c$ from the x-axis with the origin O being centered, as shown in FIG. 24A that the three-dimensional coordinates of xyz is viewed from the position of view point PZ on the z-axis. As a result, the source video signal $V_{1A}$ to be mapped on the object image displaying face (SideA) of the rectangular parallelepiped BOX (FIG. 8) is skew-transformed as described above in FIG. 11, thereby the source video signal (FIG. 24(A)) rotationally transformed by the rotational transformation matrix $R_{Cz}$ is rotationally displaced to a position parallel to the second side face (SideC), with keeping an angle at 90° for the object image displaying face (SideA).

The parameter $\theta_c$ of the rotational transformation matrix $R_{Cz}$ can be obtained from the coordinate values of two points $(x_1', y_1')$ and $(X_4', y_4')$, or $(x_2', y_2')$ and $(x_3', y_3')$ of the first source video signal $V_{1C}$ skewed in FIG. 11, which can be represented by the following equation:

$$\theta_c = \tan^{-1}(-(y_1'-y_4'), (x_1'-x_4')) \quad (65)$$

Figure 24B:
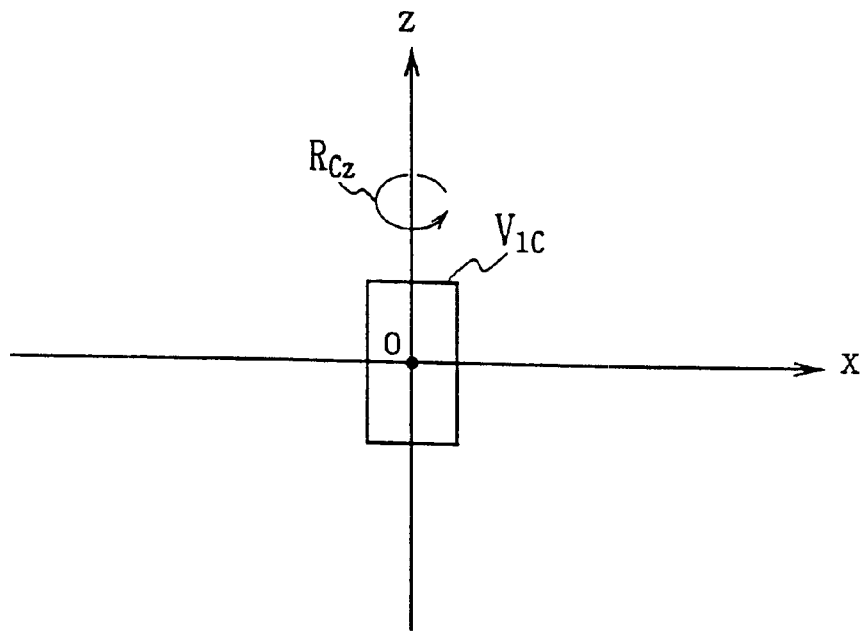

In connection, FIG. 24B shows the state that the source video signal $V_{1C}$ which is rotationally displaced by the rotational transformation matrix $R_{Cz}$ is viewed from the plus direction of the y-axis to the minus direction of the y-axis.

The source video signal $V_{1C}$ (FIGS. 24A and 24B) rotationally transformed so as to incline for a predetermined angle $\theta_c$ for the x-axis is parallel displaced along the xy-plane by the parallel movement matrix $L_C$. The parallel movement matrix $L_C$ is a transformation matrix for displacing the source video signal $V_{1C}$ shown in FIGS. 24A and 24B so as to overlap on the second side face (SideC) of the rectangular parallelepiped BOX. In this case, the edge $H_C$ of the second side face (SideC) of the object image displaying face (SideA) in FIGS. 24A and 24B is represented by a straight line connecting two points $(x_1', y_1')$ and $(x_4', y_4')$. Therefore, to map the source video signal $V_{1C}$ shown in FIG. 24 on the second side face (SideC), it is needed that the source video signal $V_{1C}$ is displaced so as to coincide with the edge $H_C$ by the parallel movement matrix $L_C$.

The source video signal $V_{1C}$ may be parallel displaced so that the center of the source video signal $V_{1C}$ coincides with the middle position of the two points $(x_1', y_1')$ and $(x_4', y_4')$. The parallel movement matrix $L_C$ is expressed by the following equation:

$$L_C = \begin{matrix} 1 & 0 & 0 & 0 \\ 0 & 1 & 0 & 0 \\ 0 & 0 & 1 & 0 \\ \frac{(x_1' + x_4')}{2} & \frac{(y_1' + y_4')}{2} & 0 & 1 \end{matrix} \quad (66)$$

Figure 25A:
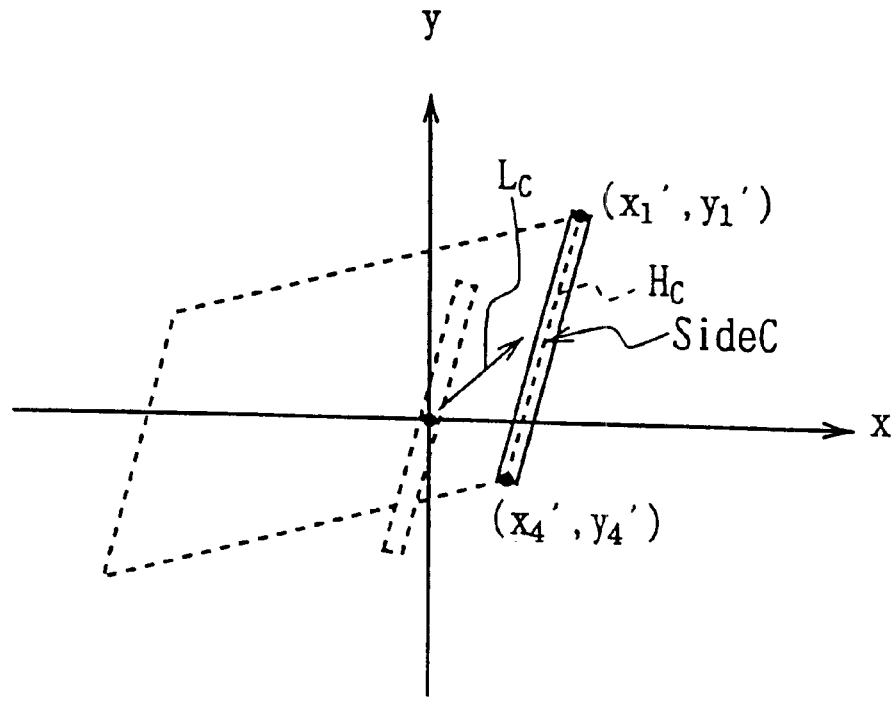
FIGS. 25A and 25B are schematic diagrams explaining the movement for overlapping the source video signal of a second side face image on the second side face of the solid.

Therefore, as shown in FIG. 25A that the three-dimensional coordinates of xyz is viewed from the position of view point PZ on the z-axis, the source video signal $V_{1C}$ described above in FIGS. 24A and 24B is parallel displaced on the xy-plane by the parallel movement matrix $L_C$ so as to coincide with the edge $H_C$, thereby mapped on the second side face (SideC) of the rectangular parallelepiped BOX (FIG. 8).

Figure 25B:
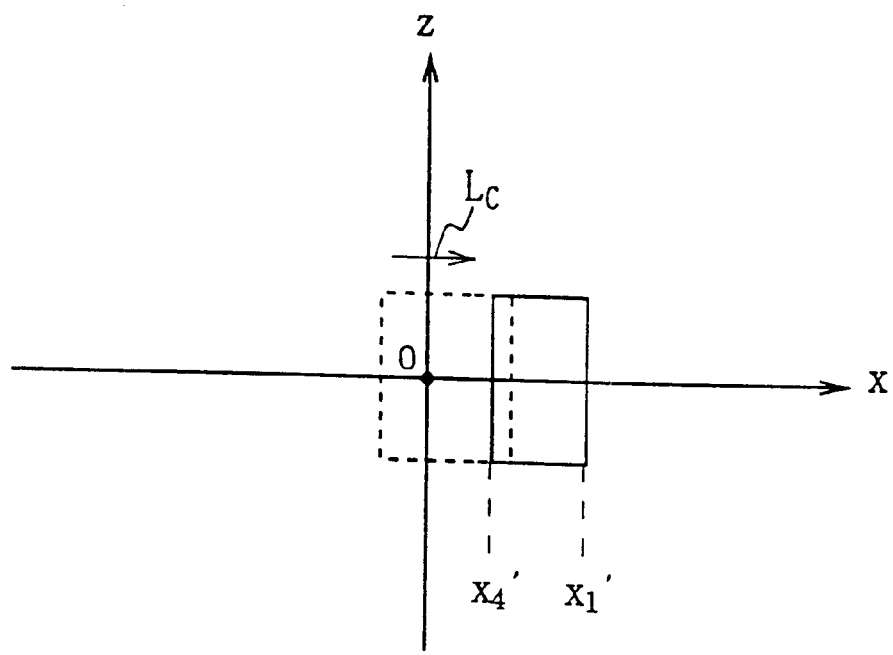

In addition, FIG. 25B shows the state where the source video signal $V_{1C}$ parallel displaced by the parallel movement matrix $L_C$ is viewed from the plus direction of the y-axis to the minus direction of the y-axis.

Figure 19:
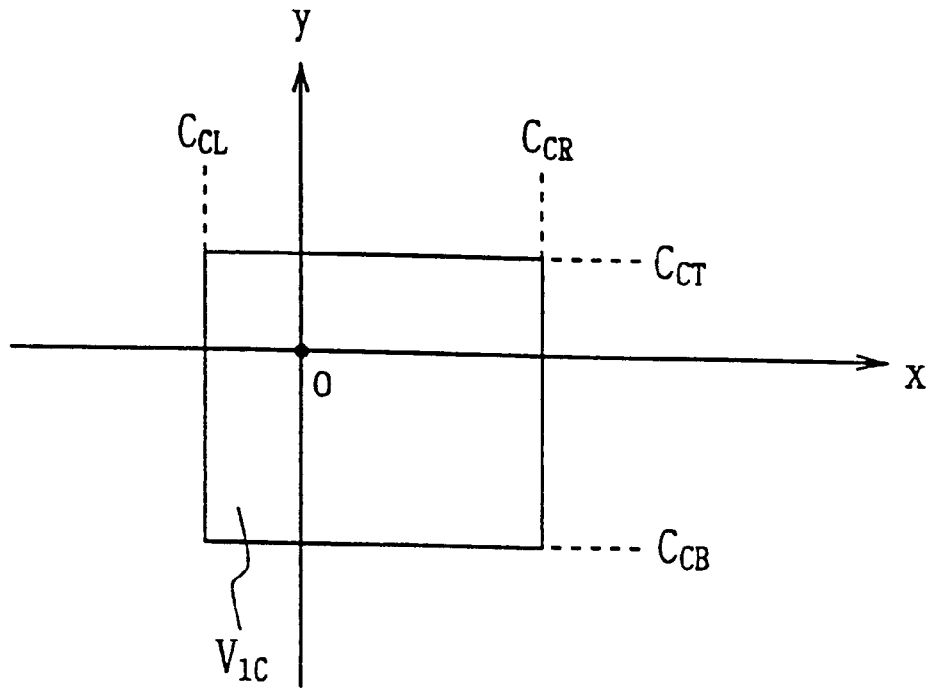
FIGS. 19A and 19B are schematic diagrams explaining the source video signal of a second side face image.
Figure 19:
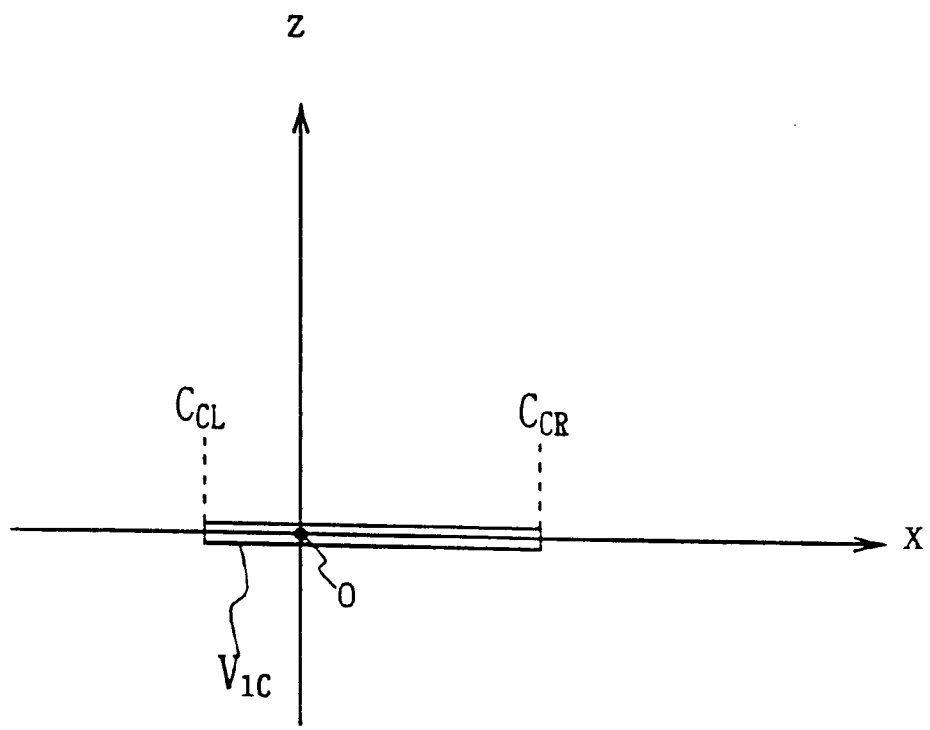

As described above, when a processing of mapping the second source video signal $V_{1C}$ on the second side face (SideC) is arranged, with setting a matrix representing the mapping processing to "$M_C$", the following equation can be obtained:

$$M_C = L_{CO} \cdot S_C \cdot R_{Cx} \cdot R_{Cz} \cdot L_C \quad (67)$$

from the equations (60), (62), (63), (64), and (66). Therefore, the source video signal $V_{1C}$ on xy-plane shown in FIG. 19 is mapped on the second side face (SideC) of the rectangular parallelepiped BOX (FIG. 8).

In connection, the same transformation processing as the case described above of mapping the source video signal $V_{1C}$ on the second side face (SideC) is performed also on the key signal $K_{1C}$ input to the image forming part 40, corresponding to the second source video signal $V_{1C}$.

(10) Mapping on Facing Plane (SideC') of Second Side Face (SideC)

In the image forming part 40 of FIG. 3, an operator operates to cut the desired area of the source video signal $V_{1C}$ input to the cropping circuit 41. The source video signal $V_{1C}$ is still a two-dimensional image placed on the xy-plane at the time when it is input to the cropping circuit 41. More specifically, in FIG. 19A that the three-dimensional coordinates of xyz is viewed in the plus direction of the z-axis from the position of the view point PZ of the z-axis, when the cropping position of left end of the source video signal $V_{1C}$ on the xy-plane is represented by $C_{CL}$, the cropping position of right end is $C_{CR}$, the cropping position of top end is $C_{CT}$, and the cropping position of bottom end is $C_{CB}$, the coordinates of four apexes of the cropped source video signal $V_{1C}$ are expressed as follows: $(C_{CR}, C_{CT}); (C_{CL}, C_{CT}); (C_{CL}, C_{CB})$; and $(C_{CR}, C_{CB})$.

The source video signal $V_{1C}$ thus cropped at the cropping circuit 41 is stored in a frame memory $FM_{42}$ (FIG. 3) with the state where it is not transformed.

The source video signal $V_{1C}$ stored in the frame memory $FM_{42}$ after it has been cropped by the cropping circuit 41 is parallel displaced by a parallel movement matrix $L_{CO}$ so that the center of the cropped source video signal $V_{1C}$ is positioned at the origin O of xy-plane. The parallel movement matrix $L_{CO}$ is expressed by the same equation as the equation (60) describe above. Therefore, similar to the case described above relating to FIG. 20A, the source video signal $V_{1C}$ is so moved by the parallel movement matrix $L_{CO}$ that the center of the source video signal $V_{1C}$ overlaps with the origin O.

The magnification and reduction are performed by magnification/reduction matrix $S_C$ on the source video signal $V_{1C}$ thus parallel displaced. The magnification/reduction transformation matrix $S_C$ is represented by the same equation as the equation (62) described above.

Therefore, similar to the case described above relating to FIG. 21A, the cropped source video signal $V_{1C}$, which is placed at a position where the center overlaps with the origin O, is magnified and reduced in the x-axis direction and y-axis direction by the magnification/reduction transformation matrix $S_{BC}$ with the origin O being centered.

In addition, in mapping on the facing plane (SideC'), similar to the case of FIG. 22A, the magnification/reduction rate $r_{Cx}$ and $r_{Cy}$ which are suited for the edge $H_C$ of the object image displaying face (SideA) and the thickness "h" are also obtained from the four cropping values $C_{CR}, C_{CL}, C_{CT}$, and $C_{CB}$ specified by the operator. Thereby, the area of the source video signal $V_{1C}$ cropped by the four points $(C_{CL}, C_{CT}), (C_{CR}, C_{CT}), (C_{CL}, C_{CB})$, and $(C_{CR}, C_{CB})$ is magnified or reduced as a whole (this is referred to as "cropping priority").

On the contrary, the operator can directly crop the source video signal $V_{1C}$ with the desired magnification/reduction rate by inputting the magnification/reduction rate $r_{Cx}$ and $r_{Cy}$ and two cropping values $C_{CR}$ and $C_{CB}$. In this case, as described relating to FIG. 22B, both of magnification/reduction rate are set to "1" to input two cropping values $C_{CR}$ and $C_{CT}$, so that the image in necessary area is cut as it is to obtain the necessary magnified/reduced image.

The source video signal $V_{1C}$ thus magnified or reduced is rotated for 90° around the x-axis by the rotational transformation matrix $R_{CX}$. The rotational transformation matrix $R_{CX}$ is expressed by the same equation as the equation (63). Therefore, the magnified/reduced source video signal $V_{1C}$ on the xy-plane described above in FIG. 21 is rotationally transformed on the xz-plane by the rotational transformation matrix $R_{CX}$ as described in FIGS. 23A and 23B. As a result, the facing plane (SideC') of the second side face (SideC) of the rectangular parallelepiped BOX (FIG. 8) to be mapped is positioned at an angle of 90° for the object image displaying face (SideA), so that the source video signal (FIG. 23B) rotationally transformed by the rotational transformation matrix $R_{CX}$ is rotationally displaced to a position of the same angle (90°) for the object image displaying face (SideA).

The source video signal $V_{1C}$ (FIGS. 23A and 23B) thus transformed on xz-plane is rotated by a predetermined angle $\theta_C$ around the z-axis by the rotational transformation matrix $R_{CZ}$. The rotational transformation matrix $R_{CZ}$ is a transformation matrix for inclining the source video signal $V_{1C}$ (FIGS. 23A and 23B) on the xz-plane by a predetermined angle $\theta_C$ for the x-axis, and is expressed by the same equation as the equation (64). Therefore, the source video signal $V_{1C}$ on the xz-plane described above in FIGS. 23A and 23B is rotationally transformed at a position where it is inclined for a predetermined angle $\theta_C$ from the x-axis with the origin O being centered, as described in FIGS. 24A and 24B. As a result, the source video signal $V_{1A}$ to be mapped on the object image displaying face (SideA) of the rectangular parallelepiped BOX (FIG. 8) is skew transformed as described above in FIG. 11, thereby the source video signal (FIG. 24A) rotationally transformed by the rotational transformation matrix $R_{CZ}$ is rotationally displaced to a position parallel to the facing plane (SideC') of the second side face (SideC), with keeping an angle at 90° for the object image displaying face (SideA).

The parameter $\theta_C$ of the rotational transformation matrix $R_{CZ}$ can be obtained from the coordinate values of two points $(x_1', y_1')$ and $(X_4', y_4')$, or $(x_2', y_2')$ and $(x_3', y_3')$ of the first source video signal $V_{1A}$ skewed in FIGS. 17A and 17B, which can be represented by the same equation as the equation (65).

The source video signal $V_{1C}$ (FIGS. 24A and 24B) rotationally transformed so as to incline for a predetermined angle $\theta_C$ for the x-axis is parallel displaced along the xy-plane by the parallel movement matrix Lag. The parallel movement matrix $L_C'$ is a transformation matrix for displacing the source video signal $V_{1C}$ shown in FIGS. 24A and 24B so as to overlap on the facing plane (SideC') of the second side face (SideC) of the rectangular parallelepiped BOX. In this case, the edge $H_C'$ of the facing plane (SideC') side facing to the edge $H_C$ of the second side face (SideC) of the object image displaying face (SideA) in FIGS. 24A and 24B is represented by a straight line connecting two points $(x_2', Y_2')$ and $(X_3', Y_3')$. Therefore, to map the source video signal $V_{1C}$ shown in FIG. 24 on the facing plane (SideC') of the second side face (SideC), it is needed that the source video signal $V_{1C}$ is displaced so as to coincide with the edge $H_C'$ by the parallel movement matrix $L_C'$.

The source video signal $V_{1C}$ may be parallel displaced so that the center of the source video signal $V_{1C}$ coincides with the middle position of the two points $(x_2', y_2')$ and $(X_3', y_3')$. The parallel expressed by the following equation:

$$L'_C = \begin{matrix} 1 & 0 & 0 & 0 \\ 0 & 1 & 0 & 0 \\ 0 & 0 & 1 & 0 \\ \dfrac{(x'_2 + y'_3)}{2} & \dfrac{(x'_2 + y'_3)}{2} & 0 & 1 \end{matrix} \qquad (68)$$

Therefore, the source video signal $V_{1C}$ described above in FIG. 24 is parallel displaced on the xy-plane by the parallel movement matrix $L_C'$ so as to coincide with the edge $H_C'$, thereby mapped on the facing plane (SideC') of the second side face (SideC) of the rectangular parallelepiped BOX (FIG. 8).

As described above, when a processing of mapping the second source video signal $V_{1C}$ on the facing plane (SideC') of the second side face (SideC) is arranged, with setting a matrix representing the mapping processing to $M_C'$, the following equation can be obtained:

$$M_C = L_{CO} \cdot S_C \cdot R_{CX} \cdot R_{CZ} \cdot L_C' \qquad (69)$$

from the equations (60), (62), (63), (64), and (66). Therefore, the source video signal $V_{1C}$ on xy-plane shown in FIG. 19 is mapped on the facing plane (SideC') of the second side face (SideC) of the rectangular parallelepiped BOX (FIG. 8).

In connection, the same transformation processing as the case described above of mapping the source video signal $V_{1C}$ on the facing plane (SideC') of the second side face (SideC) is performed also on the key signal $K_{1C}$ input to the image forming part 40 corresponding to the second source video signal $V_{1C}$.

(11) Transformation processing of First Source Video Signal $V_{1A}$

The image forming part 20 of the image processing apparatus 10 transforms the source video signal $V_{1A}$ on a screen as if the image of source video signal $V_{1A}$ were mapped on the object image displaying face (SideA) of the rectangular parallelepiped BOX moved to a desired position in the three-dimensional virtual space, by using the above transformation matrix T (Equation (3)) and the above matrix $M_A$ (Equation (47)) for mapping the video signal on the object image displaying face (SideA) of the rectangular parallelepiped BOX (FIG. 8) on the three-dimensional coordinates.

Figure 26:
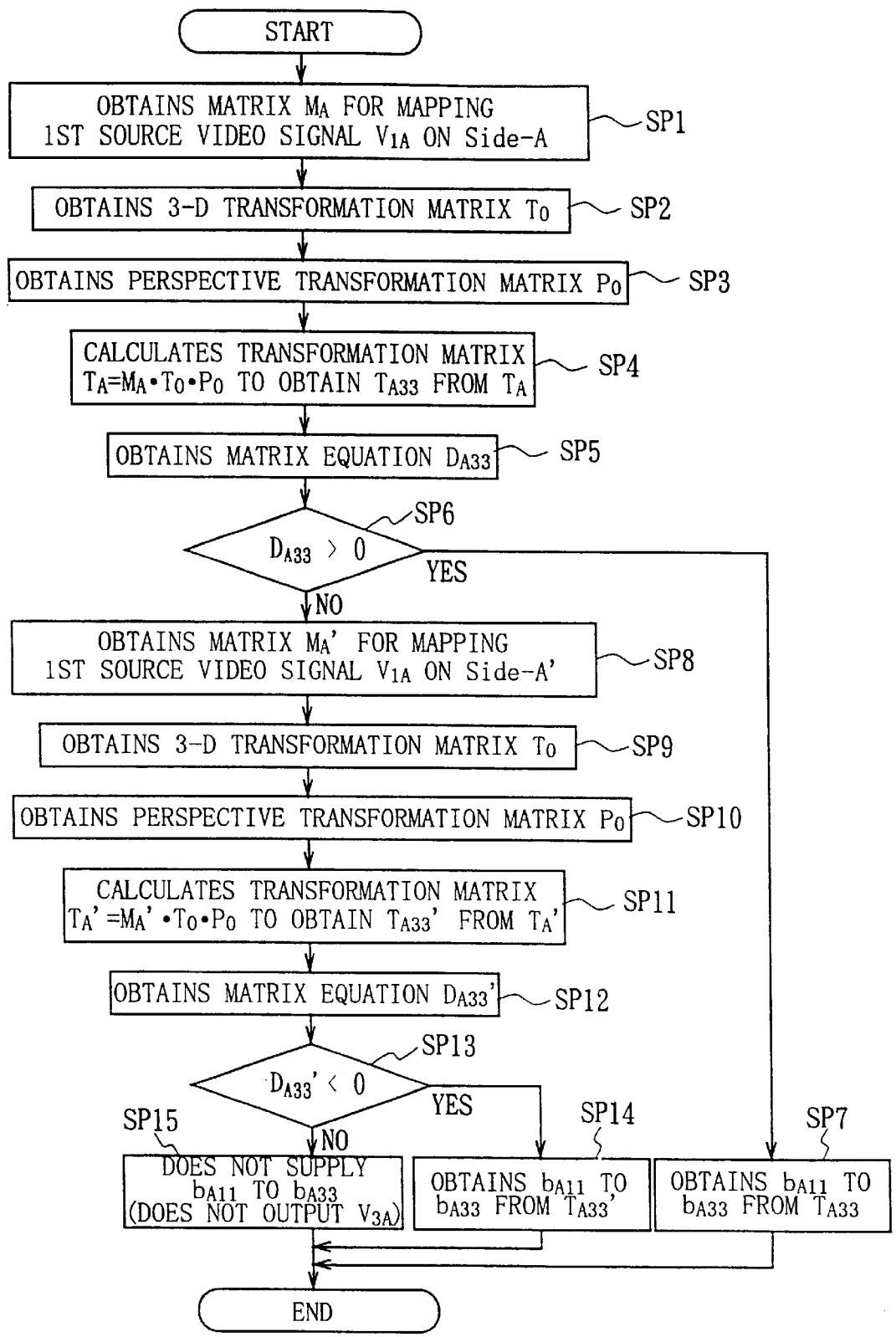
FIG. 26 is a flowchart showing the procedure of mapping the first source video signal.
Figure 27:
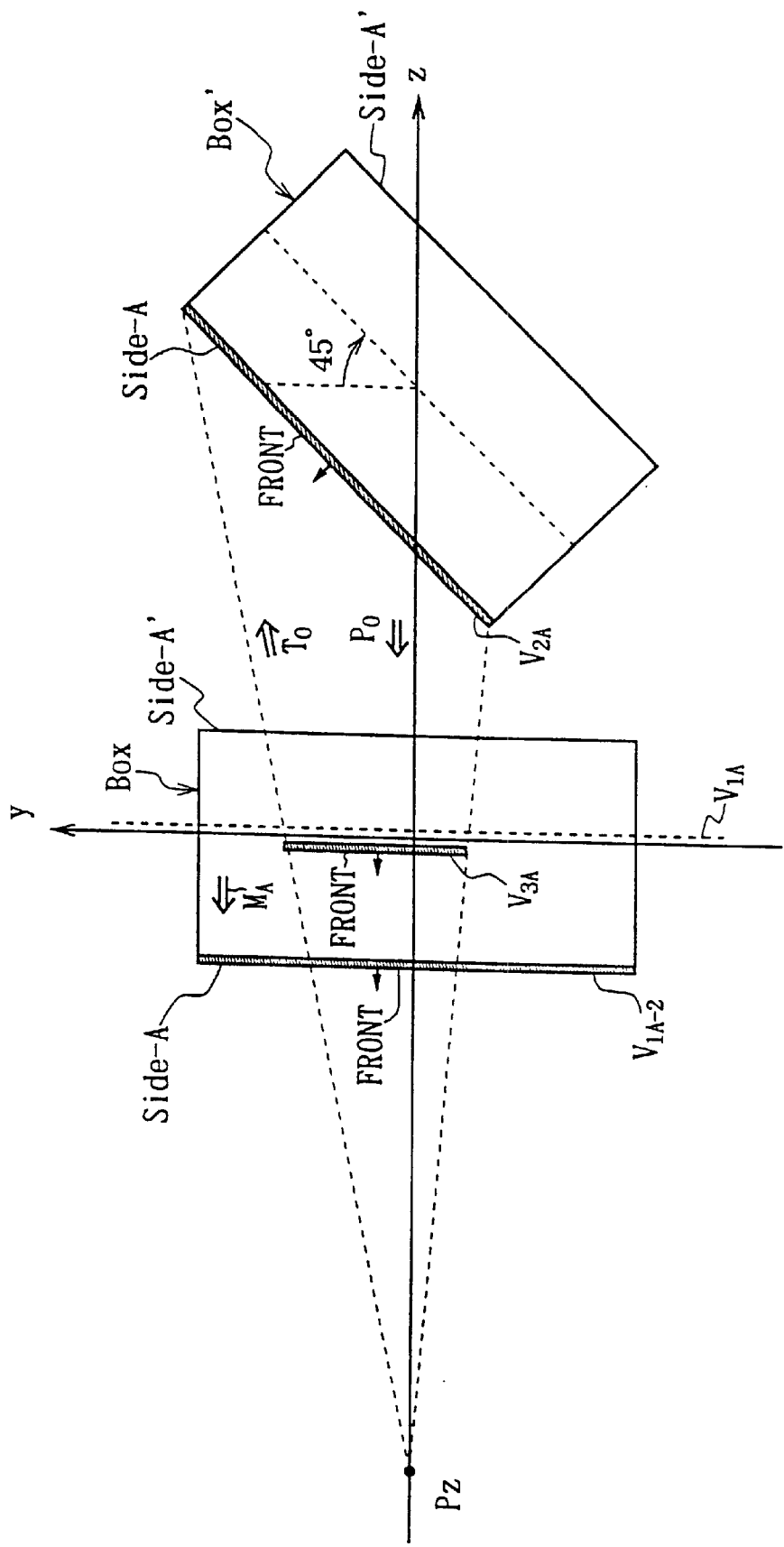
FIG. 27 is a schematic diagram explaining the case where the first source video signal is mapped on the object image displaying face of the solid.

The procedure is shown in FIG. 26. The image processing apparatus 10 uses a CPU 58 and a working memory (ROM 59, RAM 61) to firstly obtain at step SP1 the matrix $M_A$ for mapping the first source video signal $V_{1A}$ on the object image displaying face (SideA) by using the movement matrix $L_A$ (Equation (42)) and the rate/skew transformation matrix $T_{rs}$ (Equation (45)) as described relating to the equation (47). As shown in FIG. 27, the source video signal $V_{1A}$ on xy-plane is mapped ($V_{1A-2}$) by the matrix $M_A$ on the object image displaying face (SideA) of the rectangular parallelepiped BOX at a standard position (the position where the center overlaps with the origin O) of three-dimensional coordinates of xyz.

When the matrix $M_A$ is obtained at step SP1 of FIG. 26, the image processing apparatus 10 proceeds to step SP2 to obtain the three-dimensional transformation matrix $T_O$ (Equation (1)) which is a basic step of the spatial image transformation for transforming the source video signal $V_{1A}$ on two-dimensional plane to a desired position of three-dimensional coordinates, and then proceeds to step SP3 to obtain the perspective transformation matrix $P_O$ (Equation (2)) which is a basic step of the perspective transformation for, on the screen, seeing through the source video signal $V_{2A}$ moved onto the three-dimensional space by the three-dimensional transformation matrix $T_O$ obtained at step SP2.

Therefore, the video signal $V_{1A-2}$ mapped on the object image displaying face (SideA) of the rectangular parallelepiped BOX shown in FIG. 27 by the matrix M is displaced by the three-dimensional transformation matrix $T_O$ onto the object image displaying face (SideA) of the rectangular parallelepiped BOX' moved to a desired position on the three-dimensional space ($V_{2A}$). Further, the three-dimensionally transformed video signal $V_{2A}$ is further perspective transformed on the screen of the xy-plane (perspective transformed video signal $V_{3A}$).

In this way, when the transformation matrix $M_A$ for mapping the source video signal $V_{1A}$ on the object image displaying face (SideA), and the basic image transformation matrixes $T_O$ and $P_O$ for transforming the source video signal $V_{1A}$ at a desired position of three-dimensional space and for seeing through the source video signal $V_{1A}$ on the screen are obtained, the image processing apparatus 10 proceeds to step SP4 to map the source video signal $V_{1A}$ on the object image displaying face (SideA), thereafter, the transformation matrix $T_A$ for perspective transforming it on the screen plane is obtained as follows:

$$T_A = M_A \cdot T_O \cdot P_O \qquad (70)$$

Here, as described in the equation (4), in the image processing apparatus 10, the source video signal $V_{1A}$ stored in the frame memory $FM_{22}$ and the perspective transformed video signal $V_{3A}$ read from the frame memory $FM_{22}$ are both two-dimensional data, and the data in the z-axis direction in the three-dimensional space is substantially not used in the operation of read address. Therefore, in the transformation matrix of the equation (70), a parameter in third line and third row for operating the data in the z-axis direction is unnecessary for operating the read address for the frame memory $FM_{22}$.

Therefore, the matrix $T_{A33}$ in which the parameter in third line and third row is excluded from the transformation matrix $T_A$ of the equation (70) is set as a transformation matrix having necessary parameters in actual operation of two-dimensional read address.

In this way, when the transformation matrix $T_{A33}$ of third line third row is obtained, the image processing apparatus 10 proceeds to step SP5 to obtain the matrix equation $D_{A33}$ of the transformation matrix $T_{A33}$, and proceeds to subsequent step SP6. The step SP6 is a step for judging whether or not the value of the matrix equation $D_{A33}$ of the transformation matrix $T_{A33}$ is plus.

Here, the relationship between the area $S_1$ of the source video signal $V_{1A}$ and the area $S_3$ on a screen after the transformation by the transformation matrix $T_{A33}$ is expressed by the following equation:

$$S_3 = S_1 det(T_{33}) \qquad (71)$$

From the equation (71), when the value of the matrix equation $D_{A33}$ of the transformation matrix $T_{A33}$ is plus, the transformation of the source video signal $V_{1A}$ by the transformation matrix $T_{A33}$ is valid. More specifically, it shows a state that the video signal movement transformed by the transformation matrix $T_{A33}$ orients to its outside on the object image displaying face (SideA) of the rectangular parallelepiped BOX moved to a desired position in the three-dimensional space, that is, a state that the surface FRONT of the three-dimensional transformed video signal $V_{2A}$ mapped on the object image displaying face (SideA) of the rectangular parallelepiped BOX orients to the outside of the rectangular parallelepiped BOX'. At this time, the image processing apparatus 10 obtains an affirmative result at step SP6, and proceeds to step SP7 to obtain parameters $b_{A11}$ to $b_{A33}$ from the above equations (28) to (36) for obtaining the read addresses $X_{MA}$, $Y_{MA}$ to the frame memory $FM_{22}$, based on the transformation matrix $T_{A33}$ representing the transformation onto the object image displaying face (SideA).

Based on the parameters $b_{A11}$ to $b_{A33}$ thus obtained, the read addresses $X_{MA}$, $Y_{MA}$ are obtained from the above equations (13) and (14), and the source video signal $V_{1A}$ in the frame memory $FM_{22}$ is read by the read addresses $X_{MA}$, $Y_{MA}$, so that in FIG. 27, the source video signal $V_{1A}$ is mapped on the object image displaying face (SideA) of the rectangular parallelepiped BOX' moved to the three-dimensional space, and simultaneously it can be perspective transformed on the screen surface of xy-plane. Therefore, the perspective transformed video signal $V_{3A}$ is read from the frame memory $FM_{22}$.

On the contrary, a negative result is obtained at step SP6 described above, this means that the value of matrix equation $D_{A33}$ of the transformation matrix $T_{A33}$ is minus, and it can be found from the equation (71) that this state is not valid. More specifically, this shows the state that the video signal movement-transformed by the transformation matrix $T_{A33}$ orients to the inside on the object image displaying face (SideA) of the rectangular parallelepiped BOX' moved to a desired position in the three-dimensional space. That is, in FIG. 27, this shows the state that the surface FRONT of the three-dimensional transformed video signal $V_{2A}$ mapped on the object image displaying face (SideA) of the rectangular parallelepiped BOX' orients to the direction (inside direction of the rectangular parallelepiped BOX') opposite to the state of orienting outside the rectangular parallelepiped BOX.

Figure 28:
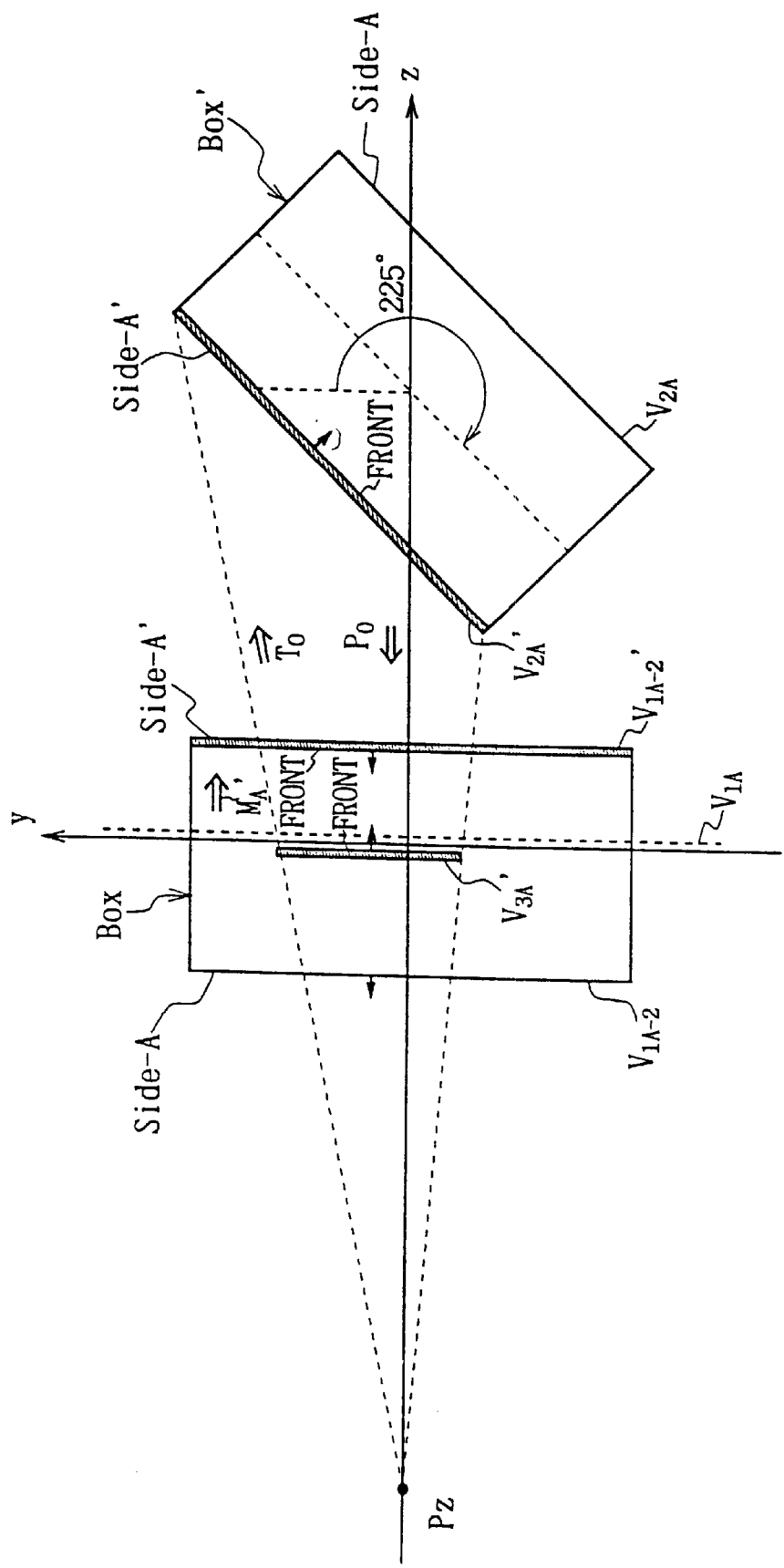
FIG. 28 is a schematic diagram explaining the time when the first source video signal is mapped on the plane facing the object image displaying face of the solid.

More specifically, it can be found that this is not a state where the object image displaying face (SideA) of the rectangular parallelepiped BOX' in the three-dimensional space is, as shown in FIG. 27, positioned at a view point PZ side from the facing plane (SideA') of the object image displaying face (SideA), but is a state where the facing plane (SideA') of the object image displaying face (SideA) is, as shown in FIG. 28, positioned at the view point PZ side. That is, in FIG. 27, the rectangular parallelepiped BOX' in the three-dimensional space rotates at 45° for the xy-plane. On the contrary, in FIG. 28, the rectangular parallelepiped BOX' in the three-dimensional space rotates at 225° for the xy-plane.

In addition, in this state, the surface FRONT of the three-dimensional transformed video signal $V_{2A}$ being the source video signal $V_{3A}$ three-dimensionally transformed is mapped on the facing plane (SideA') so as to orient to inside the rectangular parallelepiped BOX', that is to the plus direction of the z-axis.

In this way, when a negative result is obtained at step SP6 in FIG. 26, the image processing apparatus 10 proceeds to step SP8 to obtain the matrix $M_A'$ for mapping the first source video signal $V_{1A}$ on the facing plane (SideA') of the object image displaying face (SideA) by using the movement matrix $L_A'$ (Equation (48)) and the rate/skew transformation matrix $T_{rs}$ (Equation (45)), as described relating to the equation (49). As shown in FIG. 26, the source video signal $V_{1A}$ on the xy-plane is mapped on the facing plane (SideA') of the object image displaying face (SideA) of the rectangular parallelepiped BOX in the three-dimensional coordinates of xyz by the matrix M' ($V_{1A-2}'$).

When the matrix $M_A'$ is obtained at step SP8 in FIG. 26, the image processing apparatus 10 obtains the three-dimensional transformation matrix $T_O$ (Equation (1)) and the perspective transformation matrix $P_O$ (Equation (2)) at steps SP9 and SP10, similar to the above steps SP2 and SP3.

Therefore, the video signal $V_{1A-2}'$ mapped on the facing plane (SideA') of the object image displaying face (SideA) of the rectangular parallelepiped BOX in FIG. 28 is displaced ($V_{2A}'$) by the three-dimensional transformation matrix $T_O$ onto the facing plane (SideA') of the object image displaying face (SideA) of the rectangular parallelepiped BOX' moved to a desired position in the three-dimensional space. Further, the video signal $V_{2A}'$ three-dimensionally movement transformed is perspective-transformed on the screen of xy-plane (perspective transformed video signal $V_{3A}'$).

In this way, when the transformation matrix $M_A'$ for mapping the source video signal $V_{1A}$ on the facing plane (SideA') of the object image displaying face (SideA), the basic image transformation matrix $T_O$ for transforming to a desired position in the three-dimensional space, and the basic image transformation matrix $P_O$ for perspective-transforming on the screen surface are obtained, the image processing apparatus 10 proceeds to step SP11 to map the source video signal $V_{1A}$ on the facing plane (SideA') of the object image displaying face (SideA) in the three-dimensional space, thereafter, the transformation matrix $T_A'$ for perspective-transforming it on the screen surface is obtained by the following equation:

$$T_A' = M_A' \cdot T_O \cdot P_O \tag{72}$$

Here, as described relating to the equation (4), in the image processing apparatus 10, the source video signal $V_{1A}$ stored in the frame memory $FM_{22}$ and the perspective transformed video signal $V_{3A}$ read from the frame memory $FM_{22}$ are both two-dimensional data. In the operation of the read address, the data in the z-axis direction in the three-dimensional space is practically not used. Therefore, in the transformation matrix of the equation (72), the parameter in third line and third row for operating the data in the z-axis direction is not needed to operation the read address for the frame memory $FM_{22}$.

Therefore, the matrix $T_{A33}$ in which the parameter in third line and third row is removed from the transformation matrix $T_A'$ of the equation (72) is the transformation matrix having the parameters necessary to operate the two-dimensional read address actually.

Thus, when the transformation matrix $T_{A33}'$ of three lines and three rows is obtained, the image processing apparatus 10 proceeds to step SP12 to obtain the matrix equation $D_{A33}'$ of the transformation matrix $T_{A33}$ and proceeds to the following step SP13. Step SP13 is a step for judging whether or not the value of matrix equation $D_{A33}'$ is minus. When an affirmative result is obtained at step SP13, this expresses the state that the video signal movement displaced by the transformation matrix $T_{A33}'$ orients to the inside at the facing plane (SideA') of the objective image displaying face (SideA) of the rectangular parallelepiped BOX' moved to a desired position in the three-dimensional space, that is, the state the surface FRONT of the three-dimensionally transformed video signal $V_{2A}'$ mapped on the facing plane (SideA') of the object image displaying face (SideA) of the rectangular parallelepiped BOX' in FIG. 28 orients to the inside of the rectangular parallelepiped BOX'. At this time, the image processing apparatus 10 proceeds to step SP14 to obtain the parameters $b_{A11}$ to $b_{A33}$ for obtaining the read addresses $X_{MA}$, $Y_{MA}$ to the frame memory $FM_{22}$ based on the transformation matrix $T_{A33}'$ representing the transformation to the facing plane (SideA') of the object image displaying face (SideA), from the equations (28) to (36) described above.

On the basis of the thus obtained parameters $b_{A11}$ to $b_{A33}$, the read addresses $X_{MA}$, $Y_{MA}$ are obtained from the above equations (13) and (14) to read the source video signal $V_{1A}$ in the frame memory $FM_{22}$ by the read addresses $X_{MA}$, $Y_{MA}$. Thereby, the source video signal $V_{1A}$ can be mapped on the facing plane (SideA') of the object image displaying face (SideA) of the rectangular parallelepiped BOX' moved into the three-dimensional space in FIG. 28, and it can be perspective transformed on the screen surface of xy-plane. Therefore, the perspective-transformed video signal $V_3'$ is read from the frame memory $FM_{22}$.

On the contrary, when a negative result is obtained at step SP13 in FIG. 26, this shows that, for example in FIGS. 27 and 28, the rectangular parallelepiped BOX' in the three-dimensional space is rotated at an angle 90° for the xy-plane and both of the object image displaying face (SideA) and the facing plane (SideA') are not viewed from the view point PZ. At this time, the image processing apparatus 10 dose not supply the parameters $b_{A11}$ to $b_{A3}$ from a CPU 58 to a read address generating circuit 25, and controls the perspective transformed video signal $V_{3A}$ not to be read from the frame memory $FM_{22}$.

In this way, in accordance with the procedure of FIG. 26, the source video signal $V_{1A}$ input to the image forming part 20 is mapped on the object image displaying face (SideA) of the rectangular parallelepiped BOX' in the three-dimensional virtual space or on its facing plane (SideA'), and it is perspective transformed on the screen surface of two-dimensional plane as if the mapped image in the three-dimensional space exists in the three-dimensional space.

(12) Transformation processing of Second Source Video Signal $V_{1B}$

The image forming part 30 of the image processing apparatus 10 transforms the source video signal $V_{1B}$ on a screen as if the image of source video signal $V_{1B}$ were mapped on the first side face (SideB) of the rectangular parallelepiped BOX moved to a desired position in the three-dimensional virtual space, by using the above transformation matrix T (Equation (3)) and the above matrix $M_B$ (Equation (57)) for mapping the source video signal on the first side face (SideB) of the rectangular parallelepiped BOX (FIG. 8) in the three-dimensional coordinates.

Figure 29:
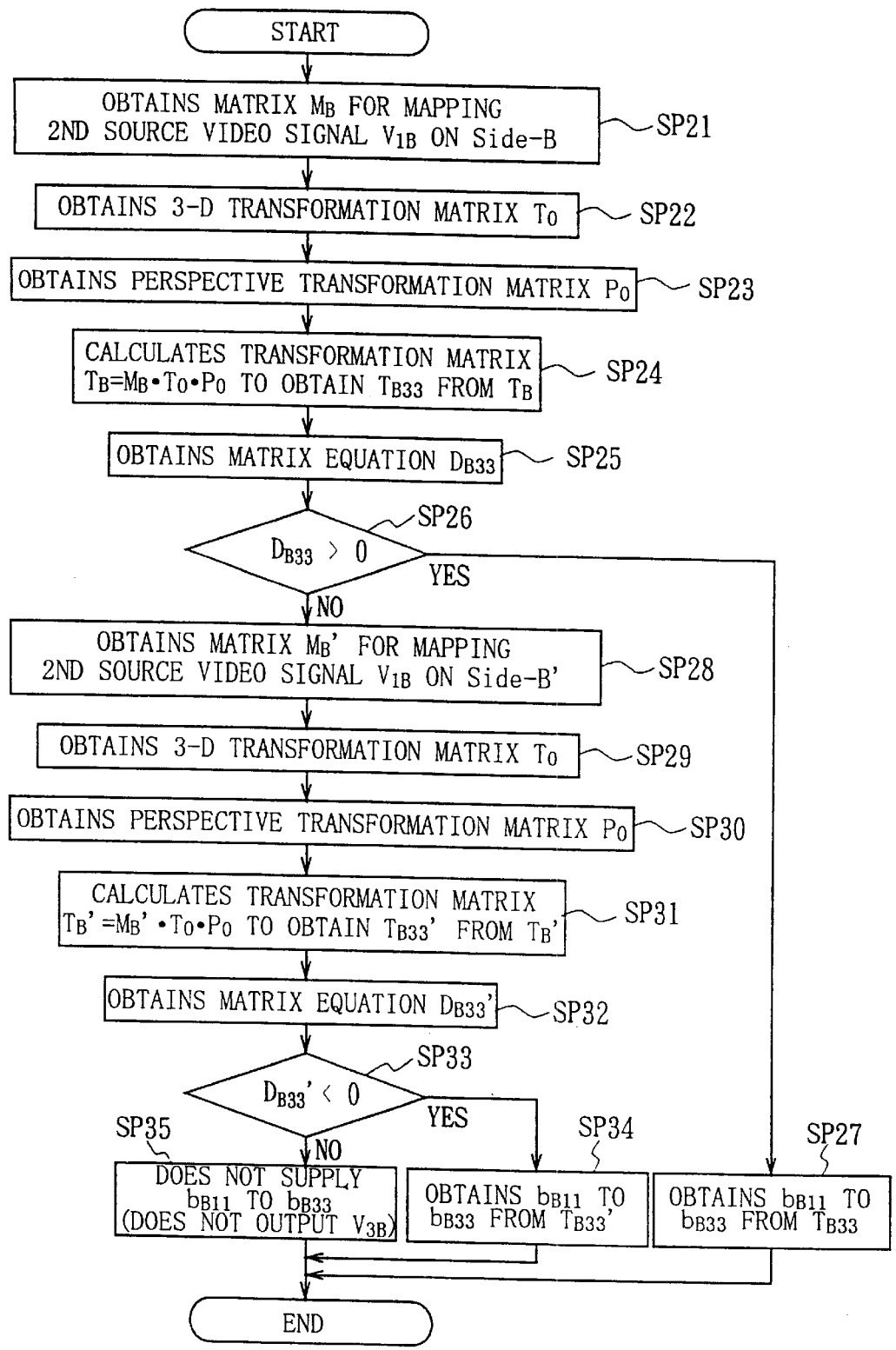
FIG. 29 is a flowchart showing the procedure of mapping the second source video signal.
Figure 30:
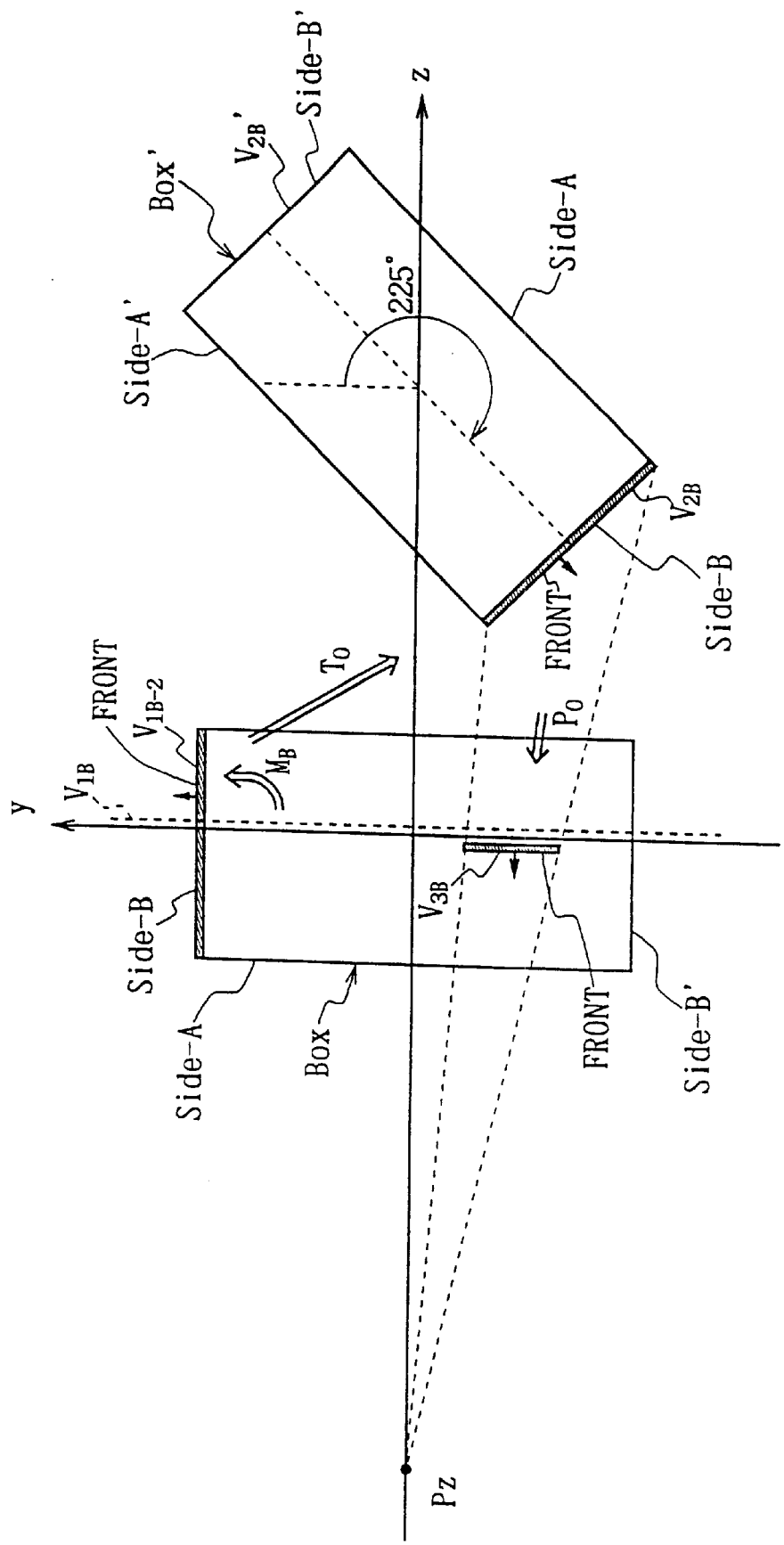
FIG. 30 is a schematic diagram explaining the case where the second source video signal is mapped on the first side face of the solid.

The procedure is shown in FIG. 29. The image processing apparatus 10 uses a CPU 58 and a working memory (ROM 59, RAM 61) to firstly obtain at step SP21 the matrix $M_B$ for mapping the first source video signal $V_{1B}$ on the first side face (SideB) by using the parallel movement matrix $L_{BO}$ (Equation (50)), the magnification/reduction transformation matrix $S_B$ (Equation (52)), the rotational transformation matrix $R_{BX}$ (Equation (53)), the transformation matrix $R_{BZ}$ which inclines for a predetermined angle $\theta_B$. and the parallel movement matrix $L_B$ (Equation (56)) as described relating to the equation (57). As shown in FIG. 30, the source video signal $V_{1B}$ on xy-plane is mapped ($V_{1B-2}$) by the matrix $M_B$ on the first side face (SideB) of the rectangular parallelepiped BOX at a standard position (the position where the center overlaps with the origin O) of three-dimensional coordinates of xyz.

When the-matrix M is obtained at step SP21 of FIG. 29, the image processing apparatus 10 proceeds to step SP22 to obtain the three-dimensional transformation matrix $T_O$ (Equation (1)) which is a basic step of the spatial image transformation for transforming the source video signal $V_{1B}$ on two-dimensional plane to a desired position of three-dimensional coordinates, and then proceeds to step SP23 to obtain the perspective transformation matrix $P_O$ (Equation (2)) which is a basic step of the perspective transformation for, on the screen, seeing through the source video signal $V_{2B}$ moved onto the three-dimensional space by the three-dimensional transformation matrix $T_O$ obtained at step SP22.

Therefore, the video signal $V_{1B-2}$ mapped ($V_{2B}$) on the first side face (SideB) of the rectangular parallelepiped BOX shown in FIG. 30 by the matrix M is displaced by the three-dimensional transformation matrix $T_O$ onto the first side face (SideB) of the rectangular parallelepiped BOX' moved to a desired position in the three-dimensional space. Further, the three-dimensionally transformed video signal $V_{2B}$ is further perspective transformed on the screen of the xy-plane (perspective transformed video signal $V_{3B}$).

In this way, when the transformation matrix $M_B$ for mapping the source video signal $V_{1B}$ on the first side face (SideB), and the basic image transformation matrixes $T_O$ and $P_O$ for transforming the source video signal $V_{1B}$ to a desired position of three-dimensional space and for seeing through the source video signal $V_{1B}$ on the screen plane are obtained, the image processing apparatus 10 proceeds to step SP24 to map the source video signal $V_{1B}$ on the first side face (SideB) in the three-dimensional space, thereafter, the transformation matrix $T_B$ for perspective transforming it on the screen plane is obtained as follows:

$$T_B = M_B \cdot T_O \cdot P_O \tag{73}$$

Here, as described in the equation (4), in the image processing apparatus 10, the source video signal $V_{1B}$ stored in the frame memory $FM_{32}$ and the perspective transformed video signal $V_{3B}$ read from the frame memory $FM_{32}$ are both two-dimensional data, and the data in the z-axis direction in the three-dimensional space is substantially not used in the operation of read address. Therefore, in the transformation matrix of the equation (73), a parameter in third line and third row for operating the data in the z-axis direction is unnecessary for operating the read address for the frame memory $FM_{32}$.

Therefore, the matrix $T_{B33}$ in which the parameter in the third line and third row is excluded from the transformation matrix $T_B$ of the equation (73) is set as a transformation matrix having necessary parameters in the actual operation of two-dimensional read address.

In this way, when the transformation matrix $T_{B33}$ of three lines and three rows is obtained, the image processing apparatus 10 proceeds to step SP25 to obtain the matrix equation $D_{B33}$ of the transformation matrix $T_{B33}$, and proceeds to subsequent step SP26. The step SP26 is a step for judging whether or not the value of the matrix equation $D_{B33}$ of the transformation matrix $T_{B33}$ is plus. When an affirmative result is obtained at step SP26, similar to the case described at step SP6 of FIG. 26, this shows the state that the video signal transformed to be displaced by the transformation matrix $T_{B33}$ orients to the outside on the first side face (SideB) of the rectangular parallelepiped BOX' moved to a desired position in the three-dimensional space, that is, the state that the surface FRONT of the three-dimensional transformed video signal $V_{2B}$ mapped on the first side face (SideB) of the rectangular parallelepiped BOX' in FIG. 28 orients to the outside of the rectangular parallelepiped BOX. At this time, the image processing apparatus 10 proceeds to step SP27 to obtain parameters $b_{B11}$ to $b_{B33}$ from the above equations (28) to (36) for obtaining the read addresses $X_{MB}$, $Y_{MB}$ for the frame memory $FM_{32}$, based on the transformation matrix $T_{B33}$ representing the transformation onto the first side face (SideB).

Based on the parameters $b_{B11}$ to $b_{B33}$ thus obtained, the read address $X_{MB}$, $Y_{MB}$ is obtained from the above equations

(13) and (14), and the source video signal $V_{1B}$ in the frame memory $FM_{32}$ is read by the read address $X_{MB}$, $Y_{MB}$, so that in FIG. 28, the source video signal $V_{1B}$ is mapped on the first side face (SideB) of the rectangular parallelepiped BOX' moved into the three-dimensional space, and simultaneously it can be perspective-transformed on the screen surface of xy-plane. Therefore, the perspective-transformed video signal $V_{3B}$ is read from the frame memory $FM_{32}$.

On the contrary, a negative result is obtained at step SP26 described above, similar to the case of step SP6 of FIG. 26, this shows the state that the video signal transformed to be displaced by the transformation matrix $T_{B33}$ orients to the inside on the first side face (SideB) of the rectangular parallelepiped BOX' moved to a desired position in the three-dimensional space. That is, in FIG. 30, this shows the state that the surface FRONT of the three-dimensional transformed video signal $V_{2B}$ mapped on the first side face (SideB) of the rectangular parallelepiped BOX' orients to the direction opposite to the state of orienting outside the rectangular parallelepiped BOX' (inside direction of the rectangular parallelepiped BOX').

Figure 31:
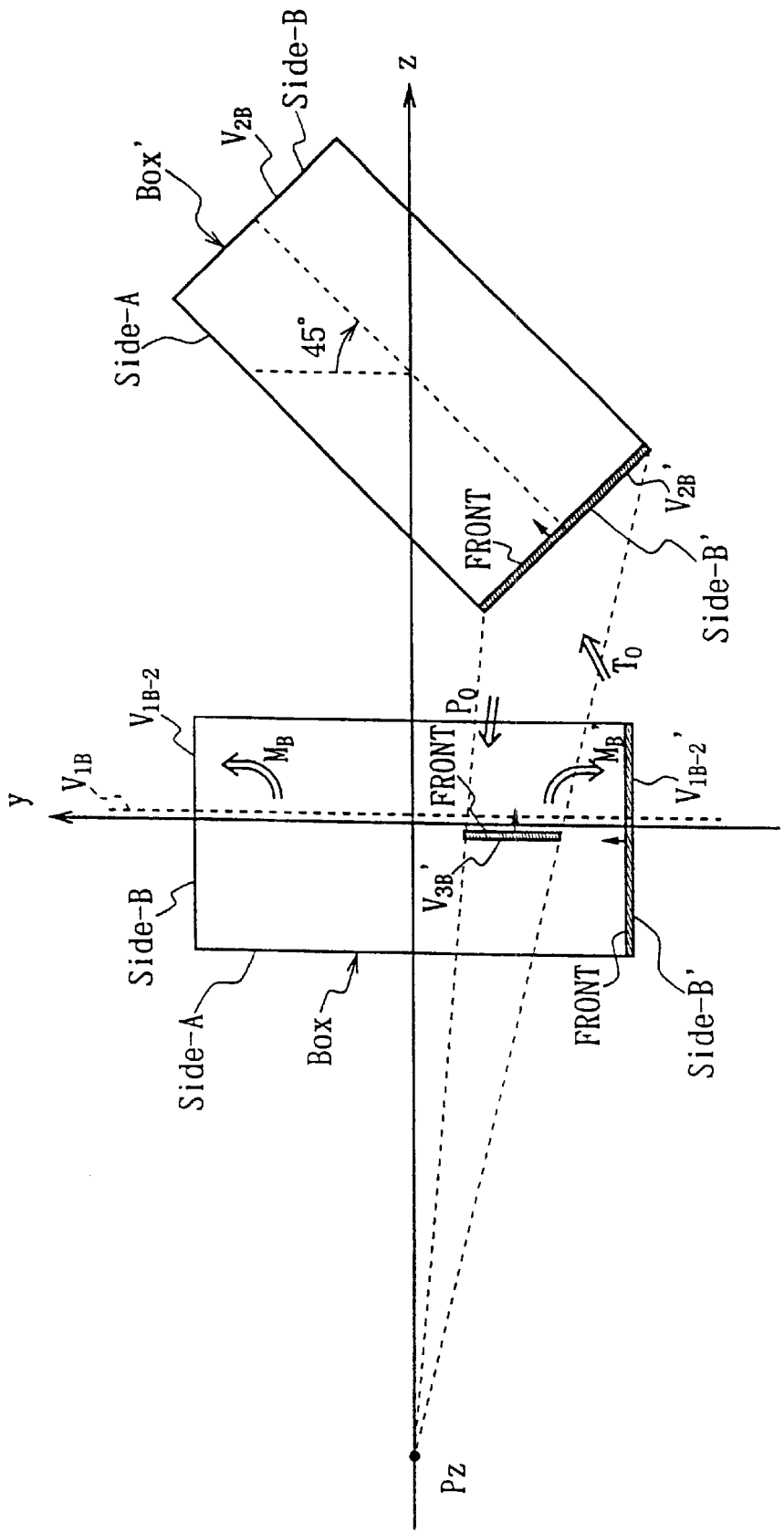
FIG. 31 is a schematic diagram explaining the case where the second source video signal is mapped on the plane facing the first side face of the solid.

More specifically, it can be known that this is not a state where the first side face (SideB) of the rectangular parallelepiped BOX in the three-dimensional space is, as shown in FIG. 30, positioned at a view point PZ side from the facing plane (SideB') of the first side face (SideB), but is a state where the facing plane (SideB') of the first side face (SideB) is, as shown in FIG. 31, positioned at the view point PZ side. That is, in FIG. 30, the rectangular parallelepiped BOX in the three-dimensional space rotates at 225° for the xy-plane. On the contrary, in FIG. 31, the rectangular parallelepiped BOX' in the three-dimensional space rotates at 45° for the xy-plane.

In addition, in this state, the surface FRONT of the three-dimensional transformed video signal $V_{2B}'$ being the source video signal $V_{1B}$ three-dimensionally transformed is mapped on the facing plane (SideB') so as to orient to inside the rectangular parallelepiped BOX', that is to the plus direction of the z-axis.

In this way, when a negative result is obtained at step SP26 in FIG. 29, the image processing apparatus 10 proceeds to step SP28 to obtain the matrix $M_B'$ for mapping the second source video signal $V_{1B}$ on the facing plane (SideB') of the first side face (SideB) by using the parallel movement matrix $L_{BO}$ (Equation (50)), the magnification/reduction transformation matrix $S_B$ (Equation (52)), the rotational transformation matrix $R_{BX}$ (Equation (53)), and the transformation matrix $R_{BZ}$ for inclining for a predetermined angle $\theta_B$, and the parallel movement matrix $L_B'$ (Equation (58)), as described relating to the equation (59). As shown in FIG. 31, the source video signal $V_{1B}$ on xy-plane is mapped ($V_{1B-2}'$) on the facing plane (SideB') of the first side face (SideB) of the rectangular parallelepiped BOX in the three-dimensional coordinates of xyz by the matrix $M_B'$.

When the matrix $M_B'$ is obtained at step SP28 in FIG. 29, the image processing apparatus 10 obtains the three-dimensional transformation matrix $T_O$ (Equation (1)) and the perspective transformation matrix $P_O$ (Equation (2)) at steps SP29 and SP30, similar to the above steps SP22 and SP23.

Therefore, the video signal $V_{1B-2}'$ mapped on the facing plane (SideB') of the first side face (SideB) of the rectangular parallelepiped BOX in FIG. 31 is displaced ($V_{2B}'$) by the three-dimensional transformation matrix $T_O$ to the facing plane (SideB') of the first side face (SideB) of the rectangular parallelepiped BOX moved to a desired position in the three-dimensional space. Further, the video signal $V_{2B}'$ three-dimensionally transformed to be displaced is perspective-transformed on the screen of xy-plane (perspective-transformed video signal $V_{3B}'$).

In this way, when the transformation matrix $M_B'$ for mapping the source video signal $V_{1B}$ on the facing plane (SideB') of the first side face (SideB), the basic image transformation matrix $T_O$ for transforming to a desired position in the three-dimensional space, and the basic image transformation matrix $P_O$ for perspective-transforming on the screen surface are obtained, the image processing apparatus 10 proceeds to step SP31 to map the source video signal $V_{1B}$ on the facing plane (SideB') of the first side face (SideB) in the three-dimensional space, thereafter, the transformation matrix $T_B'$ for perspective-transforming it on the screen surface is obtained by the following equation:

$$T_B' = M_B' \cdot T_O \cdot P_O \quad (74)$$

Here, as described relating to the equation (4), in the image processing apparatus 10, the source video signal $V_{1B}$ stored in the frame memory $FM_{32}$ and the perspective-transformed video signal $V_{3B}$ read from the frame memory $FM_{32}$ are both two-dimensional data. In the operation of the read address, the data in the z-axis direction in the three-dimensional space is practically not used. Therefore, in the transformation matrix of the equation (74), the parameters in third line and third row for operating the data in the z-axis direction is not needed to operate the read address for the frame memory $FM_{32}$.

Therefore, the matrix $T_{B33}'$ in which the parameters in third line and third row is removed from the transformation matrix $T_B'$ of the equation (74) is the transformation matrix having the parameters necessary to operate the two-dimensional read address actually.

Thus, when the transformation matrix $T_{B33}'$ of three lines and three rows is obtained, the image processing apparatus 10 proceeds to step SP32 to obtain the matrix equation $D_{B33}'$ of the transformation matrix $T_{B33}'$ and proceeds to the following step SP33. Step SP33 is a step for judging whether or not the value of matrix equation $D_{B33}'$ is minus. When an affirmative result is obtained at step SP33, this expresses the state that the video signal transformed to be displaced by the transformation matrix $T_{B33}'$ orients to the inside on the facing plane (SideB') of the first side face (SideB) of the rectangular parallelepiped BOX' moved to a desired position in the three-dimensional space, that is, the state where the surface FRONT of the three-dimensionally transformed video signal $V_{2B}'$ mapped on the facing plane (SideB') of the first side face (SideB) of the rectangular parallelepiped BOX' in FIG. 31 orients to the inside of the rectangular parallelepiped BOX'. At this time, the image processing apparatus 10 proceeds to step SP34 to obtain the parameters $b_{B11}$ to $b_{B33}$ for obtaining the read addresses $X_{MB}$, $Y_{MB}$ for the frame memory $FM_{32}$ based on the transformation matrix $T_{B33}'$ representing the transformation onto the facing plane (SideB') of the first side face (SideB), from the equations (28) to (36) described above.

On the basis of thus obtained parameters $b_{B11}$ to $b_{B33}$, the read address $X_{MB}$, $Y_{MB}$ are obtained from the above equations (13) and (14) to read the source video signal $V_{1B}$ in the frame memory $FM_{32}$ by the read address $X_{MB}$, $Y_{MB}$. Thereby, the source video signal $V_{1B}$ can be mapped on the facing plane (SideB') of the first side face (SideB) of the rectangular parallelepiped BOX' moved into the three-dimensional space in FIG. 31, and it can be perspective-transformed on the screen surface of xy-plane. Therefore, the perspective-transformed video signal $V_{3B}'$ is read from the frame memory $FM_{32}$ On the contrary, when a negative result is obtained at step SP33 in FIG. 29, this shows that, for example in FIGS. 30 and 31, the rectangular parallelepiped BOX in the three-dimensional space is not rotated for the xy-plane and both of the first side face (SideB) and the facing plane (Side') are not viewed from the view point PZ. At this time, the image processing apparatus 10 dose not supply the parameters $b_{B11}$ to $b_{B33}$ from a CPU 58 to a read address generating circuit 35, and controls the perspective-transformed video signal $V_{3B}$ not to be read from the frame memory $FM_{32}$.

In this way, in accordance with the procedure of FIG. 29, the source video signal $V_{1B}$ input to the image forming part 30 is mapped on the first side face (SideB) of the rectangular parallelepiped BOX in the three-dimensional virtual space or on its facing plane (SideB'), and it is perspective-transformed on the screen surface of two-dimensional plane as if the mapped image in the three-dimensional space exists in the three-dimensional space.

(13) Transformation processing of Third Source Video Signal $V_{1C}$

The image forming part 40 of the image processing apparatus 10 transforms the source video signal $V_{1C}$ on a screen as if the image of source video signal $V_{1C}$ were mapped on the second side face (SideC) of the rectangular parallelepiped BOX moved to a desired position in the three-dimensional virtual space, by using the above transformation matrix T (Equation (3)) and the above matrix $M_C$ (Equation (47)) for mapping the source video signal on the second side face (SideC) of the rectangular parallelepiped BOX (FIG. 8) on the three-dimensional coordinates.

Figure 32:
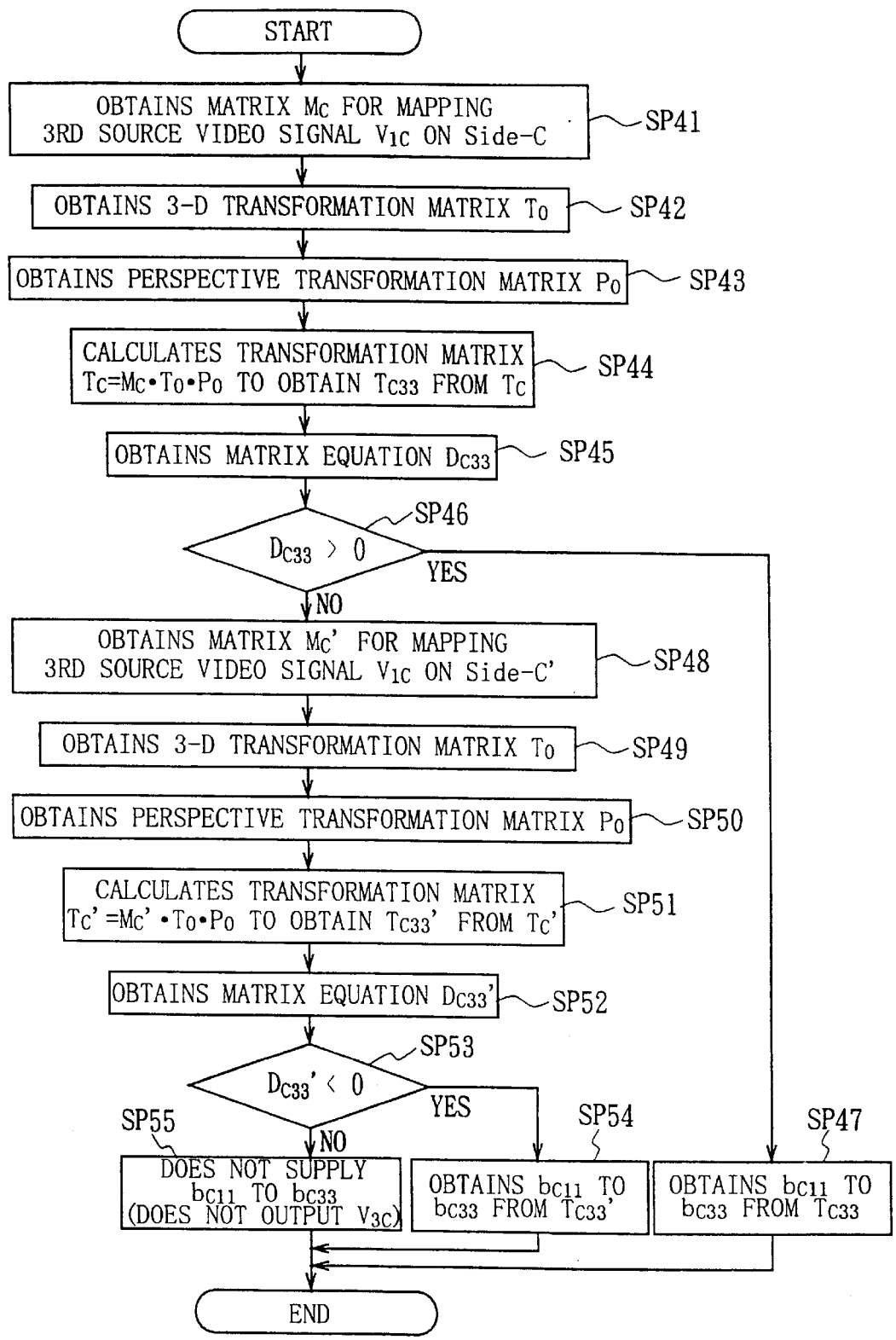
FIG. 32 is a flowchart showing the procedure of mapping the third source video signal.

The procedure is shown in FIG. 32. The image processing apparatus 10 uses a CPU 58 and a working memory (ROM 59, RAM 61) to firstly obtain at step SP41 the matrix $M_C$ for mapping the third source video signal $V_{1C}$ on the second side face (SideC) by using the parallel movement matrix $L_{CO}$ (Equation (60)), the magnification/reduction transformation matrix $S_C$ (Equation (62)), the rotational transformation matrix $R_{CX}$ (Equation (63)), the transformation matrix $R_{CZ}$ which inclines for a predetermined angle $\theta_C$, and the parallel movement matrix $L_C$ (Equation (66)) as described relating to the equation (67). The source video signal $V_{1C}$ on xy-plane is mapped ($V_{1C-2}$) by the matrix $M_C$ on the second side face (SideC) of the rectangular parallelepiped BOX at a standard position (the position where the center overlaps with the origin O) of three-dimensional coordinates of xyz.

When the matrix $M_C$ is obtained at step SP41 of FIG. 32, the image processing apparatus 10 proceeds to step SP42 to obtain the three-dimensional transformation matrix $T_O$ (Equation (1)) which is a basic step of the spatial image transformation for transforming the source video signal $V_{1C}$ on the two-dimensional plane to a desired position of the three-dimensional coordinates, and then proceeds to step SP43 to obtain the perspective transformation matrix $P_O$ (Equation (2)) which is a basic step of the perspective transformation for, on the screen, seeing through the source video signal $V_{2C}$ moved into the three-dimensional space by the three-dimensional transformation matrix $T_O$ obtained at step SP42.

Therefore, the video signal $V_{1C-2}$ mapped on the second side face (SideC) of the rectangular parallelepiped BOX by the matrix $M_C$ is displaced ($V_{2C}$) by the three-dimensional transformation matrix $T_O$ onto the second side face (SideC) of the rectangular parallelepiped BOX' moved to a desired position in the three-dimensional space. Further, the three-dimensionally transformed video signal $V_{2C}$ is further perspective transformed on the screen plane of the xy-plane (perspective-transformed video signal $V_{3C}$).

In this way, when the transformation matrix $M_C$ for mapping the source video signal $V_{1C}$ on the second side face (SideC), and the basic image transformation matrixes $T_O$ and $P_O$ for transforming the source video signal $V_{1C}$ to a desired position of the three-dimensional space and for seeing through the source video signal $V_{1C}$ on the screen are obtained, the image processing apparatus 10 proceeds to step SP44 to map the source video signal $V_{1C}$ on the second side face (SideC), thereafter, the transformation matrix $T_C$ for perspective-transforming it on the screen is obtained as follows:

$$T_C = M_C \cdot T_O \cdot P_O \qquad (75)$$

Here, as described in the equation (4), in the image processing apparatus 10, the source video signal $V_{1C}$ stored in the frame memory $FM_{42}$ and the perspective-transformed video signal $V_{3C}$ read from the frame memory $FM_{42}$ are both two-dimensional data, and the data in the z-axis direction in the three-dimensional space is substantially not used in the operation of read address. Therefore, in the transformation matrix of the equation (75), parameters in third line and third row for operating the data in the z-axis direction is unnecessary for operating the read address from the frame memory $FM_{42}$. Therefore, the matrix $T_{C33}$ in which the parameter in third line and third row is excluded from the transformation matrix $T_C$ of the equation (75) is set as a transformation matrix having necessary parameters in actual operation of two-dimensional read address.

In this way, when the transformation matrix $T_{C33}$ of third line and third row is obtained, the image processing apparatus 10 proceeds to step SP45 to obtain the matrix equation $D_{C33}$ of the transformation matrix $T_{C33}$, and proceeds to subsequent step SP46. The step SP46 is a step for judging whether or not the value of the matrix equation $D_{C33}$ of the transformation matrix $T_{C33}$ is plus. When an affirmative result is obtained at step SP46, similar to the case described at step SP6 of FIG. 26, this shows the state that the video signal transformed to be displaced by the transformation matrix $T_{C33}$ orients to the outside on the second side face (SideC) of the rectangular parallelepiped BOX' moved to a desired position in the three-dimensional space, that is, the state that the surface FRONT of the three-dimensional transformed video signal $V_{2C}$ mapped on the second side face (SideC) of the rectangular parallelepiped BOX' orients to the outside of the rectangular parallelepiped BOX'. At this time, the image processing apparatus 10 proceeds to step SP47 to obtain parameters $b_{C11}$ to $b_{C33}$ from the above equations (28) to (36) for obtaining the read addresses $X_{MC}$, $Y_{MC}$ to the frame memory $FM_{42}$, based on the transformation matrix $T_{C33}$ representing the transformation onto the second side face (SideC).

Based on the parameters $b_{C11}$ to $b_{C33}$ thus obtained, the read addresses $X_{MC}$, $Y_{MC}$ are obtained from the above equations (13) and (14), and the source video signal $V_{1C}$ in the frame memory $FM_{42}$ is read by the read addresses $X_{MC}$, $Y_{MC}$, so that the source video signal $V_{1C}$ is mapped on the second side face (SideC) of the rectangular parallelepiped BOX' moved into the three-dimensional space, and simultaneously it can be perspective-transformed on the screen surface of xy-plane. Therefore, the perspective transformed video signal $V_{3C}$ is read from the frame memory $FM_{42}$.

On the contrary, a negative result is obtained at step SP46 described above, similar to the case of step SP6 of FIG. 26, this shows the state that the video signal transformed to be displaced by the transformation matrix $T_{C33}$ orients to the inside on the second side face (SideC) of the rectangular parallelepiped BOX' moved to a desired position in the three-dimensional space. That is, this shows the state that the surface FRONT of the three-dimensional transformed video signal $V_{2C}$ mapped on the second side face (SideC) of the rectangular parallelepiped BOX' orients to the direction opposite to the state of orienting outside the rectangular parallelepiped BOX' (inside direction of the rectangular parallelepiped BOX').

More specifically, it can be known that this is not a state where the second side face (SideC) of the rectangular parallelepiped BOX' in the three-dimensional space is positioned at a view point PZ side from the facing plane (SideC') of the second side face (SideC), but is a state where the facing plane (SideC') of the second side face (SideC) is positioned at the view point PZ side.

In addition, in this state, the surface FRONT of the three-dimensional transformed video signal $V_{2C}$' being the source video signal $V_{1C}$ three-dimensionally transformed is mapped on the facing plane (SideC') so as to orient to inside the rectangular parallelepiped BOX', that is to the plus direction of the z-axis.

In this way, when a negative result is obtained at step SP46 in FIG. 32, the image processing apparatus 10 proceeds to step SP48 to obtain the matrix $M_C$' for mapping the second source video signal $V_{1C}$ on the facing plane (SideC') of the second side face (SideC) by using the parallel movement matrix $L_{CO}$ (Equation (60)), the magnification/reduction transformation matrix $S_C$ (Equation (62)), the rotational transformation matrix $R_{CX}$ (Equation (63)), and the transformation matrix $R_{CZ}$ for inclining for a predetermined angle $\theta_C$, and the parallel movement matrix $L_C$' (Equation (68)), as described relating to the equation (69). The source video signal $V_{1C}$ on xy-plane is mapped ($V_{1C-2}$') on the facing plane (SideC') of the second side face (SideC) of the rectangular parallelepiped BOX in the three-dimensional coordinates of xyz by the matrix $M_C$'.

When the matrix $M_B$' is obtained at step SP48 in FIG. 32, the image processing apparatus 10 obtains the three-dimensional transformation matrix $T_O$ (Equation (1)) and the perspective transformation matrix $P_O$ (Equation (2)) at steps SP49 and SP50, similar to the above steps SP42 and SP43.

Therefore, the video signal $V_{1C-2}$' mapped on the facing plane (SideC') of the second side face (SideC) of the rectangular parallelepiped BOX is displaced ($V_{2C}$') by the three-dimensional transformation matrix $T_O$ to the facing plane (SideC') of the second side face (SideC) of the rectangular parallelepiped BOX moved to a desired position in the three-dimensional space. The video signal $V_{2C}$' three-dimensionally transformed to be displaced is further perspective-transformed on the screen plane of xy-plane (perspective-transformed video signal $V_{3C}$').

In this way, when the transformation matrix $M_C$' for mapping the source video signal $V_{1C}$ on the facing plane (SideC') of the second side face (SideC), the basic image transformation matrix $T_O$ for transforming to a desired position in the three-dimensional space, and the basic image transformation matrix $P_O$ for perspective-transforming on the screen surface are obtained, the image processing apparatus 10 proceeds to step SP51 to map the source video signal $V_{1C}$ on the facing plane (SideC') of the second side face (SideC) in the three-dimensional space, thereafter, the transformation matrix $T_C$' for perspective-transforming it on the screen surface is obtained by the following equation:

$$T_C'=M_C'\cdot T_O\cdot P_O \tag{76}$$

Here, as described relating to the equation (4), in the image processing apparatus 10, the source video signal $V_{1C}$ stored in the frame memory $FM_{42}$ and the perspective transformed video signal $V_{3C}$ read from the frame memory $FM_{42}$ are both two-dimensional data. In the operation of the read address, the data in the z-axis direction in the three-dimensional space is practically not used. Therefore, in the transformation matrix of the equation (76), the parameters in the third line and third row for operating the data in the z-axis direction are not needed to operate the read address for the frame memory $FM_{42}$.

Therefore, the matrix $T_{C33}$' in which the parameters in the third line and third row is removed from the transformation matrix $T_B$' of the equation (76) is the transformation matrix having the parameters necessary to operate the two-dimensional read address actually.

Thus, the transformation matrix $T_{C33}$' of three lines and three rows is obtained, the image processing apparatus 10 proceeds to step SP52 to obtain the matrix equation $D_{C33}$' of the transformation matrix $T_{C33}$' and proceeds to the following step SP53. Step SP53 is a step for judging whether or not the value of matrix equation $D_{C33}$' is minus. When an affirmative result is obtained at step SP53, this expresses the state that the video signal transformed to be displaced by the transformation matrix $T_{C33}$' orients to the inside on the facing plane (SideC') of the second side face (SideC) of the rectangular parallelepiped BOX' moved to a desired position in the three-dimensional space, that is, the state the surface FRONT of the three-dimensionally transformed video signal $V_{2C}$' mapped on the facing plane (SideC') of the second side face (SideC) of the rectangular parallelepiped BOX' orients to the inside of the rectangular parallelepiped BOX'. At this time, the image processing apparatus 10 proceeds to step SP54 to obtain the parameters $b_{C11}$ to $b_{C33}$ for obtaining the read addresses $X_{MC}$, $Y_{MC}$ for the frame memory $FM_{42}$ based on the transformation matrix $T_{C33}$' representing the transformation to the facing plane (SideC') of the second side face (SideC), from the equations (28) to (36) described above.

On the basis of thus obtained parameters $b_{C11}$ to $b_{C33}$ the read address $X_{MC}$, $Y_{MC}$ are obtained from the above equations (13) and (14) to read the source video signal $V_{1C}$ in the frame memory $FM_{42}$ by the read address $X_{MC}$, $Y_{MC}$. Thereby, the source video signal $V_{1C}$ can be mapped on the facing plane (SideC') of the second side face (SideC) of the rectangular parallelepiped BOX moved into the three-dimensional space, and it can be perspective-transformed on the screen surface of xy-plane. Therefore, the perspective-transformed video signal $V_{3C}$' is read from the frame memory $FM_{42}$ On the contrary, when a negative result is obtained at step SP53 in FIG. 32, this shows that, for example, the rectangular parallelepiped BOX' in the three-dimensional space is not rotated for the xy-plane and both of the second side face (SideC) and the facing plane (SideC') are not viewed from the view point PZ. At this time, the image processing apparatus 10 dose not supply the parameters $b_{C11}$ to $b_{C33}$ from a CPU 58 to a read address generating circuit 35, and controls the perspective-transformed video signal $V_{3C}$ not to be read from the frame memory $FM_{42}$.

In this way, in accordance with the procedure of FIG. 32, the source video signal $V_{1C}$ input to the image forming part 30 is mapped on the second side face (SideC) of the rectangular parallelepiped BOX' in the three-dimensional virtual space or on its facing plane (SideC'), and it is perspective-transformed on the screen surface of two-dimensional plane as if the mapped image in the three-dimensional space exists in the three-dimensional space.

(14) Operations and Effects of the Embodiment

With the above construction, firstly, an operator operates a three-dimensional pointing device or keys provided on a control panel 56, to input parameters necessary for operating the read address used in the image processing apparatus of this invention. Here, the parameters necessary for operating the read address are respective cropping positions of source video signals $V_{1A}$, $V_{1B}$, and $V_{1C}$, the thickness for the object image displaying face (SideA) of the rectangular parallelepiped BOX, the rate transformation rate in the x-axis direction $r_x$, the rate transformation rate in the y-axis direction $r_y$, the skew rate in the x-axis direction $s_x$, and the skew rate in the y-axis direction $s_y$.

The CPU 58 of the image processing apparatus 10 receives these parameters input from the control panel 56 and reflects these to the operation of read address in real time. More specifically, the CPU 58 monitors the change of parameters supplied from the control panel 56 for each frame, and calculates the parameters $b_{A11}$ to $b_{A33}$, $b_{B11}$ to $b_{B33}$, $b_{C11}$ to $b_{C33}$ for calculating the read address based on the supplied parameters for each frame.

Thereby, the parameters can be changed in real time for each frame in accordance with the operator's operation, and the read address is calculated in real time in accordance with the changed parameters.

Next, the operator operates the three-dimensional pointing device, etc. provided on the control panel 56 to instruct the three-dimensional image transformation to the source video signals $V_{1A}$, $V_{1B}$, and $V_{1C}$. When the three-dimensional image transformation is instructed by the operator, the CPU 58 receives the parameters "$r_{11}$ to $r_{33}$", "lx", "ly", "lz" and "s" of the three-dimensional transformation matrix $T_O$ specified by the operator from the control panel 56, and reflects these parameters to the calculation of the read address in real time. More specifically, the CPU 58 monitors the change of the parameters for each frame, and calculates the parameters $b_{A11}$ to $b_{A33}$, $b_{B11}$ to $b_{B33}$, and $b_{C11}$ to $b_{C33}$ for calculating the read address is calculated based on the supplied parameters for each frame. Next, the CPU 58 calculates the parameters of three-dimensional transformation matrix $T_{33}^{-1}$ based on the received parameters "$r_{11}$ to $r_{33}$", "lx", "ly", "lz", and "s", so as to calculate the read addresses $X_{MA}$, $Y_{MA}$, $X_{MB}$, $Y_{MB}$, $X_{MC}$, $Y_{MC}$.

In this way, in the image processing apparatus 10, as shown in FIG. 8, as a size of the rectangular parallelepiped BOX which exists on the virtual space of three-dimensional coordinates of xyz, the length of edge $H_B$ at a first side face (SideB) side of the object image displaying face (SideA), the length of edge $H_B'$ at the facing plane (Side') of the first side face (SideB) side of the object image displaying face (SideA), the length of edge $H_C$ at a second side face (SideC) side of the object image displaying face (SideA), and the length of edge $H_C'$ at the facing plane (SideC') of the second side face (SideC) side of the object image displaying face (SideA) are specified based on the points represented by xy-coordinates, $(x_1, y_1)$, $(x_2, y_2)$, $(x_3, y_3)$, and $(x_4, y_4)$.

Therefore, the source video signal $V_{1B}$ mapped on the first side face (SideB) which contacts via the edge $H_B$ to the object image displaying face (SideA) is transformed into that having a size to coincide to the length of the edge $H_B$ by the parameter $r_{BX}$ of the magnification/reduction matrix $S_B$. The source video signal $V_{1B}$ mapped on the facing plane (SideB') of the first side face (SideB) which contacts via the edge $H_B'$ to the object image displaying face (SideA) is transformed into that having a size to coincide to the length of the edge $H_B'$ by the parameter $r_{BX}$ of the magnification/reduction matrix $S_B$. The source video signal $V_{1C}$ mapped on the second side face (SideC) which contacts via the edge $H_C$ to the object image displaying face (SideA) is transformed into that having a size to coincide to the length of the edge $H_C$ by the parameter $r_{CX}$ of the magnification/reduction matrix $S_C$. The source video signal $V_{1C}$ mapped on the facing plane (SideC') of the second side face (SideC) which contacts via the edge $H_C'$ to the object image displaying face (SideA) is transformed into that having a size to coincide to the length of the edge $H_C'$ by the parameter $r_{CX}$ of the magnification/reduction matrix $S_C$.

Further, as a size of the rectangular parallelepiped BOX, the thickness "h" between the object image displaying face (SideA) and the facing plane (SideA') is specified by an operator. Based on the thickness "h", the source video signal $V_{1B}$ mapped on the first side face (SideB) is transformed into that having a size which coincides to the length of the thickness "h" by the parameter $r_{BY}$ of the magnification/reduction matrix $S_B$. The source video signal $V_{1B}$ mapped on the facing plane (SideB') of the first side face (SideB) is transformed into that having a size which coincides to the length of the thickness "h" by the parameter $r_{BY}$ of the magnification/reduction matrix $S_B$. The source video signal $V_{1C}$ mapped on the second side face (SideC) is transformed into that having a size which coincides to the length of the thickness "h" by the parameter $r_{cy}$ of the magnification/reduction matrix $S_C$. The source video signal $V_{1C}$ mapped on the facing plane (SideC') of the second side face (SideC) is transformed into that having a size which coincides to the length of the thickness "h" by the parameter $r_{cy}$ of the magnification/reduction matrix $S_C$.

In this way, the source video signals $V_{1B}$ and $V_{1C}$ mapped on respective planes of the rectangular parallelepiped BOX in the three-dimensional space (first side face (SideB) and the facing plane (SideB'), and second side face (SideC) and the facing plane (SideC')) are transformed into that having a size in accordance with the size of the rectangular parallelepiped BOX. Further, by the movement matrix $L_B$ and $L_B'$ and movement $L_C$ and $L_C'$, the first side face (SideB) and the facing plane (SideB'), and the second side face (SideC) and the facing plane (SideC') are transformed so as to contact with the object image displaying face (SideA).

Further, when the rectangular parallelepiped BOX in the three-dimensional space is moved to a desired position by the operation of operator, in accordance with the change of respective parameters $r_{11}$ to $r_{33}$, $l_x$, $l_y$, $l_z$, the parameters $b_{11}$ to $b_{33}$ for generating the read addresses $X_M$, $Y_M$ from the frame memory FM are changed. Thereby, the respective source video signals $V_{1A}$, $V_{1B}$, and $V_{1C}$ are moved in accordance with the movement of the rectangular parallelepiped BOX in the three-dimensional space, keeping the state where they stacks on the face to be mapped respectively.

Therefore, with the above constitution, the rectangular parallelepiped BOX in the three-dimensional space is only moved by the device of operator, and the respective source video signal $V_{1A}$, $V_{1B}$, and $V_{1C}$ to be mapped on respective faces of the rectangular parallelepiped BOX are moved similarly in accordance with the movement, so that the respective source video signals $V_{1A}$, $V_{1B}$, and $V_{1C}$ can be displayed on the screen surface 55A in real time by the simple operation of operator as if the rectangular parallelepiped BOX is moved in the three-dimensional space, keeping the state where the respective source video signals $V_{1A}$, $V_{1B}$, and $V_{1C}$ are mapped on respective faces.

(15) Other Embodiments

Note that, the aforementioned embodiment has dealt with the case where, as described in FIG. 28, the perspective video signal $V_{3A}'$ mapped on a position of the facing plane (SideA') of the object image displaying face (SideA) and projected (seen through) on the xy-plane orients to the plus direction of the z-axis in FIG. 28. More specifically, the surface FRONT of the perspective video source $V_{3A}'$ orients not in the direction of the view point PZ side, but in the opposite direction of the view point PZ. Therefore, the image that the perspective video signal $V_{3A}'$ is viewed from its back is displayed on the screen, so that the reverse image to the image to be displayed naturally is displayed.

Figure 33:
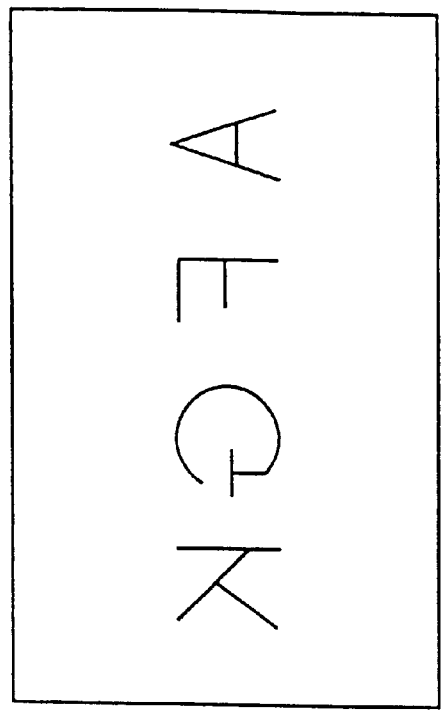
FIGS. 33A and 33B are schematic diagrams explaining the inversion processing of the image mapped on the face of solid in the horizontal direction.
Figure 33:
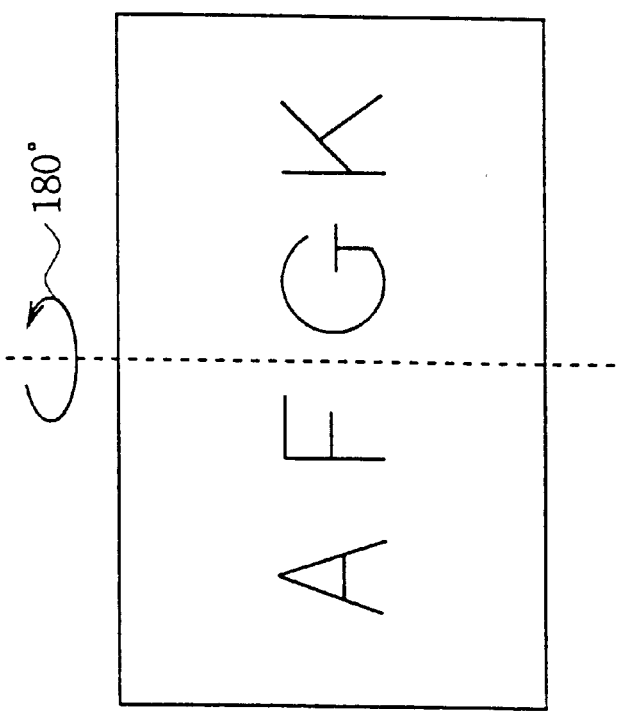

Thereby, in this case, as shown in FIG. 33, the image processing apparatus 10 may has two reversal modes for making the source video signal $V_1$ to be reversed so that the right side and the wrong side are replaced, when the source video signal $V_1$ is stored in the frame memory FM.

More specifically, the two reversal modes are a horizontal direction reversal mode and a vertical direction reversal mode described below. The horizontal reversal mode is, as shown in FIG. 33A, a method of writing the source video signal in the frame memory FM so that the images of the left side and the right side for the y-axis are reversed in the horizontal direction. To realize this method, in a normal mode for writing the supplied source video signal $V_1$ which does not reversed in the frame memory FM as it is, when the write address for supplying it in the frame memory FM is $(X_W, Y_W)$, the code of the x-coordinate value of the write address is only replaced to reverse the image in the horizontal direction (it is rotated for 180° with the y-axis being centered). Therefore, in the horizontal reversal mode, the write address $(-X_W, Y_W)$ is supplied in the frame memory FM, so as to reverse the right side and the wrong side of the image as shown in FIG. 33B. In FIG. 33B, the reversed video signal $V_1$ orients to the direction of the back side of paper, and it can be read as a normal character when seen from the back of the paper.

Figure 34:
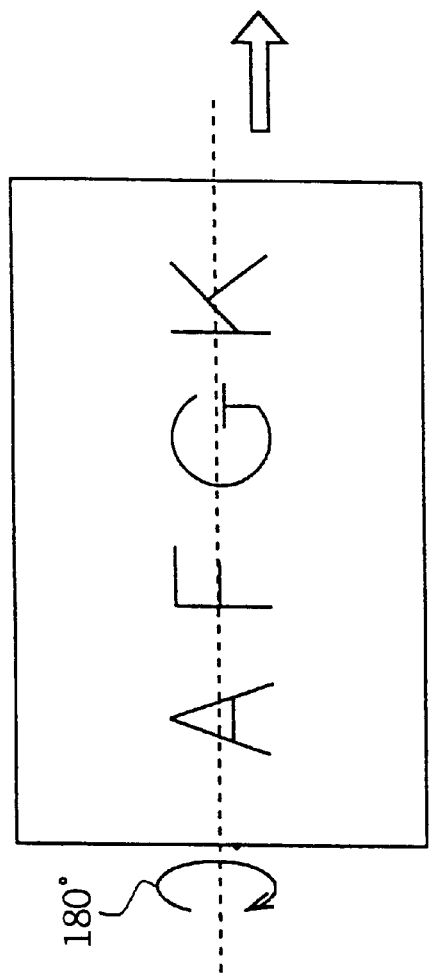
FIGS. 34A and 34B are schematic diagrams explaining the inversion processing of the image mapped on the face of solid in the vertical direction.
Figure 34:
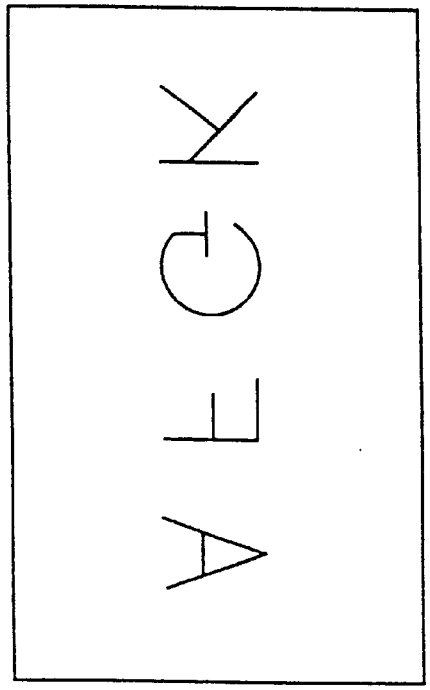

On the contrary, the vertical direction reversal mode is, as shown in FIG. 34A, a mode of writing the source video signal $V_1$ in the frame memory FM so that the entire images with the x-axis being centered in the rotation are rotated for 180° (that is, the images of right and left is reversed in the horizontal direction for the x-axis). That is, the code of the y-coordinate value of the write address is only replaced to reverse the image in the vertical direction (it is rotated for 180° with x-axis being centered). Therefore, in the vertical reversal mode, the write address $(x_W, -Y_W)$ is supplied in the frame memory FM, so as to reverse the right side and the wrong side of the image as shown in FIG. 34B. In FIG. 34B, the reversed video signal orients to the direction of the back side of paper, and it can be read as a normal character when seen from the back of the paper.

Figure 35:
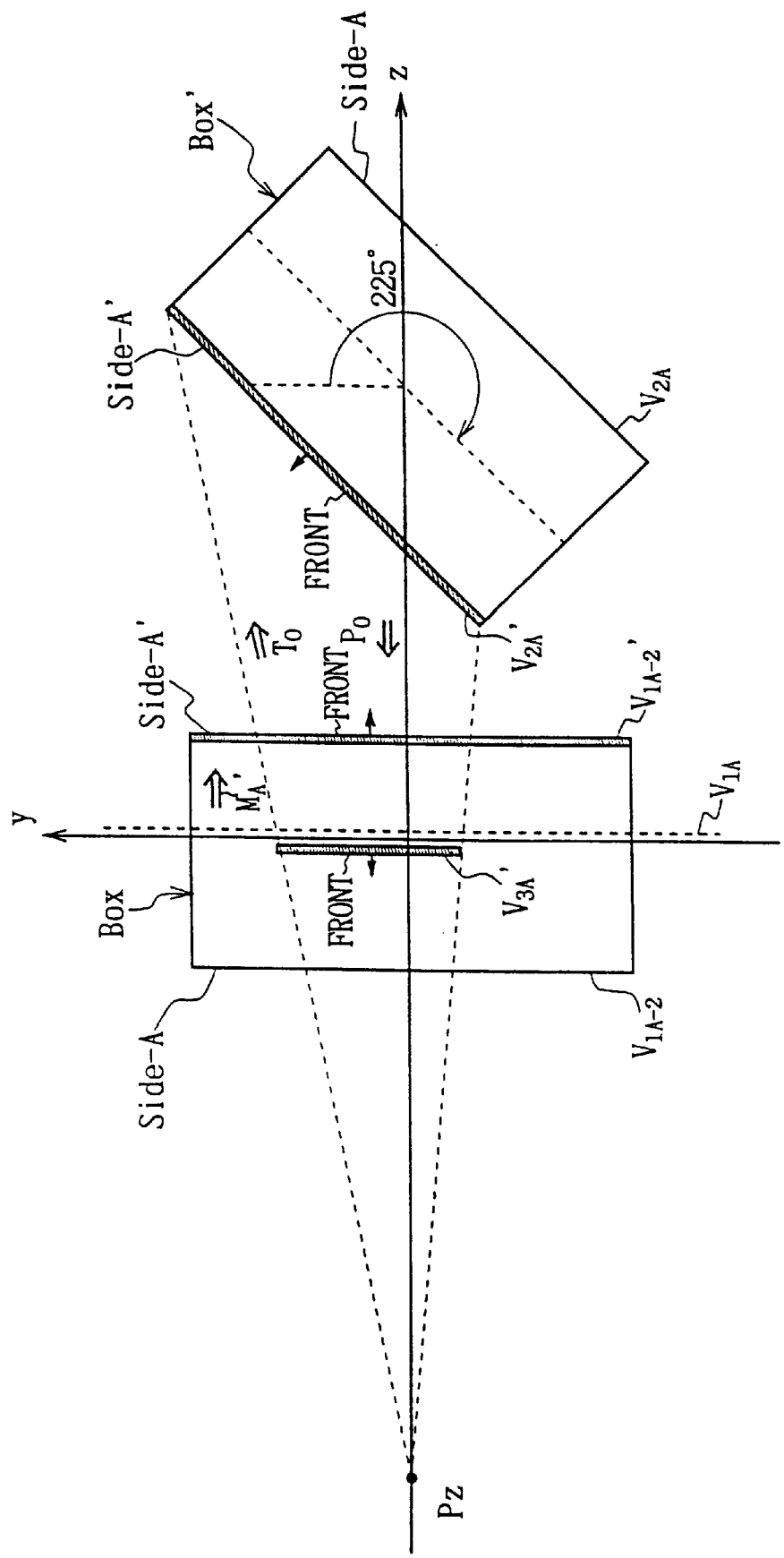
FIG. 35 is a schematic diagram explaining the inversion processing of the image mapped on the face of solid.

The source video signal $V_{1A}$ reversed as shown in FIGS. 33B and 34B and written in the frame memory FM orients to the plus direction of z-axis as shown in FIG. 35. That is, the perspective video signal $V_{3A}'$ which is mapped on the facing plane (SideA') of the object image displaying face (SideA) and which is seen through on the xy-plane orients to the view point PZ as shown in FIG. 35. Therefore, the image that the perspective video signal $v_{3A}'$ is viewed from the front side is displayed on the screen.

Further, the embodiment described above has dealt with the case where the rectangular parallelepiped BOX comprising six faces is used as a solid for moving the image in the three-dimensional space. However, this invention is not limited to this, but the other solid being various polyhedron can be also used.

Industrial Applicability

In the image amount apparatus for broadcasting, this invention can be utilized in the case of forming the special effect image.

We claim:

1. A video processing apparatus, comprising:

first video processing means for performing a spatial transformation on a first source video by reading said first source video from a first memory in accordance with a first read address data in order to generate a first two-dimensional transform video;

second video processing means for performing a spatial transformation on a second source video by reading said second source video from a second memory in accordance with a second read address data in order to generate a second two-dimensional transform video;

third video processing means for performing a spatial transformation on a third source video by reading said third source video from a third memory in accordance with a third read address data in order to generate a third two-dimensional transform video;

composite means for combining said first, second and third two-dimensional transform video to generate a two-dimensional composite video; and control means for generating said first read address data, said second read address data and said third read address data, and for modifying said second read address data and said third read address data in accordance with said spatial transformation to be performed on said first source video so that said two-dimensional composite video image appears as a desired three-dimensional object.

2. The video processing apparatus according to claim 1, wherein said spatial transformation is performed as a mapping transformation for mapping source video onto a predetermined face of said three-dimensional object, a three-dimensional transformation for transforming said source video mapped on said predetermined face of said three-dimensional object into three-dimensional space, and a perspective transformation for perspective-transforming said source video transformed in three dimensional space onto a screen surface.

3. The video processing apparatus according to claim 2, wherein said mapping transformation includes a calculation algorithm including, a first mapping transformation matrix for mapping said first source video on a first face of said three dimensional object, a second mapping transformation matrix for mapping said second source video on a second face of said three dimensional object and third mapping transformation matrix for mapping said third source video on a third face of said three dimensional object, and wherein said three dimensional transforation is defined by a three dimensional transformation matrix, and said perspective transformation is defined by a perspective transformation matrix.

4. The video processing apparatus according to claim 2, wherein:

said first transformation matrix designated as $M_A$, is expressed by the following equation:

$$M_A = L_A \cdot T_{rs}$$

where, $L_A$: a matrix for performing a linear displacement on said first source video, $T_{rs}$: a matrix for performing a rate/skew transformation on said first source video;

said second transformation matrix, designated as $M_B$, is expressed by the following equation:

$$M_B = L_{BO} \cdot S_B \cdot R_{BX} \cdot R_{BZ} \cdot L_B$$

where, $L_{BO}$: a matrix for performing a linear displacement on said second source video based upon a crop operation, $S_B$: a matrix for performing a magnification/reduction of said second source video $R_{BY}$: a matrix for performing a rotation of the second source video around the y-axis $R_{BZ}$: a matrix for performing a rotation of the second source video around the Z-axis $L_B$: a matrix for performing a linear displacement on said second source video;

said third transformation matrix $M_C$ is expressed by the following equation:

$$M_C = L_{CO} \cdot S_C \cdot R_{CX} \cdot R_{CZ} \cdot L_C$$

where, $L_{CO}$: a matrix for performing a linear displacement on said third source video based upon a crop operation, $S_C$: a matrix for performing magnification/reduction of said third source video, $R_{CX}$: a matrix for performing a rotation of the third source video around the X-axis, $R_{CZ}$: a matrix for performing a rotation of the third source video around the Z-axis, $L_C$: a matrix for performing a linear displacement on said third source video.

5. The video processing apparatus according to claim 4 wherein:

said three-dimensional transformation matrix $T_O$ is expressed by the following equation:

$$T_O = \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & S \end{bmatrix}$$

where, $r_{11}$ to $r_{33}$: parameters for transforming the source video for x-, y-, and z-axis of the three-dimensional coordinates of xyz $l_x$: a parameter for linearly displacing the source video in the x-axis direction;

$l_y$: parameter for linearly displacing the source video in the y-axis direction;

$l_z$: parameter for linearly displacing the source video in the z-axis direction; and s: a parameter for magnifying or reducing the scale of source video;

and wherein said perspective transformation matrix $P_O$ is expressed by the following equation:

$$P_O = \begin{bmatrix} 1 & 0 & 0 & 0 \\ 0 & 1 & 0 & 0 \\ 0 & 0 & 0 & P_Z \\ 0 & 0 & 0 & 1 \end{bmatrix}$$

where, $P_Z$: a perspective value.

6. The video processing apparatus according to claim 5, wherein said control means does not use the z-axis element of said three-dimensional transformation matrix in the calculation of said read address data.

7. The video processing apparatus according to claim 5, wherein a calculation algorithm of said mapping transformation further includes a fourth mapping transformation matrix for mapping said first source video on an opposite face of said first face of said three-dimensional object, a fifth mapping transformation matrix for mapping said second source video on an opposite face of said second face of said three-dimensional object and sixth mapping transformation matrix for mapping said third source video on an opposite face of said third face of said three-dimensional object.

8. The video processing apparatus according to claim 5, wherein said first source video to be transformed to said first two-dimensional transform video by the transformation matrix $T_A$ is expressed by the equation:

$$T_A = M_A T_O P_O$$

said second source video to be transformed to said second two-dimensional transform video.

9. The video processing apparatus according to claim 8, wherein:

a fourth mapping transformation matrix designated as $M_A'$ is expressed by the following equation:

$$M_A' = L_A' \cdot T_{rs}$$

where, $L_A'$: a matrix for performing a linear displacement on said first source video, $T_{rs}$: a matrix for performing a rate/skew transformation on said first source video;

a fifth mapping transformation matrix $M_B'$ designated as is expressed by the following equation:

$$M_B' = L_{BO} \cdot S_B \cdot R_{BX} \cdot R_{BZ} \cdot L_B'$$

where, $L_{BO}$: a matrix for performing a linear displacement on said second source video based upon a crop operation, $S_B$: a matrix for performing a magnification/reduction of said second source video $R_{BY}$: a matrix for performing a rotation of the second source video around the y-axis, $R_{BZ}$: a matrix for performing a rotation of the second source video around the Z-axis, $L_B'$: a matrix for performing a linear displacement of said second source video;

a sixth mapping transformation matrix $M_C'$ is expressed by the following equation:

$$M_C' = L_{CO} \cdot S_C \cdot R_{CX} \cdot R_{CZ} \cdot L_C'$$

where, $L_{CO}$: a matrix for performing a linear displacement on said third source video based upon a crop operation, $S_C$: a matrix for performing a magnification/reduction of the third source video, $R_{CX}$: a matrix for performing a rotation of the third source video around the x-axis;

$R_{CZ}$: a matrix for performing a rotation of the third source video around the z-axis, $L_C'$: a matrix for performing a linear displacement on said third source video.

10. The video processing apparatus according to claim 1, further comprising:

means for implementing a reduction rate priority mode for modifying the content of, said first source video, said second source video, and/or said third source video when said first source video, said second source video, and/or said third source video are transformed to said first, second and third transform video, respectively; and means for implementing a crop priority mode for reducing or magnifying the modified content of said first source video, said second source video, and/or said third source video into a size corresponding to a size of a respective face of said two-dimensional composite video image when said first source video, said second source video, and/or said third source video are transformed to said first, second or third transform videos, respectively.

11. The video processing apparatus according to claim 5, wherein said first two-dimensional transform video written in a first memory, said second two-dimensional transform video written in a second memory, and said third two-dimensional transform video written in a third memory are each read out from each of said memories in accordance with an inverse matrix of said transformation matrix $T_O$.

12. The video processing apparatus according to claim 7, wherein said control means further comprises:

face detect means for detecting which of said first face or said opposite face of the first face is to be viewed as visible before performing said spatial transformation on said first source video; and selecting means for selecting said first mapping transformation matrix or said fourth mapping transformation matrix based on the resultant of detection of said face detect means.

13. A video processing method, comprising the steps of:

performing a spatial transformation on a first source video by reading said first source video from a first memory in accordance with a first read address data in order to generate a first two-dimensional transform video;

performing a spatial transformation on a second source video by reading said second source video from a second memory in accordance with a second read address data in order to generate a second two-dimensional transform video;

performing a spatial transformation on a third source video by reading said third source video from a third memory in accordance with a third read address data in order to generate a third two-dimensional transform video;

combining said first, second and third two-dimensional transform video to generate a two-dimensional composite video;

generating said first read address data, said second read address data and said third read address data; and modifying said second read address data and said third read address data in accordance with said spatial transformation to be performed on said first source video so that said two-dimensional composite video image appears as a desired three-dimensional object.

14. The video processing method according to claim 13, wherein said spatial transformation is performed as a mapping transformation for mapping source video onto a predetermined face of said three-dimensional object, a three-dimensional transformation for transforming said source video mapped on said predetermined face of said three-dimensional object into three-dimensional space, and a perspective transformation for perspective-transforming said source video transformed in three dimensional space onto a screen surface.

15. The video processing method according to claim 14, wherein said mapping transformation includes a calculation algorithm including, a first mapping transformation matrix for mapping said first source video on a first face of said three dimensional object, a second mapping transformation matrix for mapping said second source video on a second face of said three dimensional object and third mapping transformation matrix for mapping said third source video on a third face of said three dimensional object, and wherein said three dimensional transforation is defined by a three dimensional transformation matrix, and said perspective transformation is defined by a perspective transformation matrix.

16. The video processing method according to claim 14, wherein:

said first transformation matrix designated as $M_A$, is expressed by the following equation:

$$M_A = L_A \cdot T_{rs}$$

where, $L_A$: a matrix for performing a linear displacement on said first source video, $T_{rs}$: a matrix for performing a rate/skew transformation on said first source video;

said second transformation matrix, designated as $M_B$, is expressed by the following equation:

$$M_B = L_{BO} \cdot S_B \cdot R_{BX} \cdot R_{BZ} \cdot L_B$$

where, $L_{BO}$: a matrix for performing a linear displacement on said second source video based upon a crop operation, $S_B$: a matrix for performing a magnification/reduction of said second source video $R_{BY}$: a matrix for performing a rotation of the second source video around the y-axis $R_{BZ}$: a matrix for performing a rotation of the second source video around the Z-axis $L_B$: a matrix for performing a linear displacement on said second source video;

said third transformation matrix $M_C$ is expressed by the following equation:

$$M_C = L_{CO} \cdot S_C \cdot R_{CX} \cdot R_{CZ} \cdot L_C$$

where, $L_{CO}$: a matrix for performing a linear displacement on said third source video based upon a crop operation, $S_C$: a matrix for performing magnification/reduction of said third source video, $R_{CX}$: a matrix for performing a rotation of the third source video around the x-axis, $R_{CZ}$: a matrix for performing a rotation of the third source video around the Z-axis, $L_C$: a matrix for performing a linear displacement on said third source video.

17. The video processing method according to claim 16, wherein:

said three-dimensional transformation matrix is expressed by the following equation:

$$T_O = \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & S \end{bmatrix}$$

where, $r_{11}$ to $r_{33}$: parameters for transforming the source video for x-, y-, and z-axis of the three-dimensional coordinates of xyz $l_x$: a parameter for linearly displacing the source video in the x-axis direction;

$l_y$: a parameter for linearly displacing the source video in the y-axis direction;

$l_z$: a parameter for linearly displacing the source video in the z-axis direction; and s: a parameter for magnifying or reducing the scale of source video;

and wherein said perspective transformation matrix $P_O$ is expressed by the following equation:

$$P_O = \begin{bmatrix} 1 & 0 & 0 & 0 \\ 0 & 1 & 0 & 0 \\ 0 & 0 & 0 & P_Z \\ 0 & 0 & 0 & 1 \end{bmatrix}$$

where, $P_Z$: a perspective value.

18. The video processing method according to claim 17, wherein said control means does not use the z-axis element of said three-dimensional transformation matrix in the calculation of said read address data.

19. The video processing method according to claim 17, wherein a calculation algorithm of said mapping transformation further includes a fourth mapping transformation matrix for mapping said first source video on an opposite face of said first face of said three-dimensional object, a fifth mapping transformation matrix for mapping said second source video on an opposite face of said second face of said three-dimensional object and sixth mapping transformation matrix for mapping said third source video on an opposite face of said third face of said three-dimensional object.

20. The video processing method according to claim 17, wherein said first source video to be transformed to said first two-dimensional transform video by the transformation matrix $T_A$ is expressed by the equation:

$$T_A = M_A \cdot T_O \cdot P_O$$

said second source video to be transformed to said second two-dimensional transform video by the transformation matrix $T_B$ is expressed by the equation:

$$T_B = M_B T_O \cdot P_O;$$

and said third source video to be transformed to said third two-dimensional transform video by the transformation matrix $T_C$ is expressed by the equation:

$$T_C = M_C \cdot T_O P_O.$$

21. The video processing method according to claim 20, wherein:

a fourth mapping transformation matrix designated as $M_A'$ is expressed by the following equation:

$$M_A' = L_A' \cdot T_{rs}$$

where, $L_A'$: a matrix for performing a linear displacement on said first source video, $T_{rs}$: a matrix for performing a rate/skew transformation on said first source video;

a fifth mapping transformation matrix $M_B'$ designated as is expressed by the following equation:

$$M_B' = L_{BO} \cdot S_B \cdot R_{BX} \cdot R_{BZ} \cdot L_B'$$

where, $L_{BO}$: a matrix for performing a linear displacement on said second source video based upon a crop operation, $S_B$: a matrix for performing a magnification/reduction of said second source video $R_{BY}$: a matrix for performing a rotation of the second source video around the y-axis, $R_{BZ}$: a matrix for performing a rotation of the second source video around the Z-axis, $L_B'$: a matrix for performing a linear displacement of said second source video;

a sixth mapping transformation matrix $M_C'$ is expressed by the following equation:

$$M_C = L_{CO} \cdot S_C \cdot R_{CX} \cdot R_{CZ} \cdot L_C'$$

where, $L_{CO}$: a matrix for performing a linear displacement on said third source video based upon a crop operation, $S_C$: a matrix for performing a magnification/reduction of the third source video, $R_{CX}$: a matrix for performing a rotation of the third source video around the x-axis;

$R_{CZ}$: a matrix for performing a rotation of the third source video around the z-axis, $L_C'$: a matrix for performing a linear displacement on said third source video.

22. The video processing method according to claim 13, further comprising the steps of:

implementing a reduction rate priority mode for modifying the content of, said first source video, said second source video, and/or said third source video when said first source video, said second source video, and/or said third source video are transformed to said first, second and third transform video, respectively; and implementing a crop priority mode for reducing or magnifying the modified content of said first source video, said second source video, and/or said third source video into a size corresponding to a size of a respective face of said two-dimensional composite video image when said first source video, said second source video, and/or said third source video are first source video transformed to said first, second or third transform videos, respectively.

23. The video processing method according to claim 17, wherein said first two-dimensional transform video written in a first memory, said second two-dimensional transform video written in a second memory, and said third two-dimensional transform written in a third memory are each read out from each of said memories in accordance with an inverse matrix of said transformation matrix $T_O$.

24. The video processing method according to claim 19, further comprising the steps of:

detecting which of said first face or said opposite face of said first face is to be viewed as visible before performing said spatial transformation on said first source video; and selecting said first mapping transformation matrix or said fourth mapping transformation matrix based on the resultant of detection.

25. A video processing apparatus, comprising:

first video processing means for performing a first image transformation on a first source image data in accordance with first transform parameters to generate a first two-dimensional transform video;

second video processing means for performing a second image transformation on a second source image data in accordance with second transform parameters to generate a second two-dimensional transform video;

third video processing means for performing a third image transformation on a third source image data in accordance with third transform parameters to generate a third two-dimensional transform video;

composite means for combining said first, second and third two-dimensional transform video to generate a two-dimensional composite video; and control means for generating said first transform parameters, said second transform parameters and said third transform parameters, and for modifying said second transform parameters and said third transform parameters based on a modification in a first transform operation to be performed on said first source image data.

26. A video processing method, comprising the steps of:

performing a first image transformation on a first source image data in accordance with first transform parameters to generate a first two-dimensional transform video;

performing a second image transformation on a second source image data in accordance with second transform parameters to generate a second two-dimensional transform video;

performing a third image transformation on a third source image data in accordance with third transform parameters to generate a third two-dimensional transform video;

combining said first, second and third two-dimensional transform video to generate a two-dimensional composite video;

generating said first transform parameters, said second transform parameters and said third transform parameters; and modifying said second transform parameters and said third transform parameters based on a modification in a first transform operation to be performed on said first source image data.

* * * * *